United States Patent
Tran et al.

(10) Patent No.: US 7,769,928 B1
(45) Date of Patent: Aug. 3, 2010

(54) DATA STORAGE SYSTEM HAVING CPUS ADAPTED TO PERFORM A SECOND ATOMIC OPERATION REQUEST PRIOR TO COMPLETION OF A FIRST ATOMIC OPERATION REQUEST

(75) Inventors: Nhut Tran, Natick, MA (US); Michael Sgrosso, Franklin, MA (US); William F. Baxter, III, Holliston, MA (US); James M. Guyer, Northborough, MA (US)

(73) Assignee: EMC Corporation, Hopkinton, MA (US)

( * ) Notice: Subject to any disclaimer, the term of this patent is extended or adjusted under 35 U.S.C. 154(b) by 90 days.

(21) Appl. No.: 11/769,743

(22) Filed: Jun. 28, 2007

(51) Int. Cl.
*G06F 3/00* (2006.01)
*G06F 5/00* (2006.01)
*G06F 13/12* (2006.01)
*G06F 13/38* (2006.01)

(52) U.S. Cl. .......................... 710/61; 710/74
(58) Field of Classification Search .................. 710/74, 710/61
See application file for complete search history.

(56) References Cited

U.S. PATENT DOCUMENTS

| | | | | |
|---|---|---|---|---|
| 5,285,199 A | * | 2/1994 | Pocek | 370/474 |
| 5,446,862 A | * | 8/1995 | Ohkami | 711/100 |
| 5,890,207 A | * | 3/1999 | Sne et al. | 711/113 |
| 6,269,430 B1 | * | 7/2001 | Chen et al. | 711/154 |
| 2005/0071424 A1 | * | 3/2005 | Baxter | 709/203 |

FOREIGN PATENT DOCUMENTS

GB   2366425 A  * 3/2002

OTHER PUBLICATIONS

U.S. Appl. No. 11/769,747, filed Jun. 28, 2007.
U.S. Appl. No. 11/769,746, filed Jun. 28, 2007.
U.S. Appl. No. 11/769,745, filed Jun. 28, 2007.
U.S. Appl. No. 11/769,744, filed Jun. 28, 2007.
U.S. Appl. No. 11/769,741, filed Jun. 28, 2007.
U.S. Appl. No. 11/769,740, filed Jun. 28, 2007.
U.S. Appl. No. 11/769,739, filed Jun. 28, 2007.
U.S. Appl. No. 11/769,737, filed Jun. 28, 2007.

* cited by examiner

*Primary Examiner*—Niketa I Patel
*Assistant Examiner*—Farley J Abad

(57) ABSTRACT

A data storage system having protocol controller for converting packets between PCIE format used by a storage processor and Rapid IO format used by a packet switching network. The controller includes a PCIE end point for transferring atomic operation (DSA) requests, a data pipe section having a plurality of data pipes for passing user data; and a message engine section for passing messages among the plurality of storage processors. An acceleration path controller bypasses a DSA buffer in the absence of congestion on the network. Packets fed to the PCIE end point include an address portion having code indicating an atomic operation. An encoder converts the code from a PCIE format into the same atomic operation in SRIO format. Each one of a plurality of CPUs is adapted to perform a second DSA request during execution of a first DSA request.

2 Claims, 49 Drawing Sheets

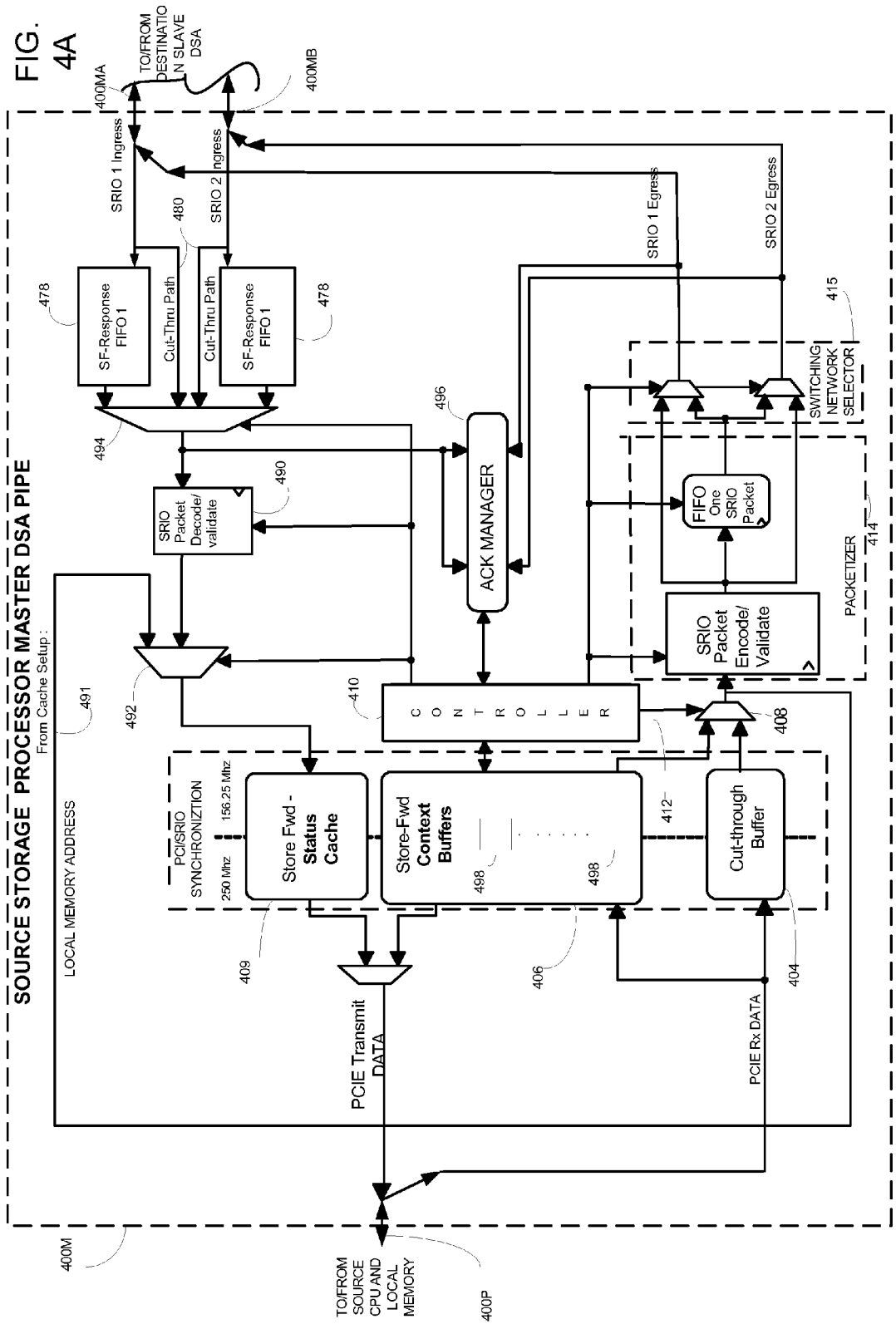

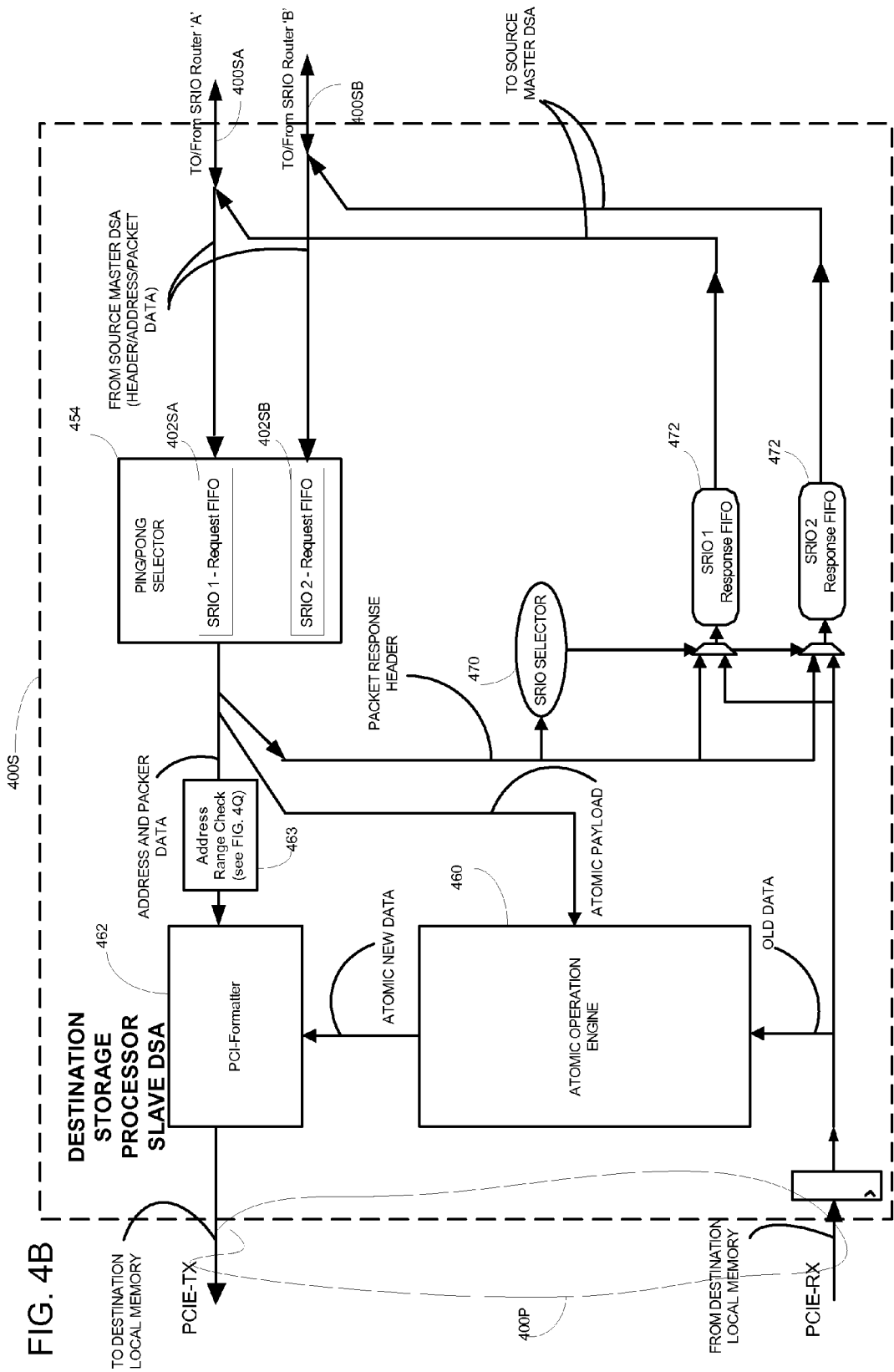

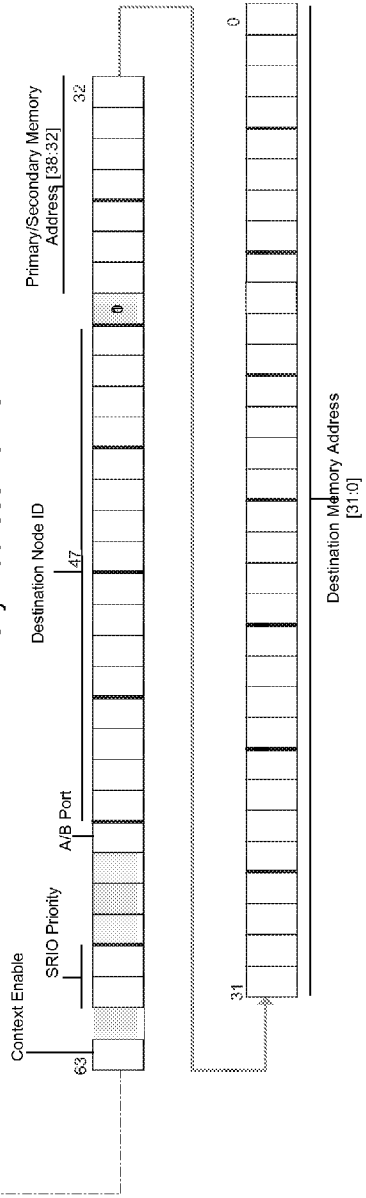

FIG. 4H - DSA Cache Setup Format

| Cache Offset | Mem. Command = 0 Memory Write | Mem. Command = 1 Memory Read | Mem. Command = 3 MCMS-64 | Mem. Command = 4 MCMS-128 | Mem. Command = 5 ACM-64 | Mem. Command = 6 ACM-128 |
|---|---|---|---|---|---|---|
| 0x00 | Primary Address | Primary Address | Primary Address | Primary Address | Primary Address | Primary Address |
| 0x08 | Secondary Address | Reserved | Reserved | Reserved | Reserved | Reserved |
| 0x10 | Data 0 | Reserved | Comp. Mask 64 | Comp. Mask 64 | Add Data 64 | Add Data 64 |
| 0x18 | Data 1 | Reserved | Comp. Data 64 | Comp. Data 64 | Carry Mask 64 | Carry Mask 64 |
| 0x20 | Data 2 | Reserved | Swap Mask 64 | Swap Mask 64 | Reserved | Add Data 128 |
| 0x28 | Data 3 | Reserved | Swap Data 64 | Swap Data 64 | Reserved | Carry Mask 128 |
| 0x30 | Data 4 | Reserved | Reserved | Reserved | Reserved | Reserved |
| 0x18 | Data 5 | Reserved | Reserved | Reserved | Reserved | Reserved |
| 0x40 | Data 6 | Reserved | Reserved | Reserved | Reserved | Reserved |
| 0x48 | Data 7 | Reserved | Reserved | Reserved | Reserved | Reserved |
| 0x50 | Local MEM Address | Local MEM Address | Local MEM Address | Local MEM Address | Local MEM Address | Local MEM Address |
| 0x58 | Reserved | Reserved | Reserved | Reserved | Reserved | Reserved |
| 0x60 | Reserved | Reserved | Reserved | Reserved | Reserved | Reserved |
| 0x68 - 0x7f | Reserved | Reserved | Reserved | Reserved | Reserved | Reserved |

FIG. 4D Primary Address Format

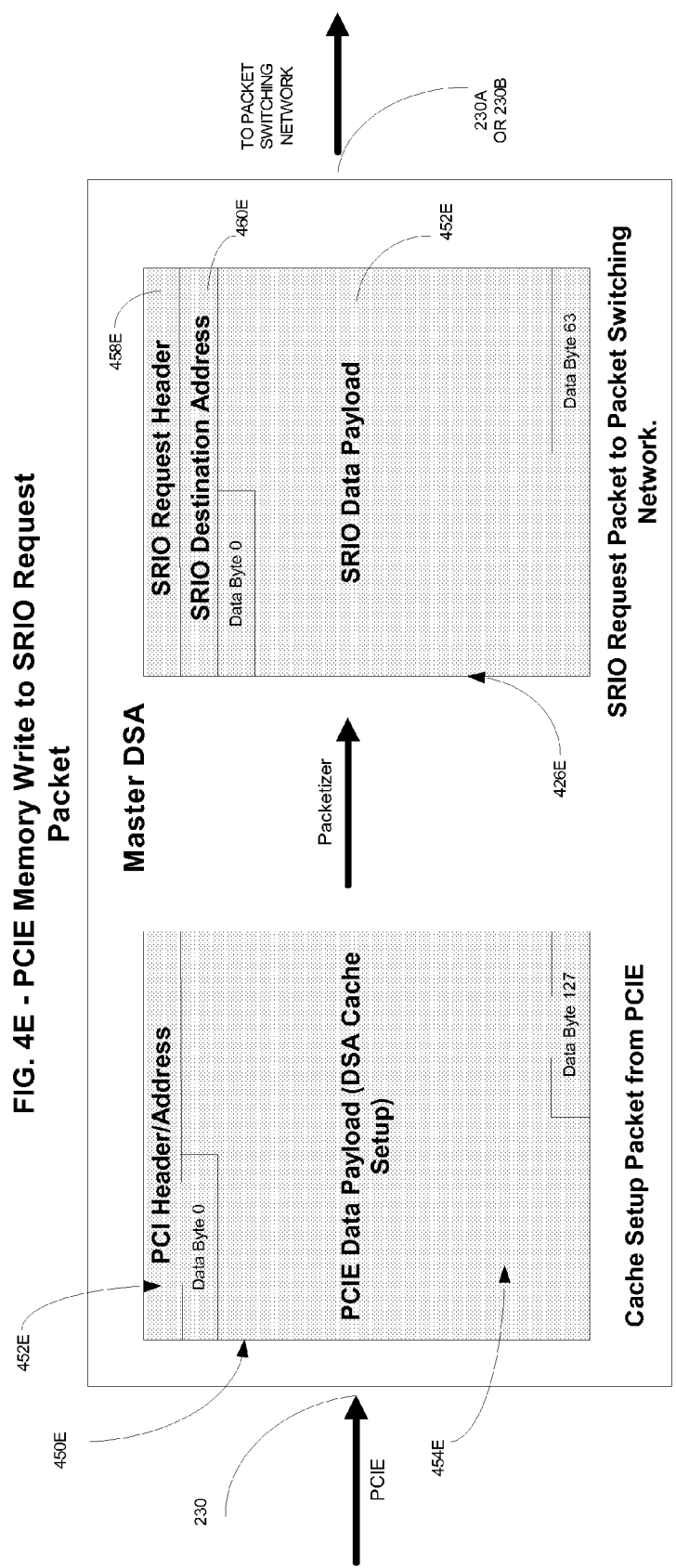

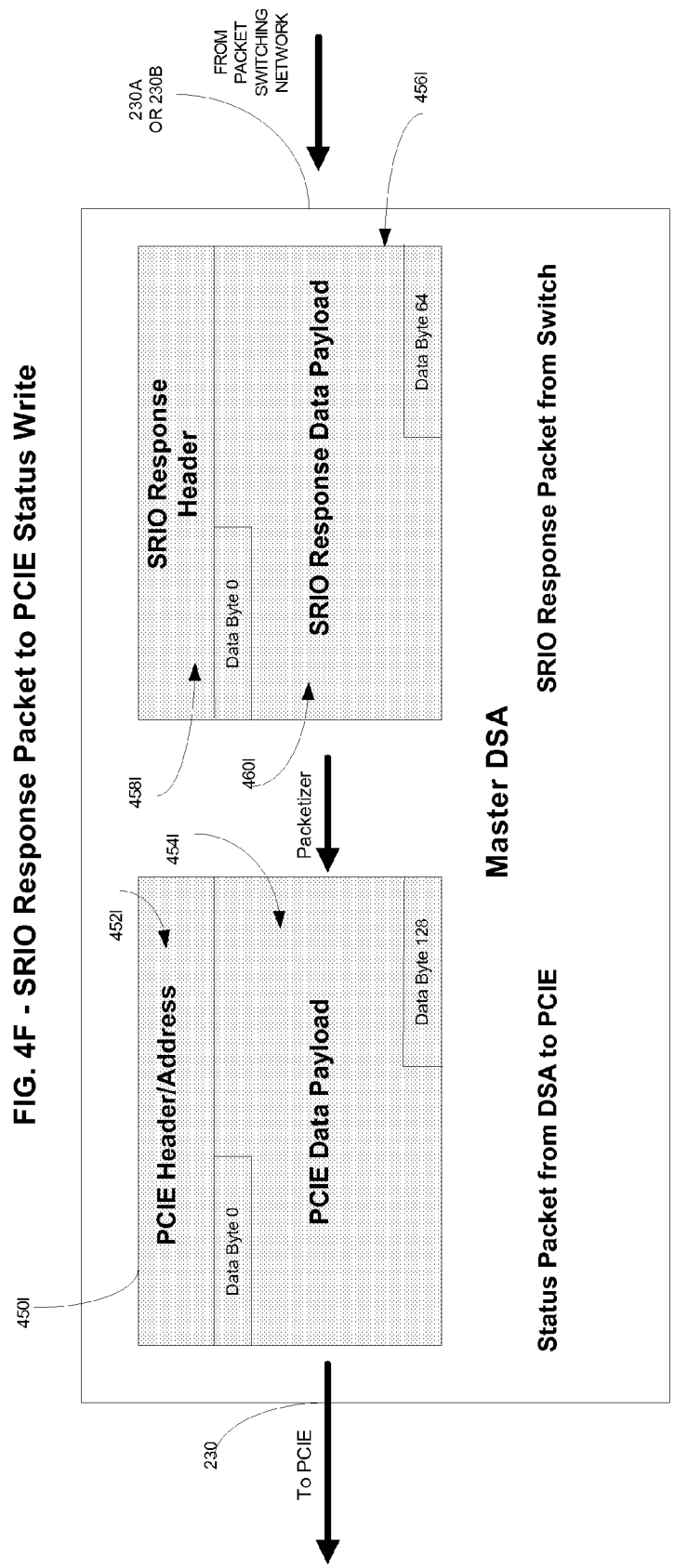
FIG. 4F - SRIO Response Packet to PCIE Status Write

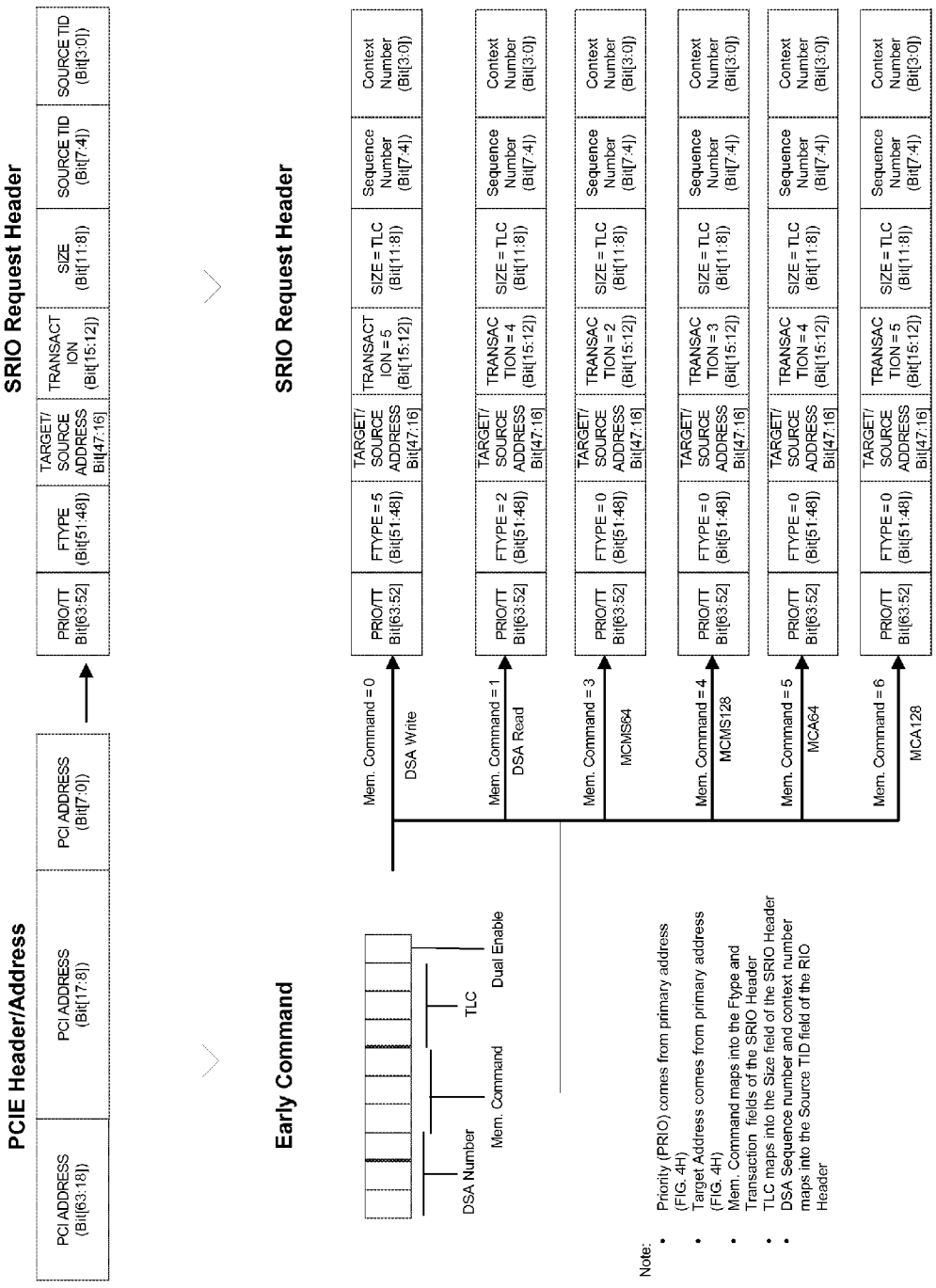

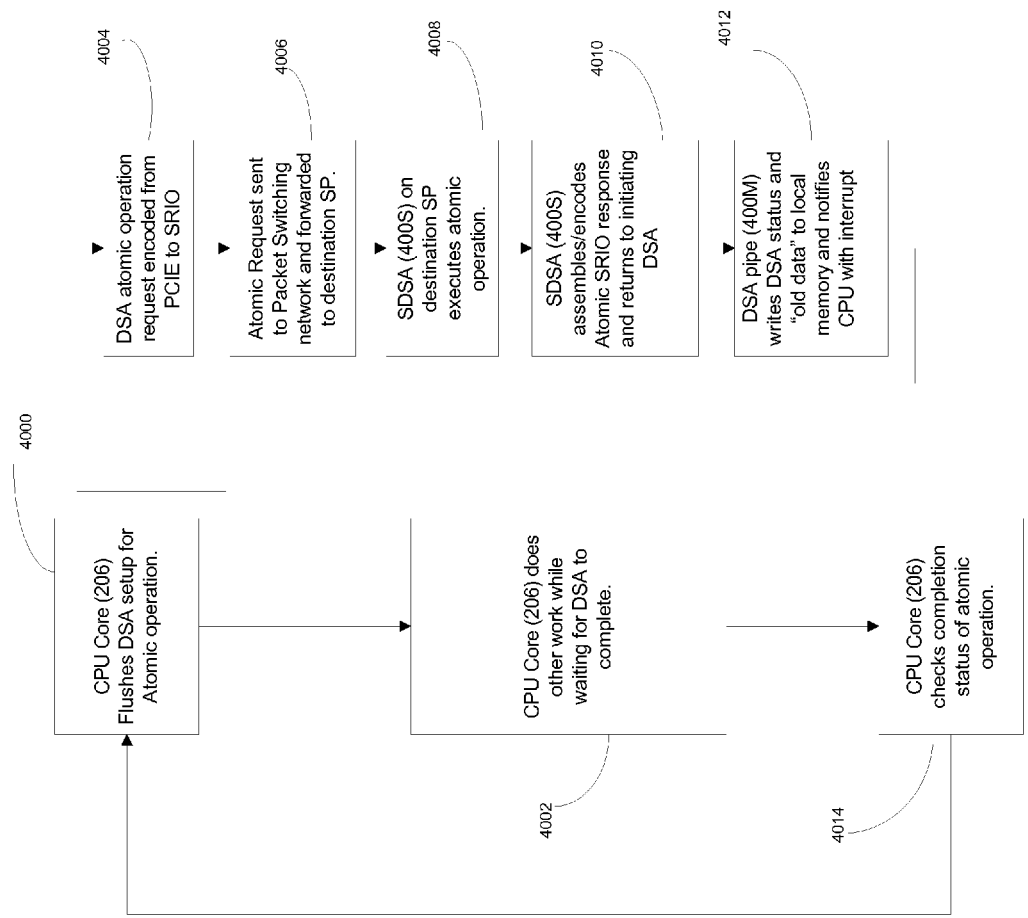
FIG. 4I  DSA atomic operation over a packet switched network.

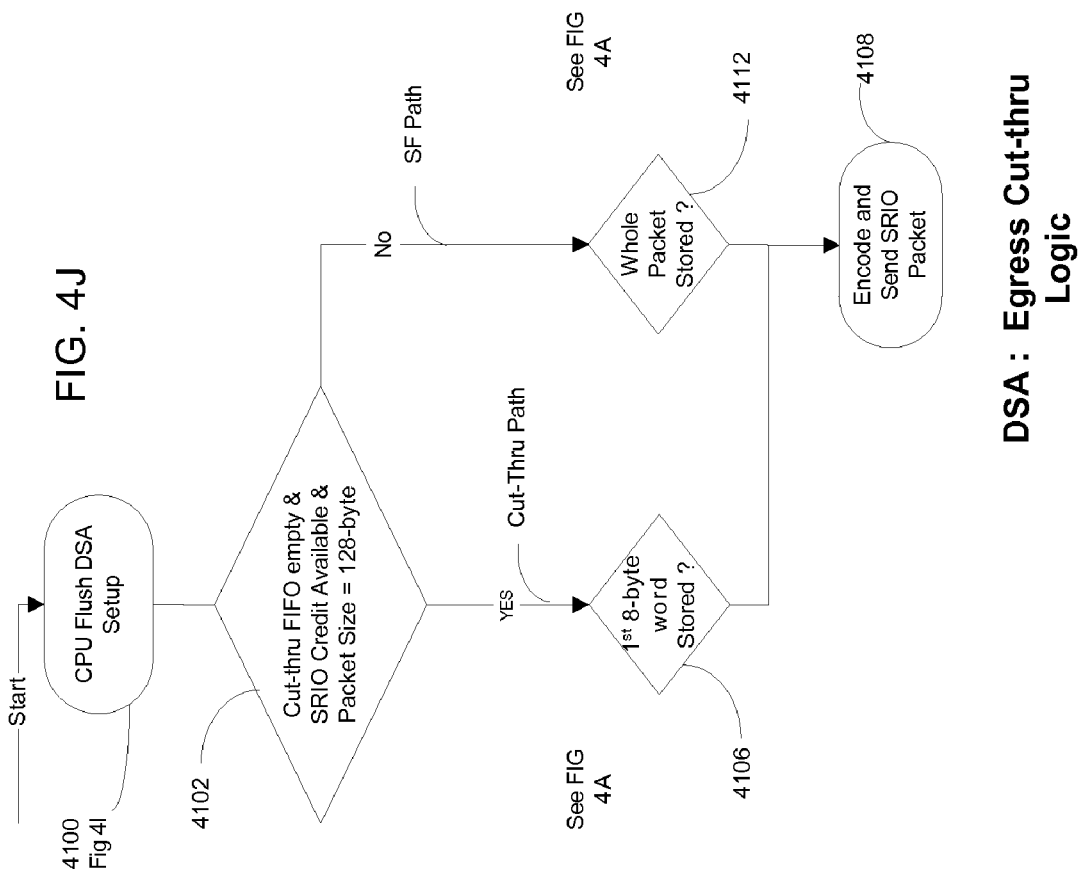

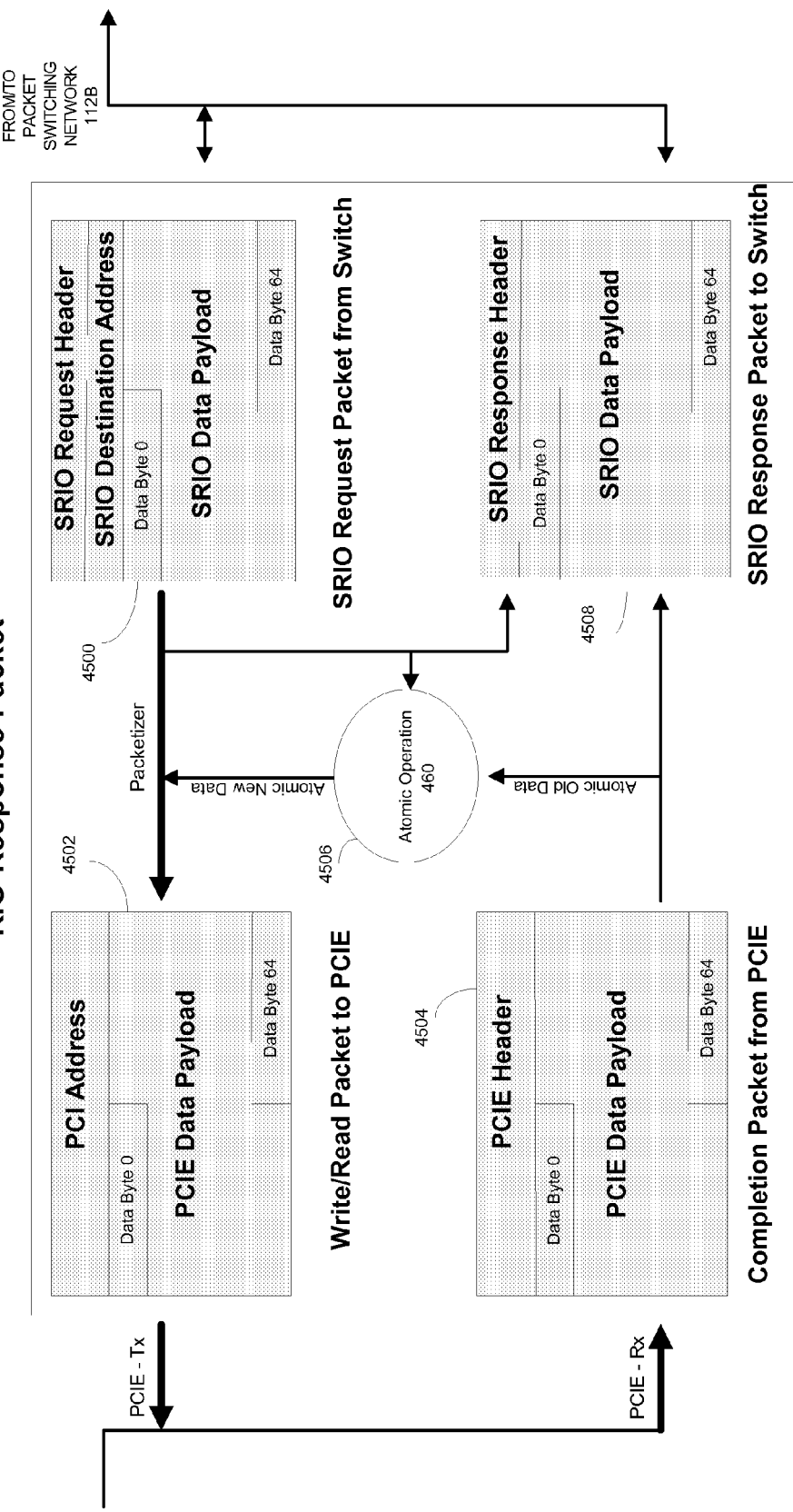

FIG. 4L DSA Cache Response Format

| Cache Offset | Mem. Command = 0 (Memory Write) | Mem. Command = 1 (Memory Read) | Mem. Command = 3 MCMS-64 | Mem. Command = 4 MCMS-128 | Mem. Command = 5 ACM-64 | Mem. Command = 6 ACM-128 |
|---|---|---|---|---|---|---|
| 0x00 | Pipe Status | Pipe Status | Pipe Status | Pipe Status | Pipe Status | Pipe Status |
| 0x08 | Reserved | Returned Data 0 | Old Data 64 | Old Data 64 | Old Data 64 | Old Data 64 |
| 0x10 | Reserved | Returned Data 1 | Reserved | Old Data 128 | Reserved | Old Data 128 |
| 0x18 | Reserved | Returned Data 2 | Reserved | Reserved | Reserved | Reserved |
| 0x20 | Reserved | Returned Data 3 | Reserved | Reserved | Reserved | Reserved |
| 0x28 | Reserved | Returned Data 4 | Reserved | Reserved | Reserved | Reserved |
| 0x30 | Reserved | Returned Data 5 | Reserved | Reserved | Reserved | Reserved |
| 0x38 | Reserved | Returned Data 6 | Reserved | Reserved | Reserved | Reserved |
| 0x40 | Reserved | Returned Data 7 | Reserved | Reserved | Reserved | Reserved |
| 0x48 - 0x7F | Reserved | Reserved | Reserved | Reserved | Reserved | Reserved |

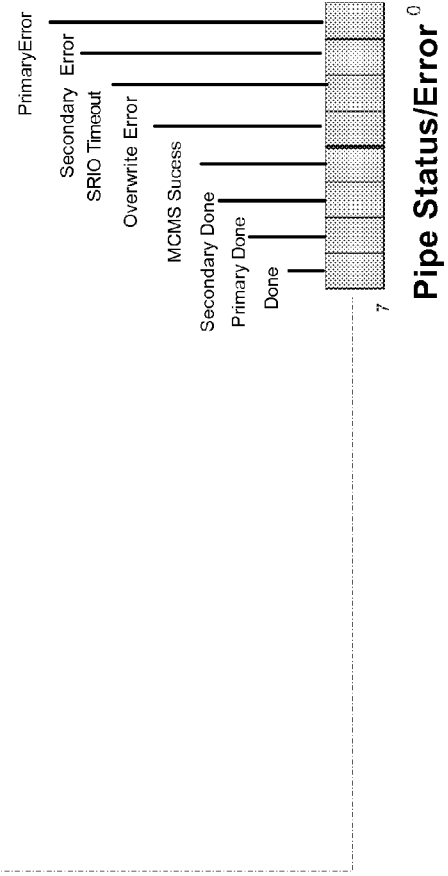

Pipe Status/Error

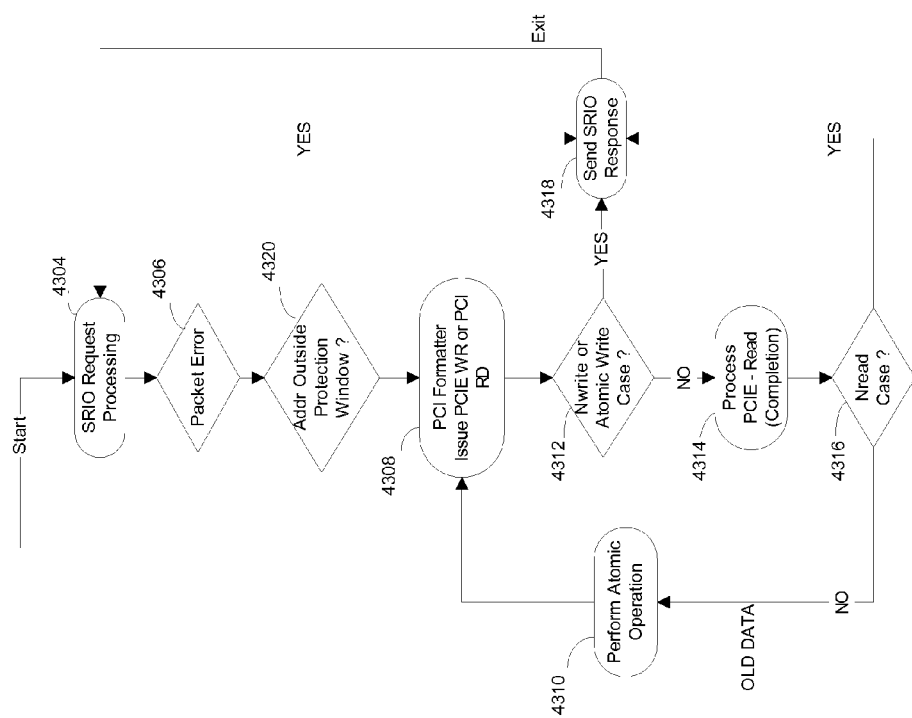
FIG. 4M SDSA Operation Flow Chart

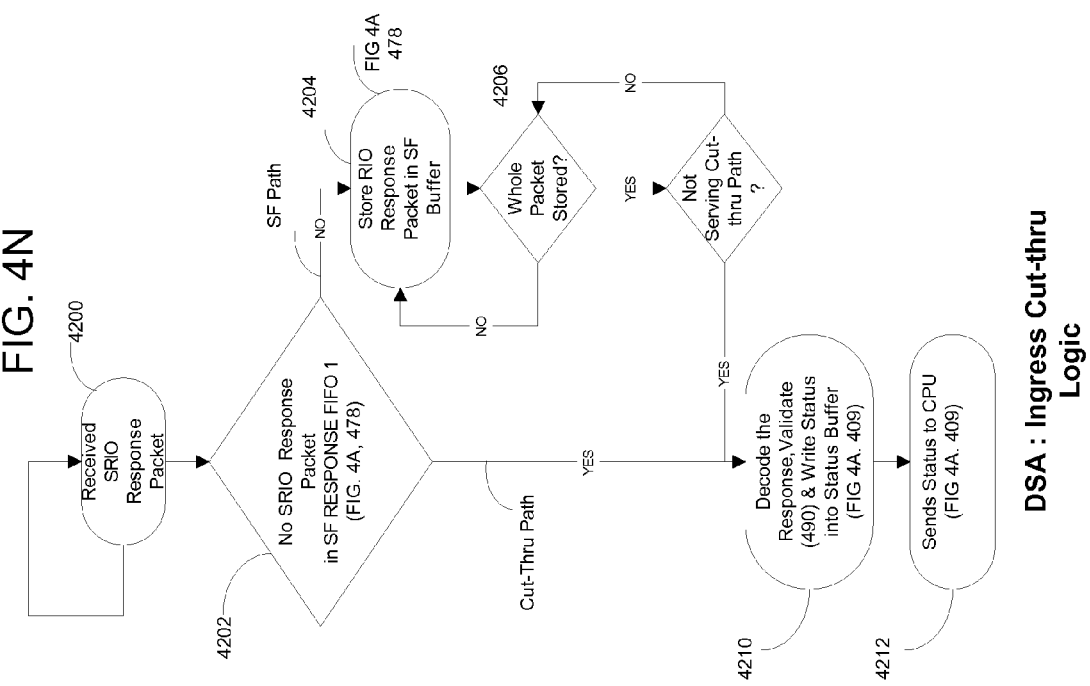

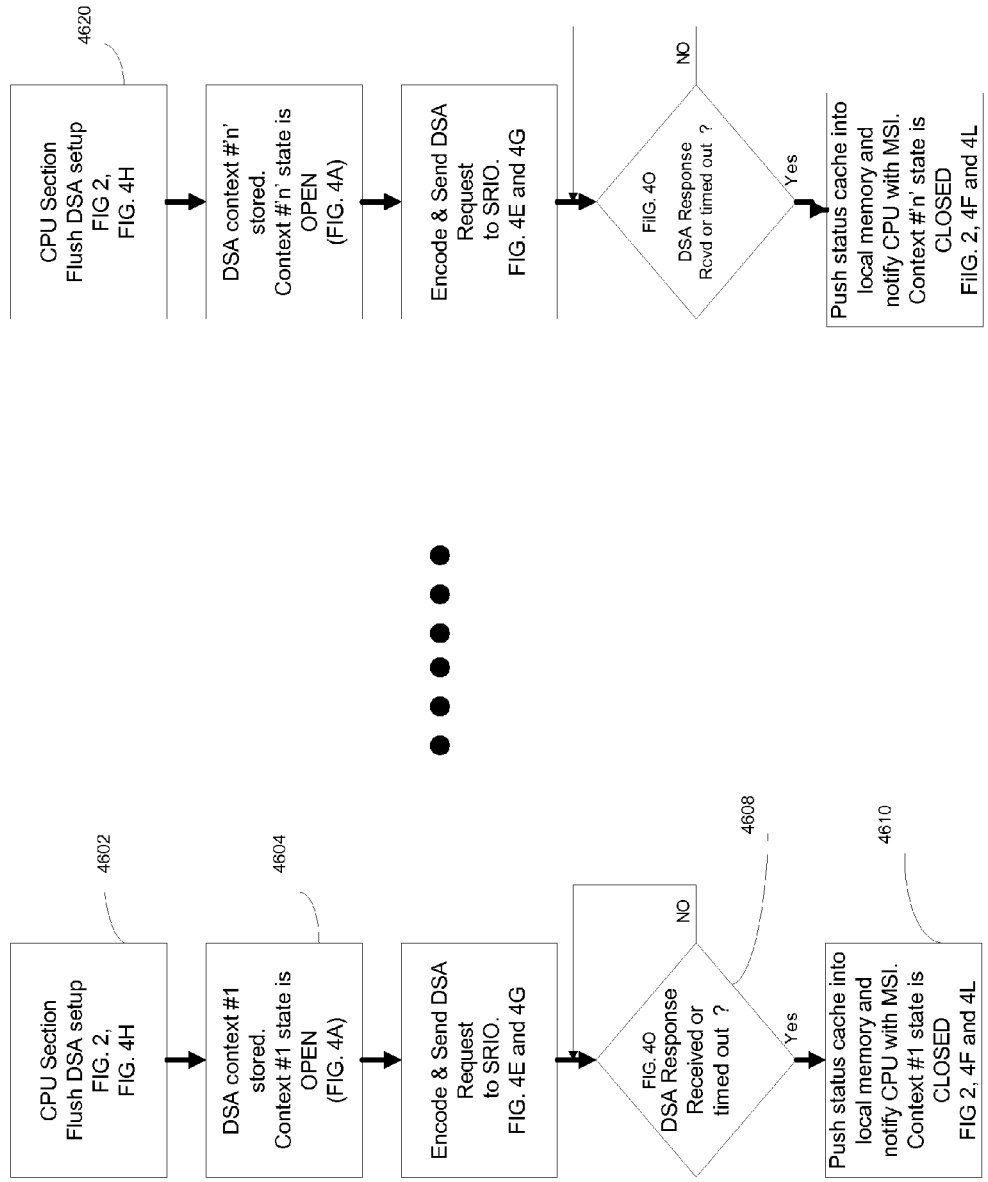
FIG. 4P Context Switched DSA

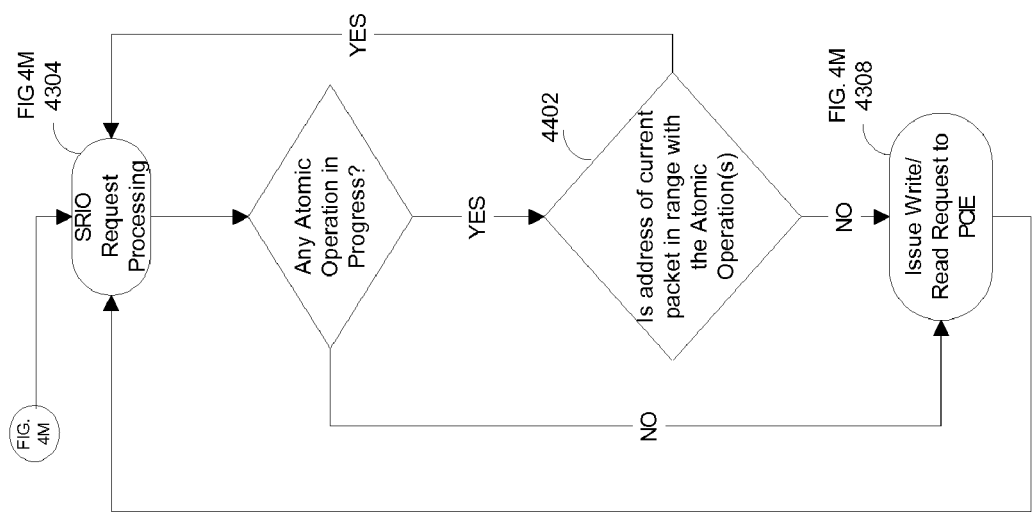

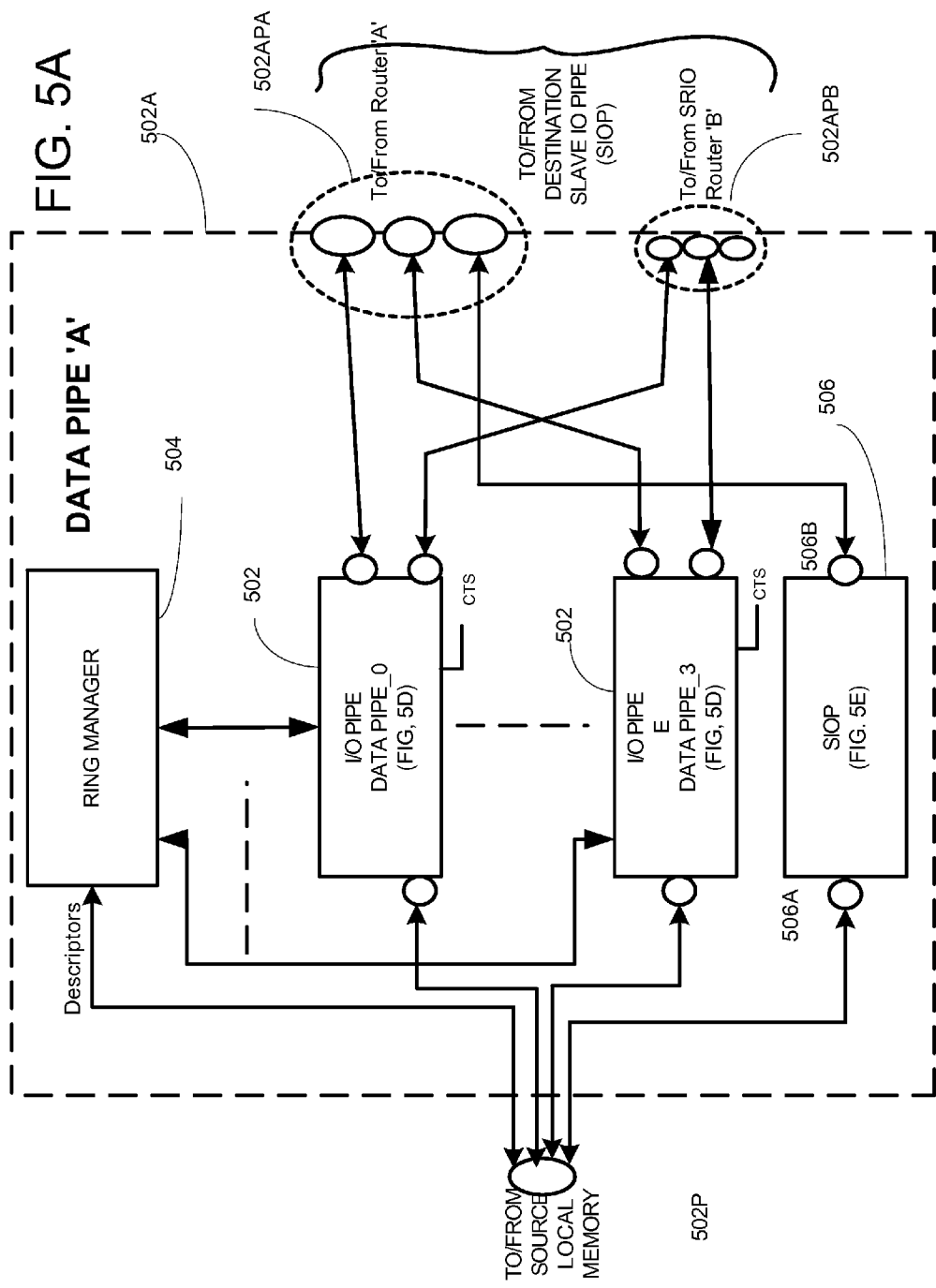

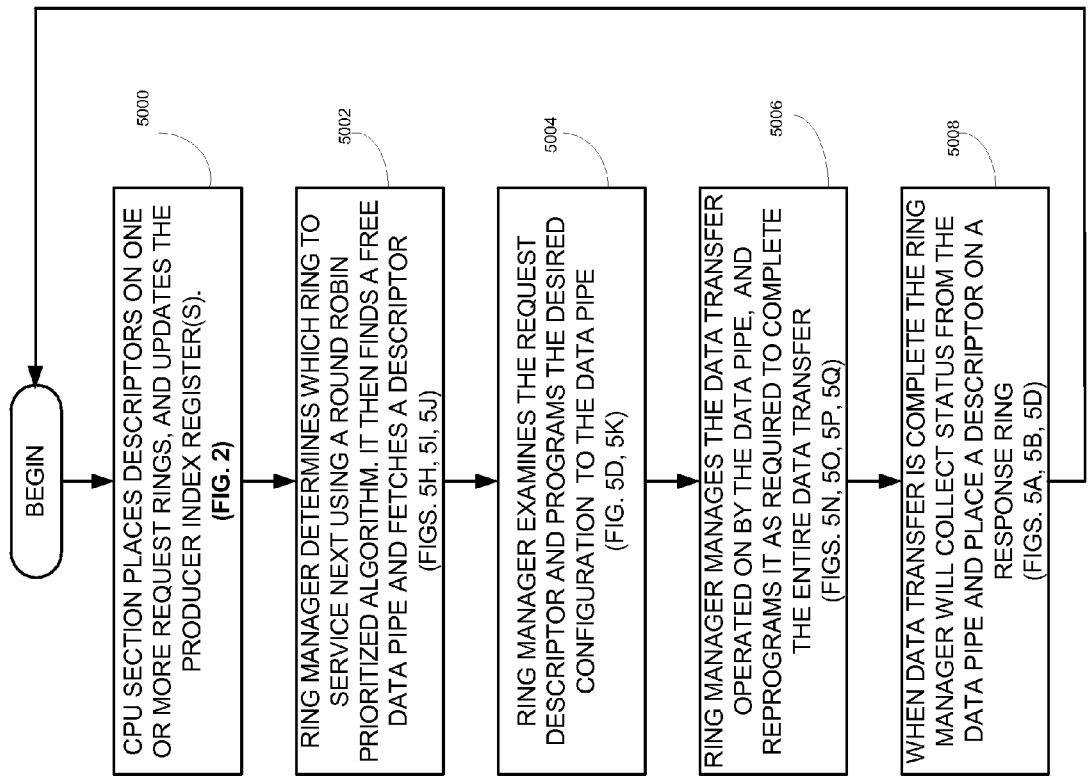
FIG. 5F Overall Data Pipe Flow (High Level)

(Overall Data Pipe Flow)

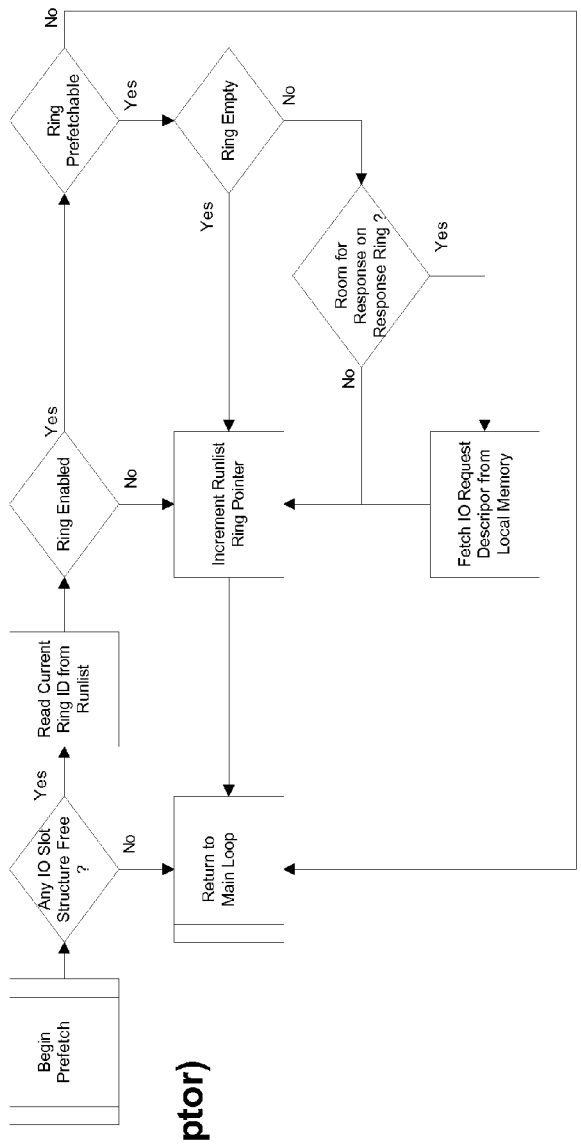
FIG. 5H (Prefetch Descriptor)
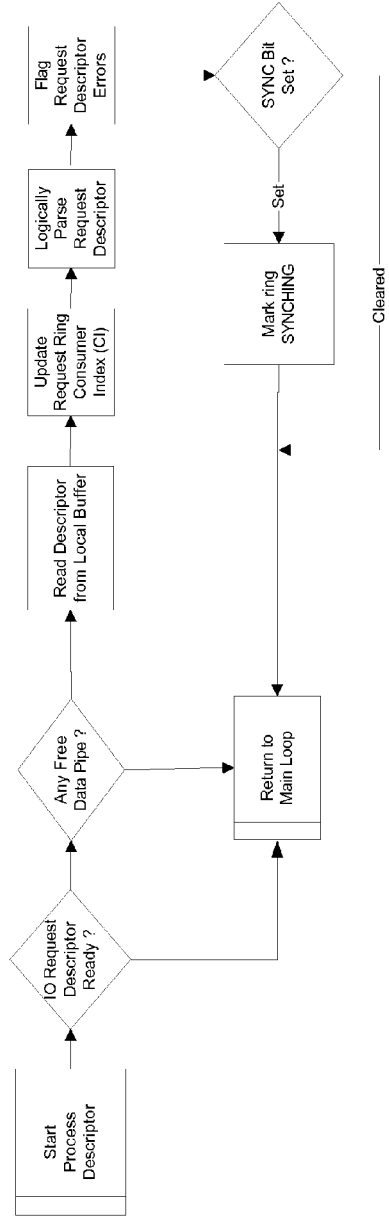
FIG. 5J (Process Descriptor)

(Generate Run List)

(Bind Request to IO Pipe)

(Generate Response)

(Update Heartbeat)

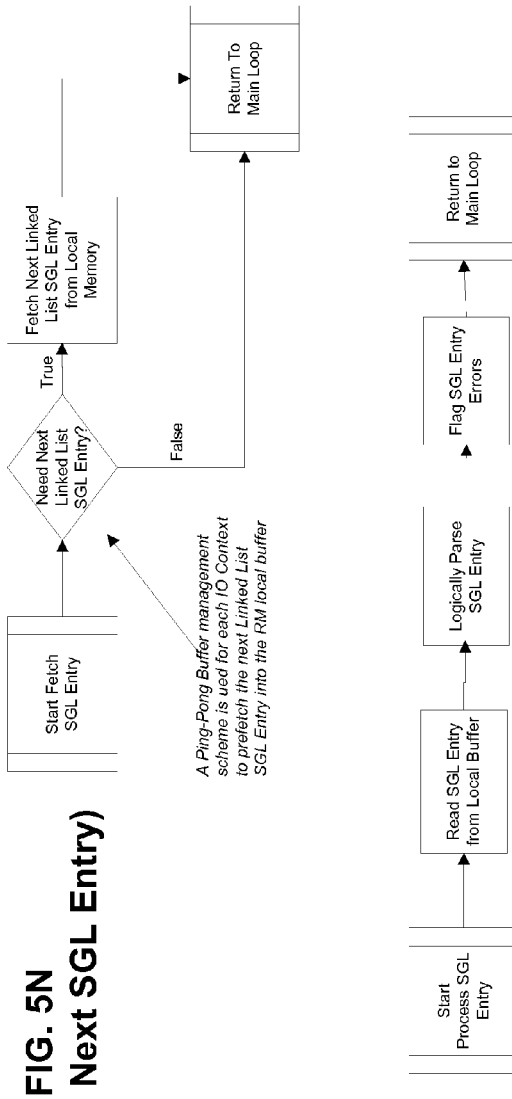
FIG. 5N
(Prefetch Next SGL Entry)
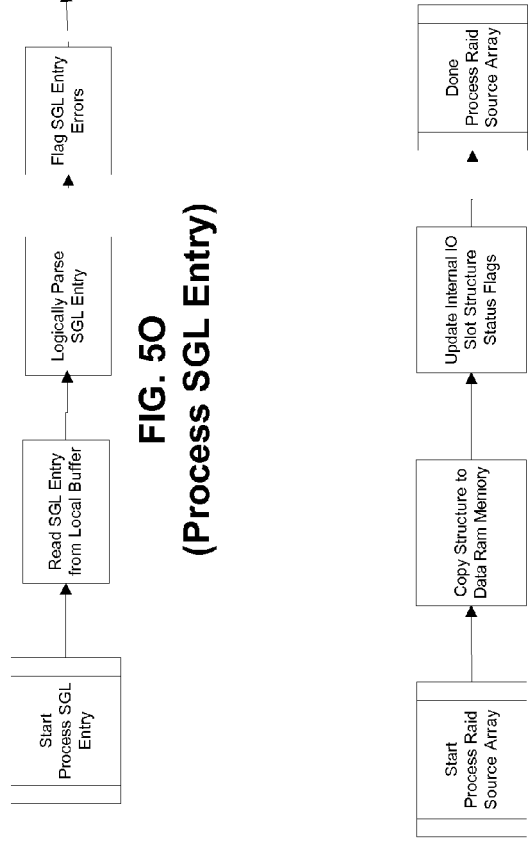
FIG. 5O
(Process SGL Entry)
FIG. 5P
(Process Raid Array)

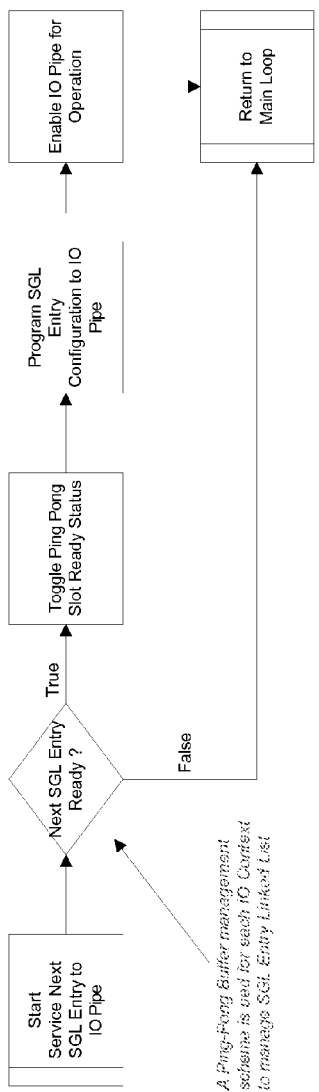
FIG. 5Q
(Service SGL Entry)
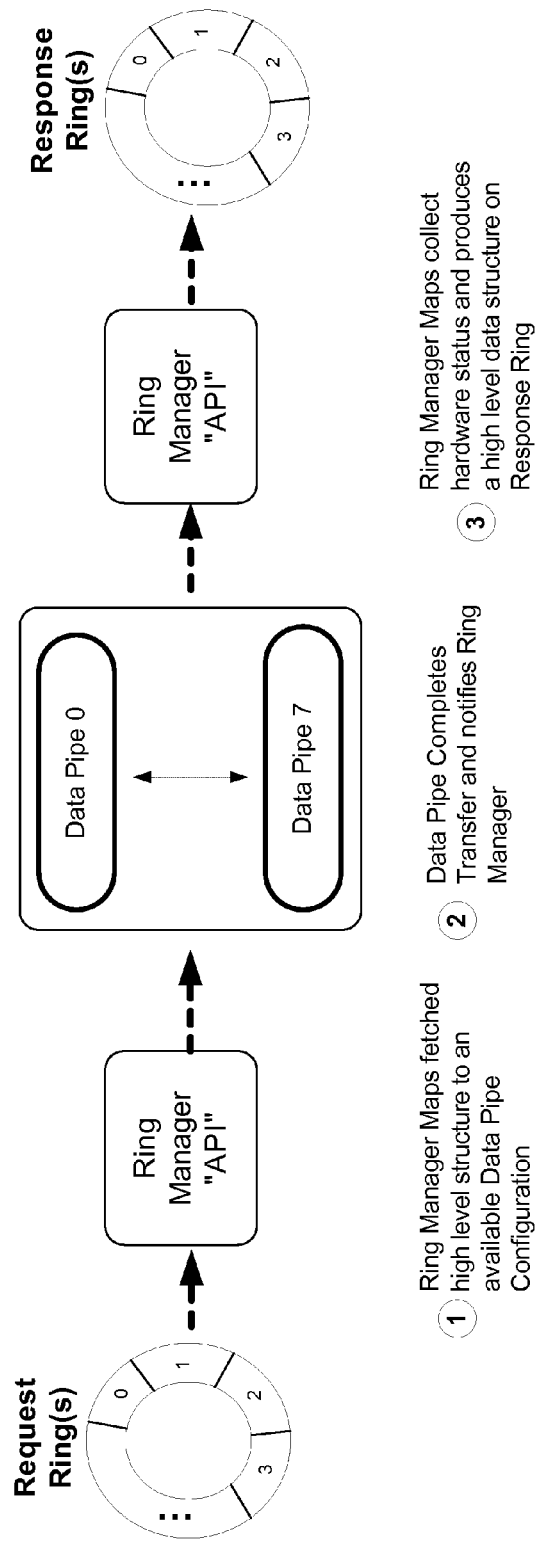
FIG. 5R High Level SW Model

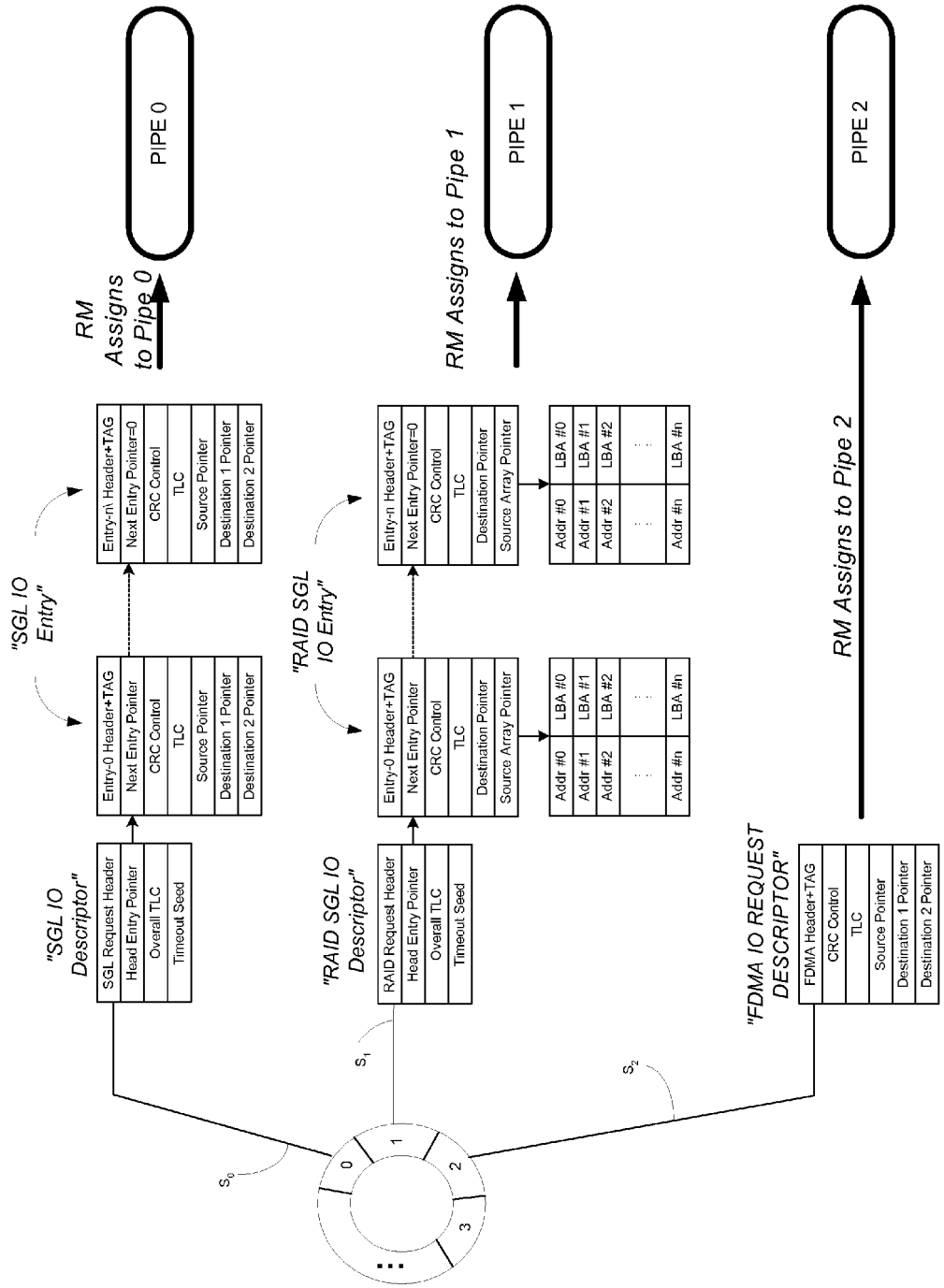
FIG. 5S Software Model

RAID Software Model (RAID ALGORITHM WITHIN DATA PIPE)

Ring Manager Configuration and Initialization

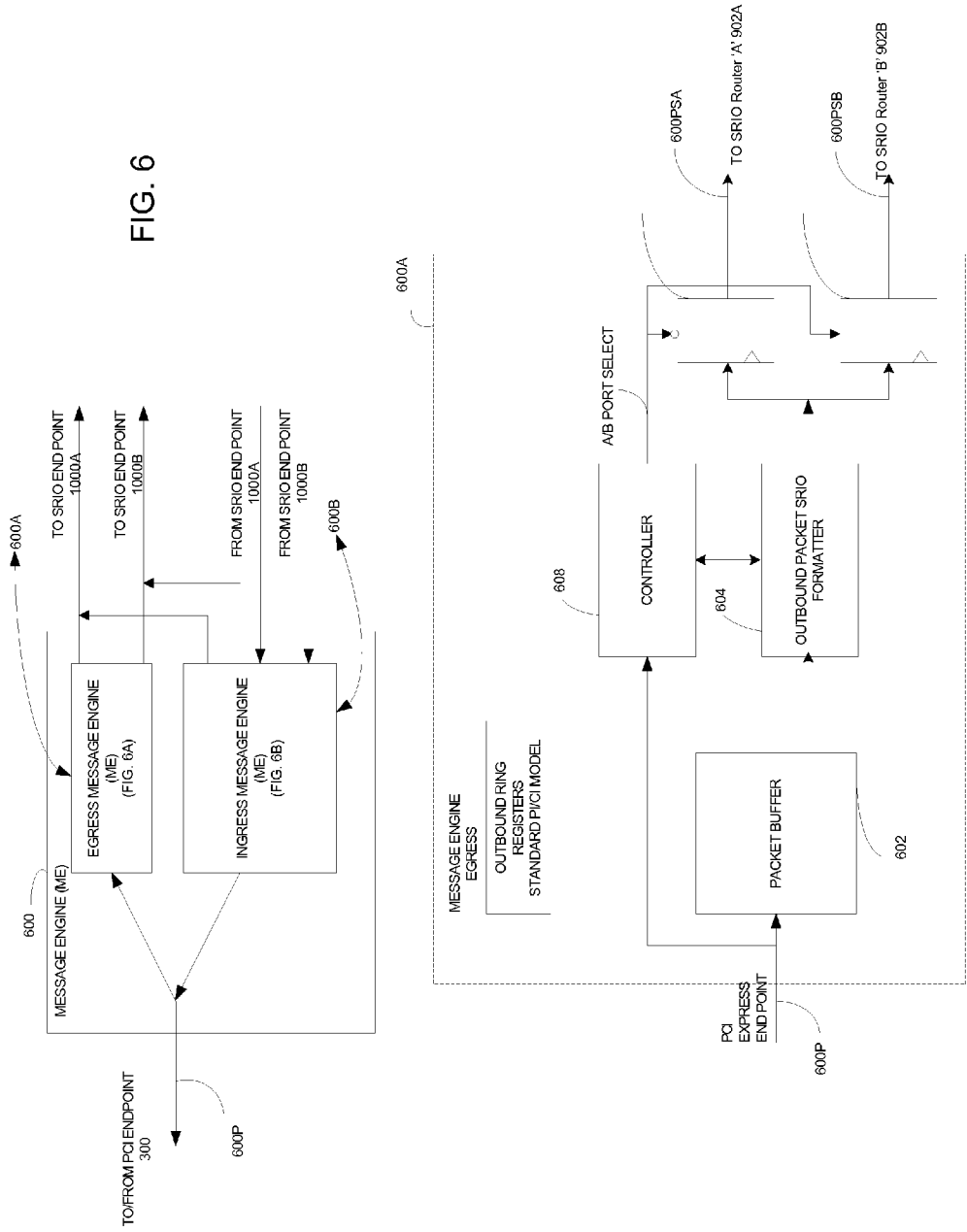

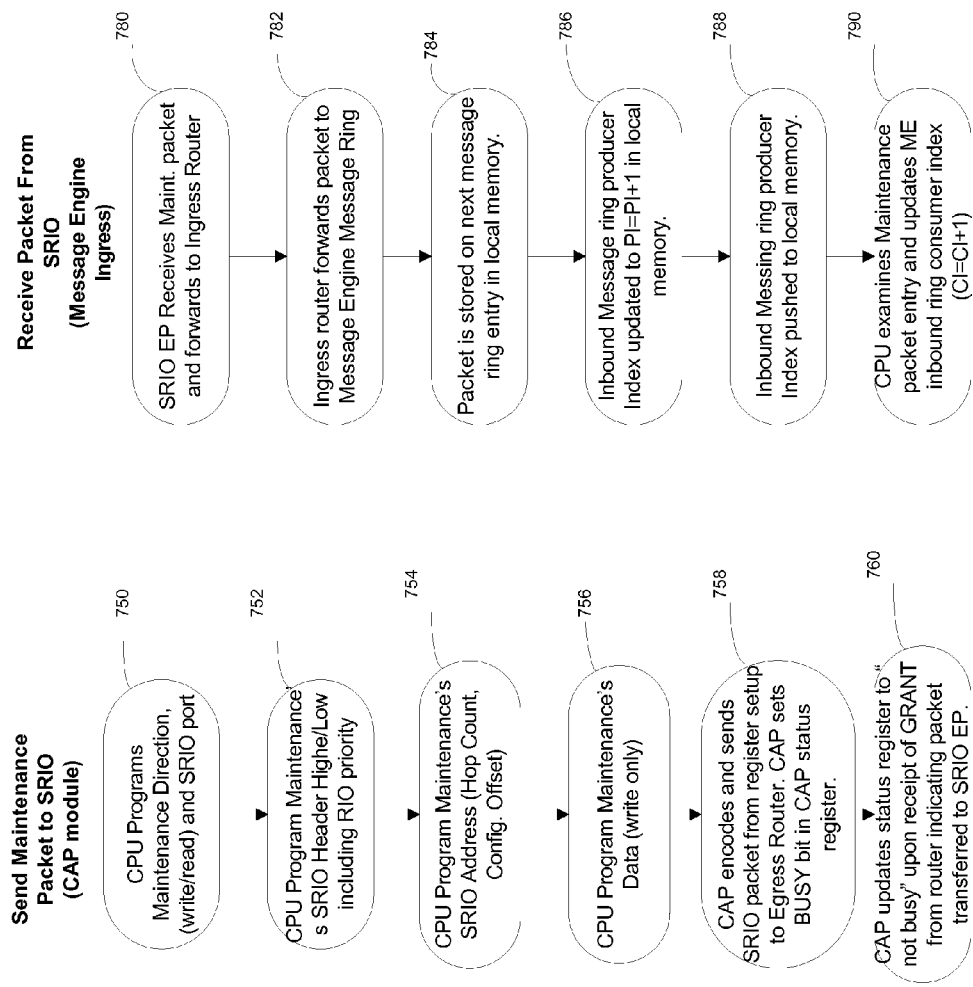
FIG. 7A- Maintenance Packet transmission and reception operational Flow Chart

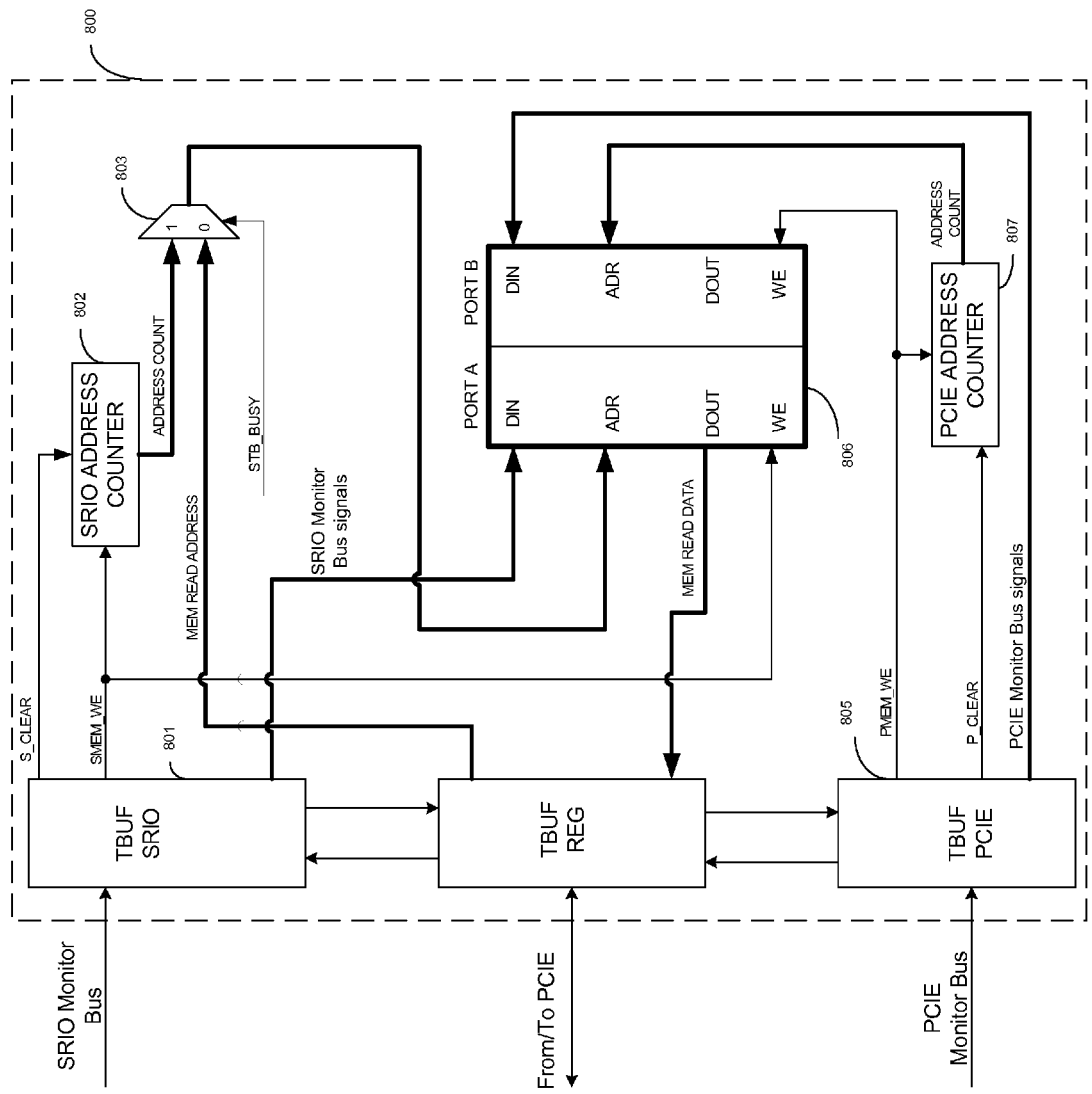

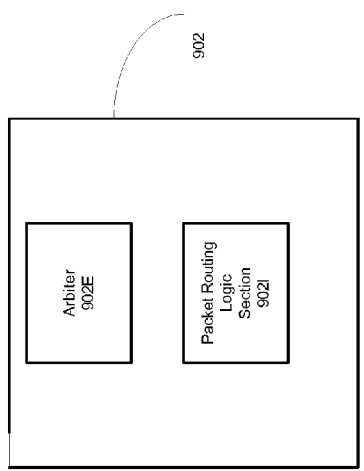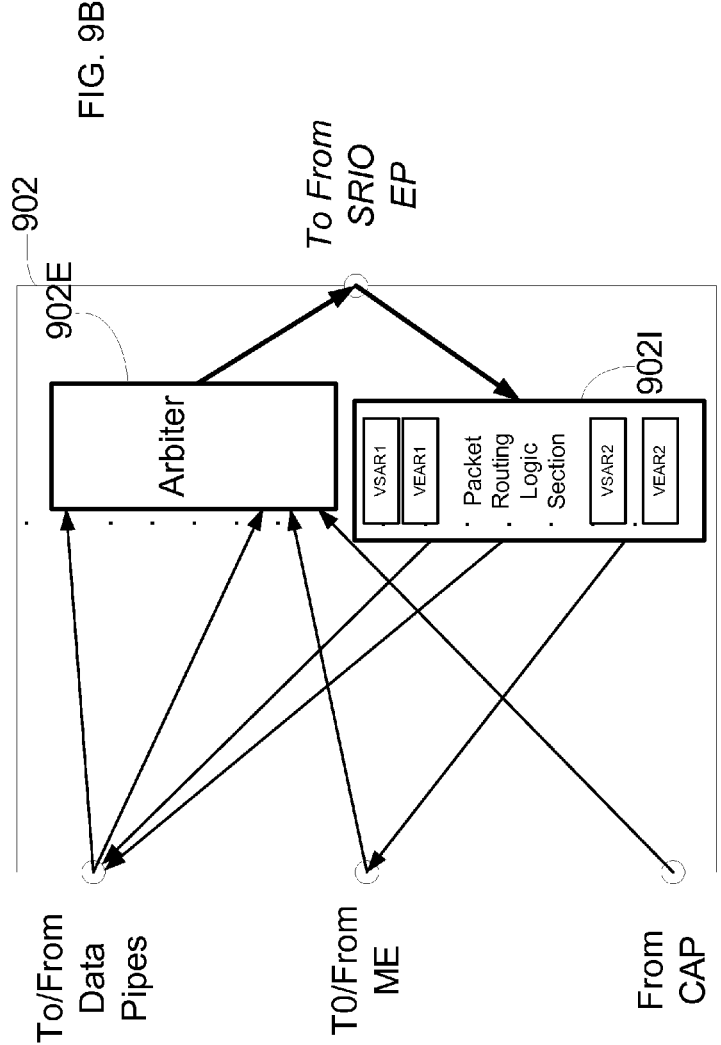

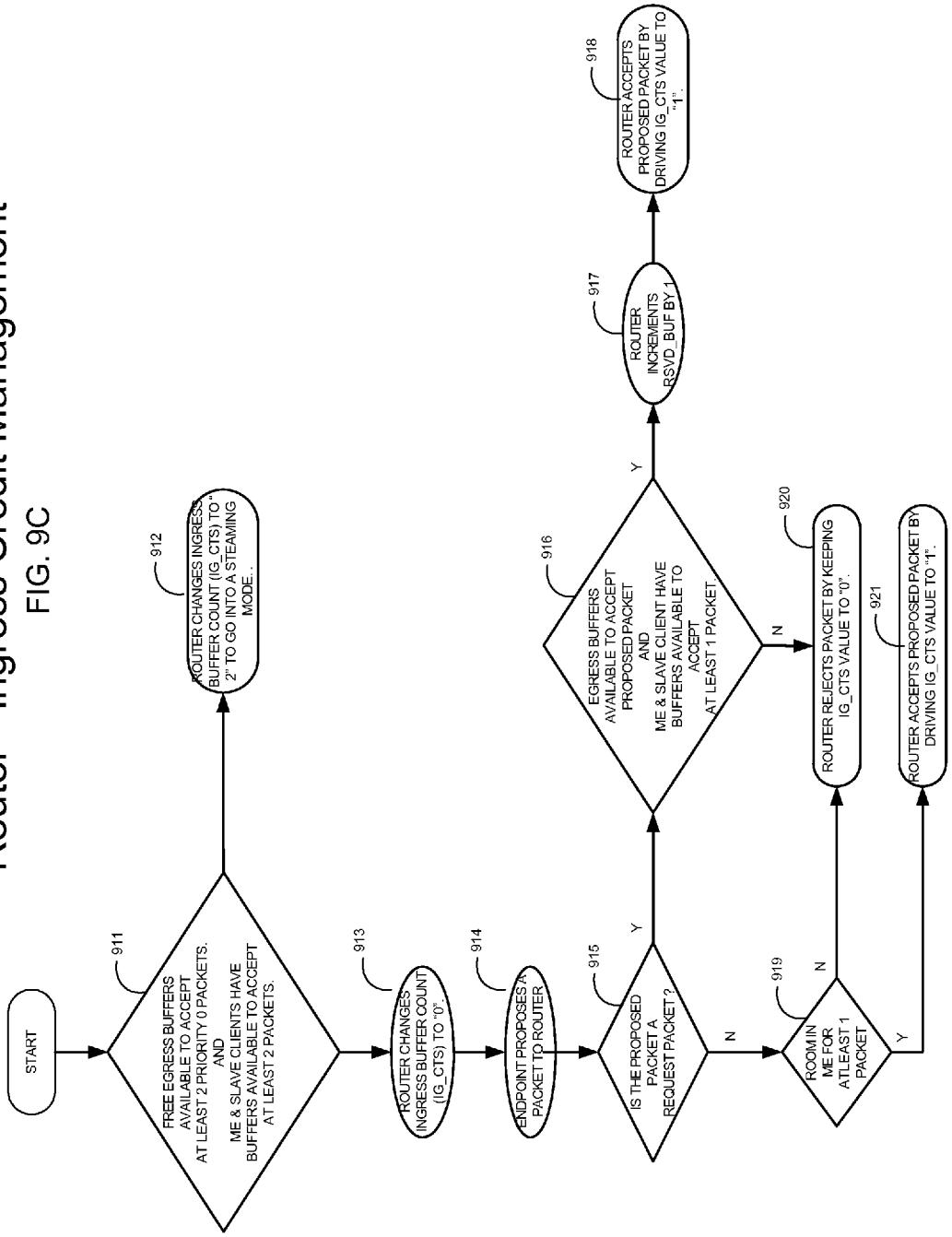
FIG. 9C Router - Ingress Credit Management

Router - Ingress Packet Routing

FIG. 9E

| FTYPE | TTYPE | DESCRIPTION | STORE FORWARD PATH OPERATION |
|---|---|---|---|
| 0 | 2-5 | 2 - MCMS64, 3 - MCMS128, 4 - ACM64, 5 - ACM128 | Packet routed to SDSA |
| 2 | 4 | NREAD | Packet routed to SIOP/SDSA |
| 5 | 5 | NWRITE_R Request | Packet routed to SIOP/SDSA |
| 8 | 0-4 | 0 - Maintenance Read request, 1 - Maintenance Write request, 2 - Maintenance Read Response, 3 - Maintenance Write Response, 4 - Maintenance Port Write request | Packet routed to Message Ring if ME bit is set. Otherwise the packet is routed to the Error Ring |
| 10 | ALL | Doorbell request | Packet routed to Message Ring if ME bit is set. Otherwise the packet is routed to the Error Ring |
| 11 | ALL | Message request | Packet routed to Message Ring if ME bit is set. Otherwise the packet is routed to the Error Ring |
| 13 | 0 | Response without Payload or Doorbell response, | Packet routed to Message Ring if ME bit is set. Otherwise the packet is routed to IOP/DSA |
| 13 | 1 | Message Response | Packet routed to Message Ring if ME bit is set. Otherwise the packet is routed to the Error Ring |
| 13 | 8 | Response with Payload | Packet routed to Message Ring if ME bit is set. Otherwise the packet is routed to IOP/DSA |
| 15 | 0 | Response without Payload | Packet Routed to DSA |
| 15 | 8 | Response with Payload | Packet Routed to DSA |

Packet Routing Table Based On FTYPE/TTYPE For SF Packets

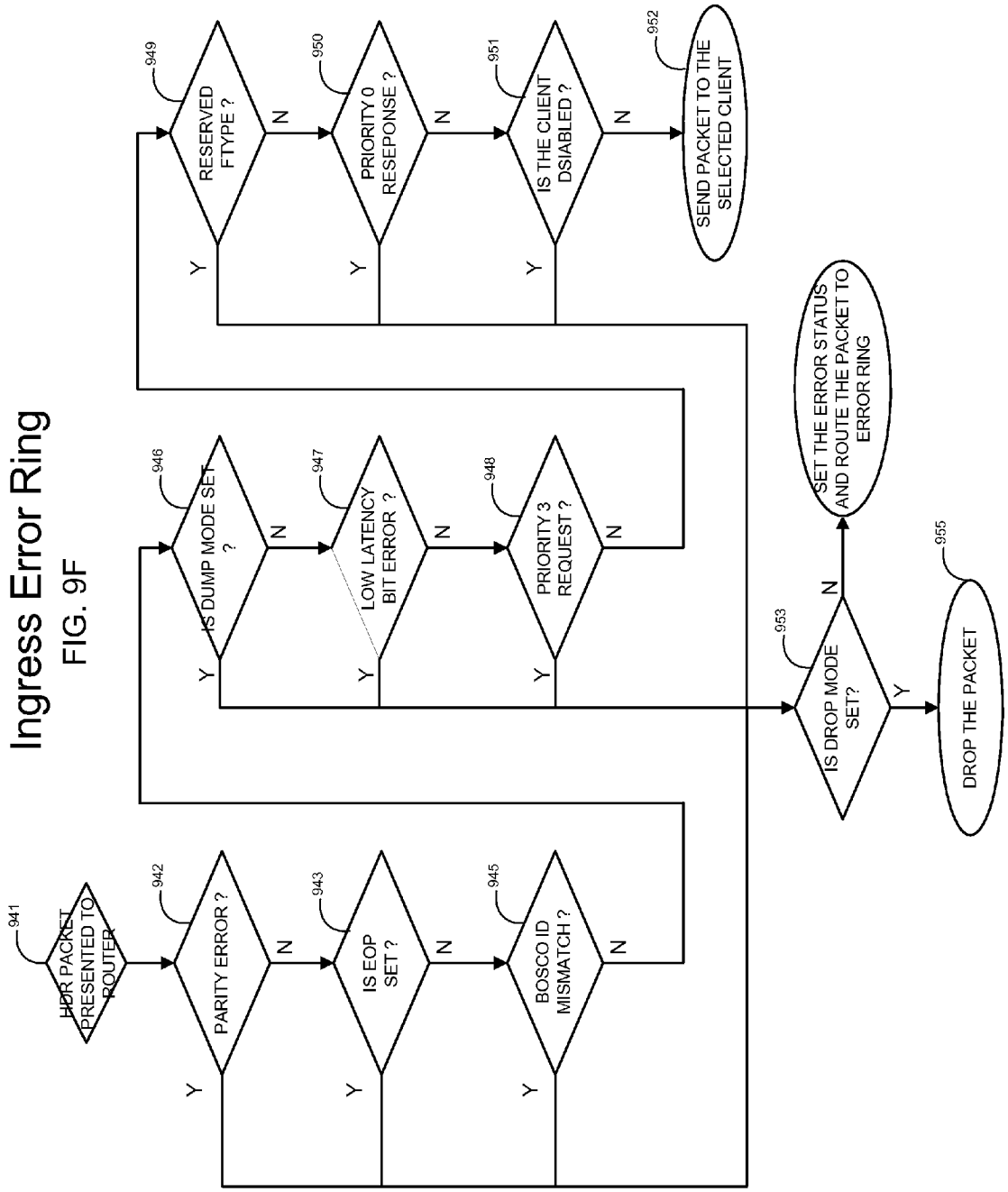

FIG. 9H

| Shuffle Code[3:0] | REQ I/O PIPE 0 | REQ I/O PIPE 1 | REQ I/O PIPE 2 | REQ I/O PIPE 3 | REQ I/O PIPE 4 | REQ I/O PIPE 5 | REQ I/O PIPE 6 | REQ I/O PIPE 7 | REQ SIOP | REQ ME OUTBOUND | REQ ME INBOUND | REQ CAP |
|---|---|---|---|---|---|---|---|---|---|---|---|---|
| 0  | 0 | 1 | 2 | 3 | 4 | 5 | 6 | 7 | 8 | 9 | 10 | 11 |
| 1  | 1 | 0 | 3 | 2 | 5 | 4 | 7 | 6 | 8 | 9 | 10 | 11 |
| 2  | 2 | 3 | 0 | 1 | 6 | 7 | 4 | 5 | 8 | 9 | 10 | 11 |
| 3  | 3 | 2 | 1 | 0 | 7 | 6 | 5 | 4 | 8 | 9 | 10 | 11 |
| 4  | 4 | 5 | 6 | 7 | 0 | 1 | 2 | 3 | 8 | 9 | 10 | 11 |
| 5  | 5 | 4 | 7 | 6 | 1 | 0 | 3 | 2 | 8 | 9 | 10 | 11 |
| 6  | 6 | 7 | 4 | 5 | 2 | 3 | 0 | 1 | 8 | 9 | 10 | 11 |
| 7  | 7 | 6 | 5 | 4 | 3 | 2 | 1 | 0 | 8 | 9 | 10 | 11 |
| 8  | 1 | 2 | 3 | 4 | 5 | 6 | 7 | 8 | 0 | 9 | 10 | 11 |
| 9  | 2 | 1 | 4 | 3 | 6 | 5 | 8 | 7 | 0 | 9 | 10 | 11 |
| 10 | 3 | 4 | 1 | 2 | 7 | 8 | 5 | 6 | 0 | 9 | 10 | 11 |
| 11 | 4 | 3 | 2 | 1 | 8 | 7 | 6 | 5 | 0 | 9 | 10 | 11 |
| 12 | 5 | 6 | 7 | 8 | 1 | 2 | 3 | 4 | 0 | 9 | 10 | 11 |
| 13 | 6 | 5 | 8 | 7 | 2 | 1 | 4 | 3 | 0 | 9 | 10 | 11 |
| 14 | 7 | 8 | 5 | 6 | 3 | 4 | 1 | 2 | 0 | 9 | 10 | 11 |
| 15 | 8 | 7 | 6 | 5 | 4 | 3 | 2 | 1 | 0 | 9 | 10 | 11 |

Client Requests ←→

Arbitration Priorities ←→

*Note: The Lowest priority is 0 & the highest priority is 11*

FIG. 9I
Router Error Status

| Bit Number | Description |
|---|---|
| 9 | Packet with simultaneous SOP and EOP. |
| 8 | Packet with ME bit not set correctly. |
| 7 | Packet with Header Parity error. |
| 6 | Packet with the DUMP mode set. |
| 5 | Packet for disabled client |
| 4 | Packet with Low Latency bit not set correctly. |
| 3 | Response packet with RIO priority of 0 |
| 2 | Device ID Mismatch |
| 1 | Request packet with RIO priority of 3. |
| 0 | Packet with reserved FTYPE/TTYPE combination. |

DATA STORAGE SYSTEM HAVING CPUS ADAPTED TO PERFORM A SECOND ATOMIC OPERATION REQUEST PRIOR TO COMPLETION OF A FIRST ATOMIC OPERATION REQUEST

TECHNICAL FIELD

This invention relates generally to data storage systems and more particularly to data storage systems having a host computer/server coupled to a bank of disk drives through a system interface, such interface having a plurality of storage processors (SPs) interconnected by a packet switching network.

BACKGROUND AND SUMMARY

As is known in the art, large host computers and servers (collectively referred to herein as "host computer/servers") require large capacity data storage systems. These large computer/servers generally include data processors, which perform many operations on data introduced to the host computer/server through peripherals including the data storage system. The results of these operations are output to peripherals, including the storage system.

One type of data storage system is a magnetic disk storage system having a bank of disk drives. The bank of disk drives and the host computer/server are coupled together through a system interface. The interface includes "front end" or host computer/server controllers (or storage processors) and "back-end" or disk controllers (or storage processors). The interface operates the storage processors in such a way that they are transparent to the host computer/server. That is, user data is stored in, and retrieved from, the bank of disk drives in such a way that the host computer/server merely thinks it is operating with its own local disk drive. One such system is described in U.S. Pat. No. 5,206,939, entitled "System and Method for Disk Mapping and Data Retrieval", inventors Moshe Yanai, Natan Vishlitzky, Bruno Alterescu and Daniel Castel, issued Apr. 27, 1993, and assigned to the same assignee as the present invention.

As described in such U.S. Patent, the interface may also include, in addition to the host computer/server storage processors and disk storage processors, a user data semiconductor global cache memory accessible by all the storage processors. The cache memory is a semiconductor memory and is provided to rapidly store data from the host computer/server before storage in the disk drives, and, on the other hand, store data from the disk drives prior to being sent to the host computer/server. The cache memory being a semiconductor memory, as distinguished from a magnetic memory as in the case of the disk drives, is much faster than the disk drives in reading and writing data. As described in U.S. Pat. No. 7,136,959 entitled "Data Storage System Having Crossbar Packet Switching Network", issued Nov. 14, 2006, inventor William F. Baxter III, assigned to the same assignee as the present invention, the global cache memory may be distributed among the service processors.

Another data storage system is described in U.S. Patent Application Publication No. US 2005/0071424, entitled DATA STORAGE SYSTEM, inventor Baxter III, published Mar. 31, 2005, assigned to the same assignee as the present invention. In such system, front and back end directors (hereinafter referred to as storage processors) include: a message engine, a data pipe and a portion of a global cache memory. The front and back end storage processors are interconnected through a packet switching network. The packet switch network passes both user data and messages, the user data passing through the data pipe and the messages being generated and received by the message engine. Write data supplied by the host computer/server for storage in the bank of disk drives is passed to the local cache memory section of one of the second plurality of storage processor/memory boards and the storage processor on such one of the second plurality of storage processor/memory boards controls the transfer of data from such one of the memory sections to the bank of disk drives. Read data supplied by the bank of disk drives for use by the host computer/server is passed to the local cache memory section of one of the first plurality of storage processor/memory boards and the storage processor on such one of the first plurality of storage processor/memory boards controls the transfer of data from such one of the memory sections to the host computer/server. The front-end and back-end storage processors control the transfer of user data between the host computer/server and the bank of disk drives through the packet switching networks in response to messages passing between and/or among the storage processors through the packet switching networks.

As is also known in the art, it is desirable to maximize user data transfer through the interface including maximized packet transfer through the packet switching network.

As is also known in the art, each one of the storage processors includes a CPU and a local/remote memory interconnected to the packet switching network through commercially available root complex, such as an INTEL root complex using a PCI-Express (PCIE) protocol. One such packet switching network operates with a Serial Rapid IO (SRIO) protocol and is sometimes referred to as an SRIO fabric. We have discovered that for certain system interfaces, greater system throughput can be achieved using an SRIO fabric. The benefits of SRIO over other packet switched protocols such as Ethernet for storage applications is that SRIO has guaranteed delivery (since every request has associated response), supports low latency applications (since maximum packet payload size is 256 bytes) while maintaining reasonable bandwidth (of about 1 Gbyte/sec per direction), and can be implemented in a low cost, structured ASIC designs since protocol complexity is minimal.

It should be noted that some SRIO terminology used herein may be found in the following references published by the RapidIO Trade Association:
Rapid IO Interconnect Specification, version 1.3
Rapid IO Interconnect Specification, Part VI: Physical Layer 1x/4xLP-Serial Specification;
some of the PCI terminology used herein may be found in the following references published by the PCI-SIG (Peripheral Component Interconnect Special Interest Group);
PCIE Express Base Specification, version 1.1; and
other terminology used herein may be found in INCITS: T10 Technical Committee on SCSI Storage Interfaces—Preliminary DIF (Block CRC) documents As is also known in the art, a DSA transfer is used for a CPU within a storage processor (SP) to indirectly access a local/remote memory in any SP on the packet switching network. More particularly, as used herein, a DSA transfer is "indirect" because in the present system the CPU is "detached" from the operation as soon as the DSA operation is initiated from the CPU. Once initiated, the CPU is free to perform other work (if there is work not dependent on a DSA in flight) until the DSA transfer is completed. When the DSA is completed, the DSA status and data (if applicable) is "pushed" into the initiating, or source SP's local memory and an interrupt generated to the initiating CPU for completion notification. (Polling of the DSA status word in local memory is also possible for absolute lowest latency when no forward progress can be made until the DSA transfer is completed).

However, existing SRIO fabrics do not support DSA or atomic transfers with commercially available root complexes. More particularly, PCI-Express (PCIE) standard does not directly support atomic operations and the RIO standard support for atomic operations is limited.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 4A is a block diagram of a master DSA pipe used in the DSA section of FIG. 4 according to the invention;

FIG. 4B is a block diagram of a Slave DSA (SDSA) used in the DSA section of FIG. 4 according to the invention;

FIG. 4D is shows the primary address format of a packet used in the data storage system of FIG. 1;

FIG. 4E shows a PCI setup packet packetized into an SRIO request packet used in the packet switching network of the system of FIG. 1;

FIG. 4F shows an SRIO response packet packetized into a PCIE status packet used in the packet switching network of the system of FIG. 1;

FIG. 4G shows a PCIE address of a PCIE packet mapped into an SRIO request header used in the packet switching network of the system of FIG. 1;

FIG. 4H shows a DSA cache set up format;

FIG. 4I is a flowchart of an DSA atomic operation performed by the system of FIG. 1 according to the invention;

FIG. 4J is a flowchart of an egress cut-through process performed by the system of FIG. 1 according to the invention;

FIG. 4K shows the flow of an SRIO request packet to a PCIE write/read to an SRIO response packet performed by the system of FIG. 1 according to the invention;

FIG. 4L shows a DSA cache response format used by the system of FIG. 1 according to the invention;

FIG. 4M is a flowchart of the process performed by a slave DSA of FIG. 4B according to the invention;

FIG. 4N is a flowchart of an ingress cut through process used by a DSA of FIG. 4A according to the invention;

FIG. 4P is a flowchart showing a process wherein a plurality of buffers in a DSA buffer section of the DSA of FIG. 4A stores a corresponding one of a plurality of DSA packets and independently transmit such packets from the buffers to the packet switching network a plurality of buffers according to the invention;

FIG. 4Q is a flowchart of a process used by a DSA of FIG. 4A to perform an atomic operation range check according to the invention;

FIG. 6 is a block diagram of a message engine (ME) used in the PCIE/SRIO protocol controller of FIG. 3 according to the invention;

FIG. 6A is a block diagram of the egress ME portion of the ME of FIG. 6;

FIG. 7A is a flowchart of the process used by the CAP of FIG. 7;

FIG. 8 is a block diagram of a trace buffer used in the of a PCIE/SRIO protocol controller of FIG. 3;

FIGS. 9A and 9B are block diagrams of an exemplary one of a plurality of routers used in used in the PCIE/SRIO protocol controller of FIG. 3;

FIG. 9C is a flowchart of ingress credit management used by the router of FIG. 9B;

FIG. 9E shows a packet routing table used by the router of FIG. 9B based on FTYPE/TTYPE for store forward (SF) packets;

FIG. 9F is a flowchart used by an ingress error ring used in the ME ingress of FIG. 6B;

FIG. 9H show shuffle codes for the shuffle arbiter of the arbiter of FIG. 9B; and FIG. 9I shows the contents of an error status used in the ME ingress of FIG. 6B.

Like reference symbols in the various drawings indicate like elements.

DETAILED DESCRIPTION

Figure 1:
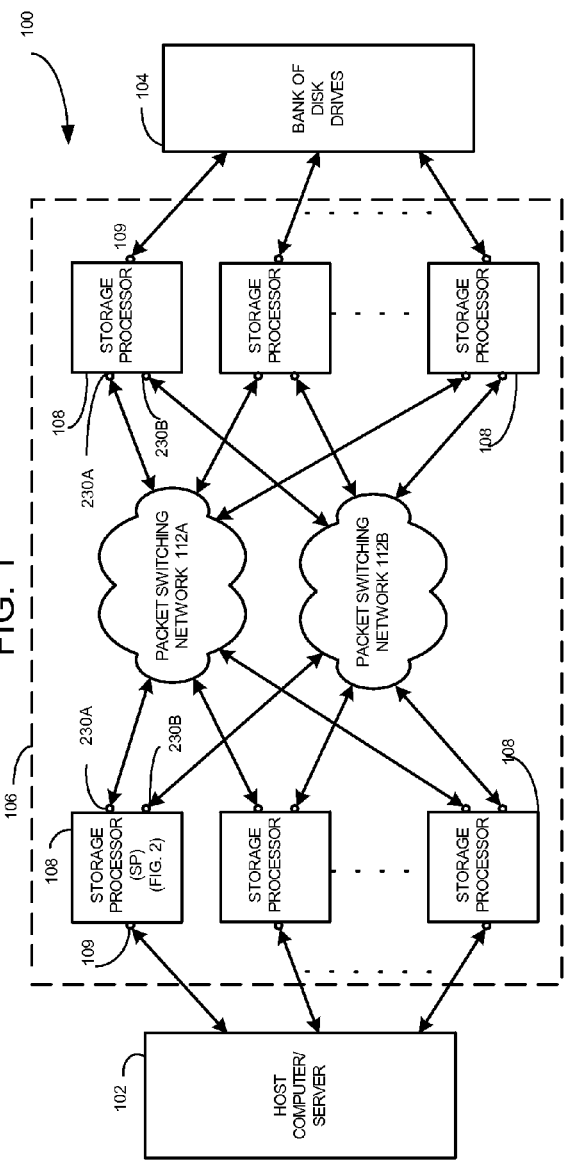
FIG. 1 is a diagram of a data storage system having an interface coupled between a host computer/server and a bank of disk drives, such interface having a plurality of storage processors (SPs), one portion of the SPs being coupled to the host computer/server and another portion of the SPs being coupled to the bank of disk drives, the plurality of SPs being interconnected through a pair of packet switching networks according to the invention.

Referring now to FIG. 1 a data storage system 100 is shown having a host computer/server 102 coupled to a bank of disk drives 104 through a system interface 106. The system interface 106 includes front end storage processors (SPs) 108 connect to the host computer/server 102 and back end storage processors 108 connected to the bank of disk drives 104. Each one of the SPs 108 and 108 is identical in construction, an exemplary one thereof, here one of the front end SPs 108, being shown in more detail in FIG. 2.

The front end and back end storage processors 108 (FIG. 1) are interconnected through a pair of redundant packet switching networks 112A, 112B. Further, as will be described herein, a global cache memory 114 (FIG. 2) is made up of a plurality of global cache memory sections, each one of the global cache memory sections being distributed in a corresponding one of the front and back end storage processors 108.

The front-end and back-end storage processors 108 (FIG. 1) control the transfer of user data (sometimes referred to as host/server or customer data) between the host computer/server 102 and the bank of disk drives 104 through the packet switching networks 112A, 112B in response to messages passing between and/or among the storage processors 108 through the packet switching networks 112A, 112B. Here, the packet switching networks 112A, 112B transfer packets of user data, messages, maintenance packets and DSA transfers, to be described, using a SRIO protocol.

Figure 2:
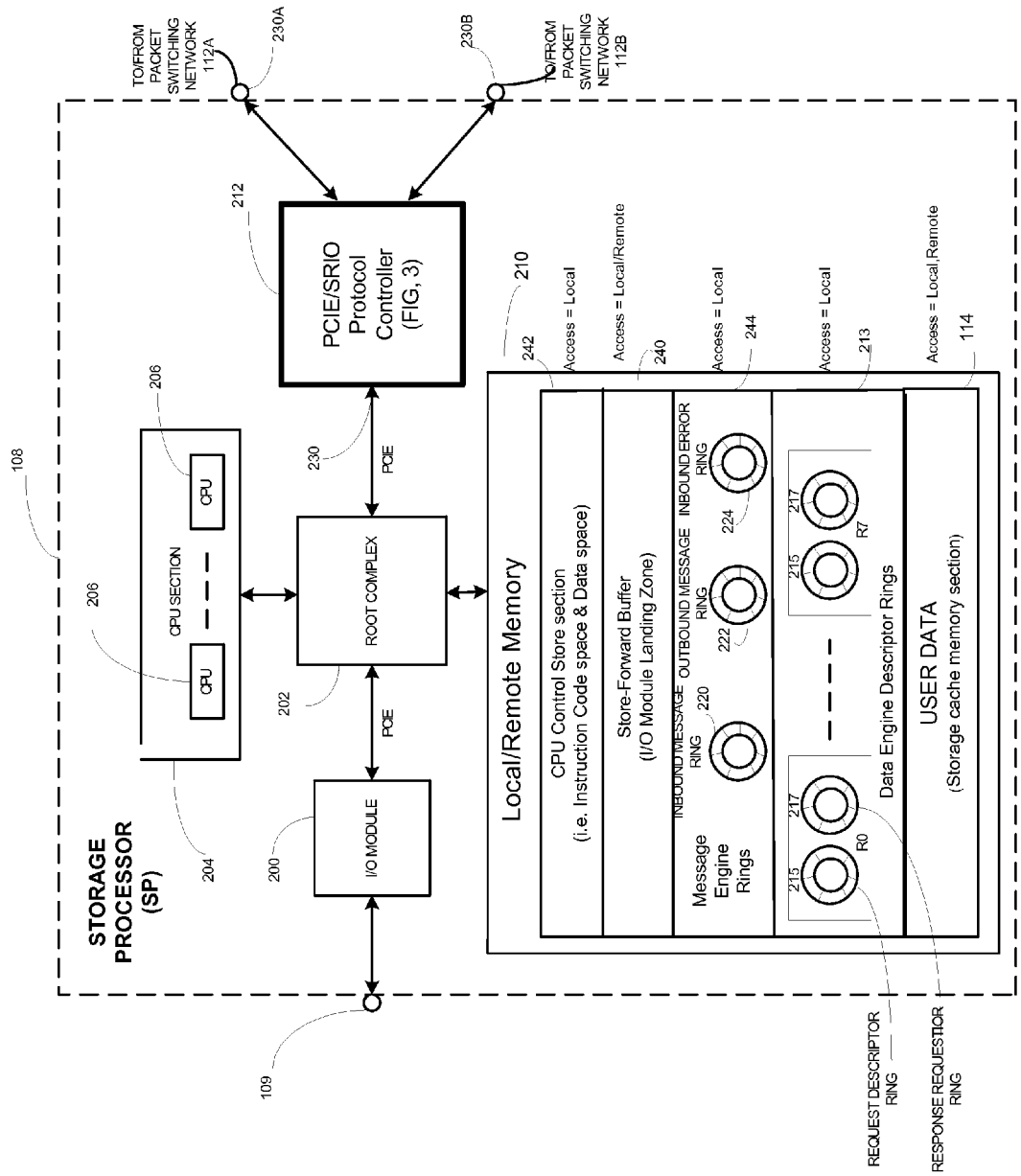
FIG. 2 is a block diagram of an exemplary one of a plurality of storage processors used in the data storage system of FIG. 1.

As noted above, each one of the front end and back end storage processors 108 is identical in construction, an exemplary one thereof being shown in more detail in FIG. 2 to include an I/O module 200 connected via port 109 (FIGS. 1 and 2), in the case of a front end storage processor 108, to the host computer/server 102 and in the case of a back end storage processor 108 connected to the bank of disk drives 104, as indicated in FIG. 1. The I/O module 200 (FIG. 2) is connected to a commercially available root complex 202, here, for example, an Intel root complex. Also connected to the root complex 202 is a CPU section 204 having a plurality of central processing units (CPUs) 206; a local/remote memory 210; and a PCIE/SRIO Protocol Controller 212, to be described in more detail in connection with FIG. 3. Suffice it to say here that the PCIE/SRIO Protocol Controller 212, among other things, converts between the Serial Rapid Input/Output (SRIO) protocol used by the packet switching networks 112A, 112B, and the PCIE protocol used by the CPUs 206, and the I/O module 200. The PCIE/SRIO Protocol Controller 212 is connected to the root complex 202 via port 230 and is connected to pair of packet switching networks 112A, 112B (FIG. 1) via ports 230A, 230B, respectively, as indicated.

The local/remote memory 210 has: a section of a global cache memory 114 (i.e., a cache memory section) as described in the above referenced U.S. Pat. No. 7,136,959, for storing user data; a bank of plurality of descriptor rings 213, here for example 8 pairs of descriptor rings (one of the rings in a pair is a request ring 215 and the other one of the rings is a response ring 217); a message engine ring section 244 which contains inbound message ring 220 (FIG. 2); an outbound message ring 222 (FIG. 2); an error ring 224; a CPU control store section 242 which contains the CPU's instructions and data space; and a store-forward buffer which acts as a temporary buffer for user data from the IO Module 200 before it is moved to global cache memory. Further, while the local/remote memory 210 will be described in more detail, it should first be noted that when the local/remote memory 210 stores in user data section 114 user data for it's own storage processor 108 it may be considered as "local" memory whereas when the local/remote memory is storing user data in section 114 for other ones of the storage processors 108 it may be considered as "remote" memory.

The local/remote attributes are shown to the right of local/remote memory 210 on FIG. 2. The areas of memory that are marked as 'local' can only be accessed by the local SP. Remote SP's are blocked from accessing these local data structures to reduce the chance of corruption. The access protection mechanism is described later. Areas of memory that are labeled 'local/remote' can be accessed from the local SP or a remote SP over the packet switching network.

The data stored in local/remote memory 210 is also protected from accidental overwrite (and accidental data overlays). End-to-end protection of data from the host to disk in this case is managed with higher level data protections such as T10 standard DIF CRC protection (see INCITS: T10 Technical Committee on SCSI Storage Interfaces—Preliminary DIF (Block CRC) documents) which is supported in the PCIE/SRIO Protocol Controller 212, Data pipe section 500 (FIG. 3, to be described in connection with FIG. 5). Unique LBA (logical block addresses) provide overlay protection while the DIF CRC provides for overwrite protection.

Figure 3:
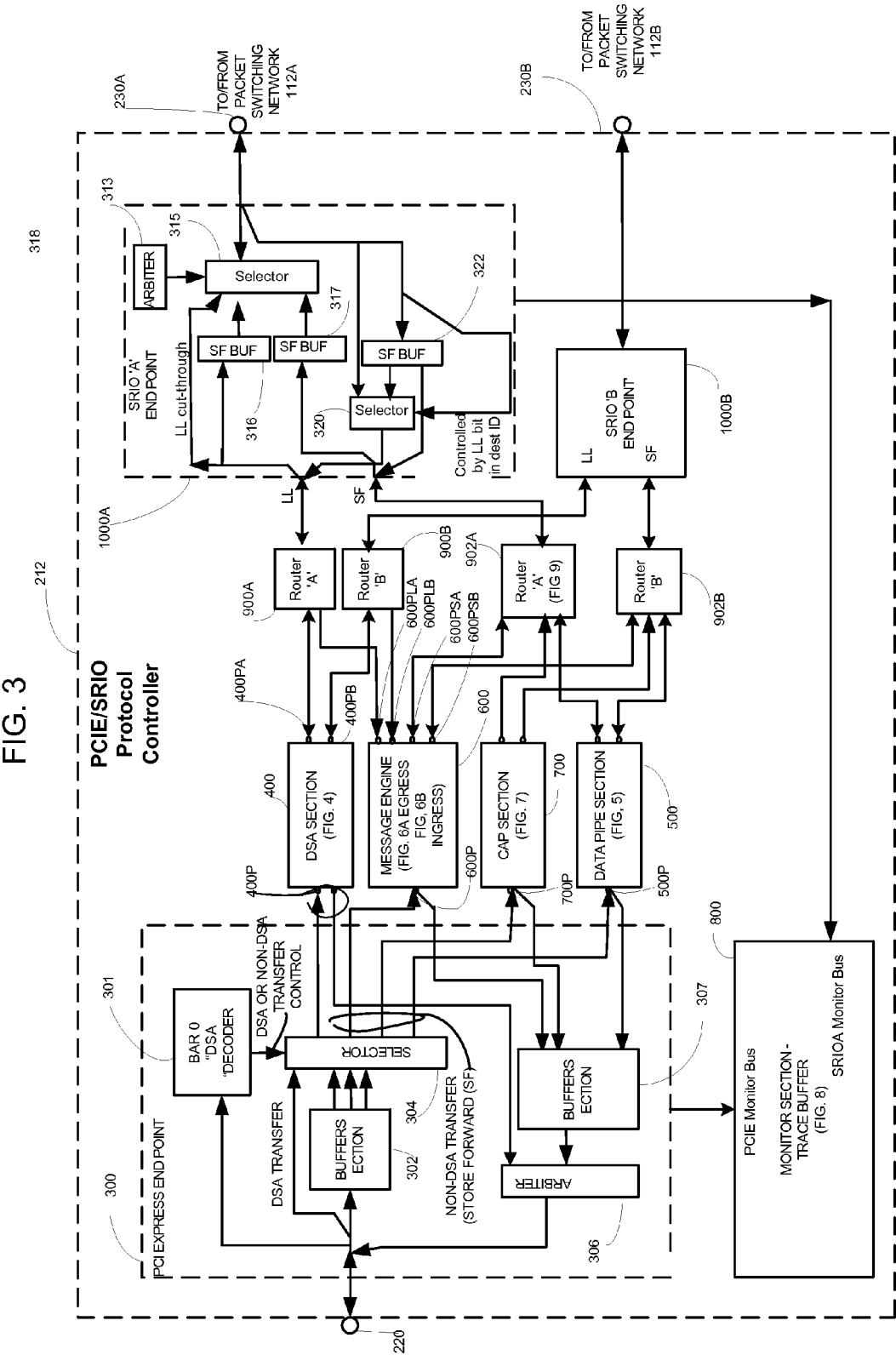
FIG. 3 is a block diagram of a PCIE/SRIO protocol controller used in the storage processor (SP) of FIG. 2 according to the invention.

Referring now to FIG. 3, the PCIE/SRIO Protocol Controller 212 is shown in more detail to include a PCIE Express (PCIE) endpoint 300 connected to the root complex 202 (FIG. 2) through port 220 for passing PCIE protocol information between the PCIE/SRIO Controller 212 and the root complex 202. Connected to the PCIE Express (PCIE) endpoint 300 are: a DSA section 400, to be described in more detail in connection with FIG. 4; the data pipe section 500 to be described in more detail in connection with FIG. 5, a message engine 600, to be described in more detail in connection with FIG. 6; a CPU Access Port (CAP) section 700 through which the CPUs send maintenance packets and which will described in more detail in connection with FIG. 7; and a monitoring section 800 having a trace buffer, to be described in more detail in connection with FIG. 8.

Before describing the PCIE End Point 300, it should be noted that message packet, user data packet and maintenance packet transfers from the local/remote memory 210 (FIG. 2) to the PCIE/SRIO Controller 212 are referred to as store forward (SF) transfers and transfers directly from the CPU 204 which by-pass the local/remote memory 210 are low latency or DSA transfers.

Referring now to the PCIE End Point 300, packets sent to the packet switching networks (egress) are fed by the root complex 202 (FIG. 2) to port 220. A Base Address Register (BAR 0) "DSA decoder" 301 examines the packet to determine whether it is a DSA transfer (i.e., DSA request) or a non-DSA transfer. If it is a DSA request, the packet passes directly to a selector 304 and then to port 400P of the DSA section 400. On the other hand, if the decoder 301 determines that the packet is not a DSA request, the packet passes through a buffer 302 and then to the selector 304. The non-DSA packet is then fed to either the message engine 600, the CAP section 700, or the data pipe section 500. For ingress packets from the packet switching networks 112A, 112B to the root complex 202, the packets from the DSA section 400 pass directly to an arbiter 306 and the to port 220 while the non-DSA packets pass to a buffer section 307 prior to passing to the arbiter 306. The arbiter 306 determines if there is ample credit on link 220 (i.e., packet buffer availability in the root complex 202) to send a packet to the root complex 202 and selects between the buffered non-DSA requests and DSA section 400 requests. The DSA section 400 requests are always treated as highest priority to minimize DSA latency. After the arbitration, the selected packet is presented to port 220.

Referring to FIG. 3, the DSA section 400 (FIG. 4) is connected to: the first one of the pair of switching networks 112A via port 230A through an SRIO Router 900A and SRIO "A" end point 1000A; and the second one of the pair of switching networks 112B via port 230B through an SRIO Router 900B and SRIO "B" end point 1000B.

Similarly, the message engine 600 (FIG. 3) is connected to: the first one of the pair of switching networks 112A (FIG. 1) via port 230A through the SRIO Routers 900A, 902A and SRIO "A" end point 1000A, as shown in FIG. 3; and the second one of the pair of switching networks 112B via port 230B through the SRIO Router 900B, 902B and SRIO B end point 1000B.

The CAP section 700, and data pipe section 400 is connected to: the first one of the pair of switching networks 112A via port through the SRIO Router 902A and the SRIO A end point 1000A; and the second one of the pair of switching networks 112B via port 230B through the SRIO Router 902B and SRIO B end point 1000B.

The SRIO "A" and "B" end points 1000A and 1000B are identical, end point 1000A being shown in more detail in FIG. 3 to have two ports; a low latency (LL) port and a store forward (SF) port. The LL ports of end points 1000A, 1000B are connected to ports 400PA and 400PB, respectively of the DSA section 400 through SRIO Router A 900A and SRIO Router B 900B, respectively, as indicated. Reference is made to copending U.S. patent application entitled "PACKET SWITCHING NETWORK END POINT CONTROLLER", inventors Alexander Y. Aronov, Stephen D. MacArthur, Michael Sgrosso, and William F. Baxter III, Ser. No. 11/022, 998, filed Dec. 27, 2004, assigned to the same assignee as the present invention the entire contents thereof being incorporated herein by reference.

Considering egress of packets to the packet switching networks, 112A, 112B, the LL port is connected directly to a selector 315 through a LL cut-through path, as indicated, and is also connected to the selector 315 through a store forward (SF) buffer 316, as shown. An arbiter 313 controls the operation of the selector 315. The arbiter 313 selects the LL cut-through path whenever the SF Buffer 316 is empty, and if the transmitter (TX) link (i.e., port 230A, 230B) is idle. If the TX link is not idle, then DSA packets are stored within store forward (SF) buffer 316. The output of the selector 315 is connected to the packet switching network 112A in the case of end point 1000A and packet switching network 112B in the case of end point 1000B, as indicated.

Considering ingress where packets are received from the packet switching networks 112A, 112B, such packets pass to a selector 320 directly and also to such selector 320 through a store forward (SF) buffers 322, as indicated. The selector 320 is controlled by the incoming packet (i.e., the destination ID field contains a low latency (LL), store-forward (SF) path select bit) to pass low latency incoming packets directly to the LL port bypassing SF buffer 322 and to pass store forward packets to the SF port after passing through the SF buffer 322. The ingress packet on the SF port then passes to SRIO Router A 902A or SRIO Router B 902B, as the case may be, and then to the message engine 600, or the data pipe section 500. The ingress packet on the LL port then passes to SRIO Router 900A or SRIO Router 900B, as the case may be, and then to the DSA Section 400.

Figure 1B:
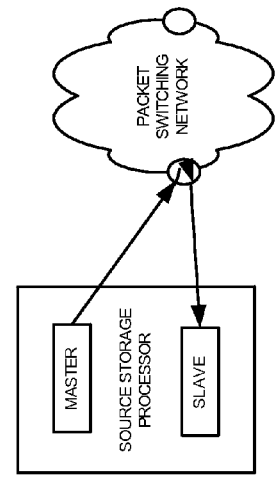
FIG. 1B is a diagram showing master and slave portions of the same one of the SPs of FIG. 1 interconnected through one of the packet switching networks.
Figure 1A:
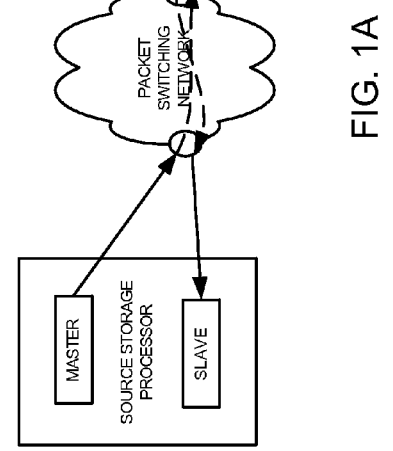
FIG. 1A is a diagram showing master and slave portions of an exemplary pair of the SPs of FIG. 1 interconnected through one of the packet switching networks, one of the SPs being a source SP and the other being a destination SP.

As noted above, and referring again to FIG. 1, packets are transmitted between storage processors (SPs) 108 through a packet switching network 112A, 112B. Thus, the one of the SPs producing a request packet for transmission may be considered as a source SP 108 and the one of the SPs receiving the transmitted request packet may be considered as the destination SP 108, as shown in FIG. 1A. More particularly, when the request packet is transmitted from the source SP 108 requesting execution of such transmitted packet by the destination SP 108, the components in the source SP 108 are sometimes herein referred to as master components and the components in the destination SP 108 may be considered as a slave components, as shown in FIG. 1A. It is noted from FIG. 1A that any one of the SPs 108 may be acting for one packet as a source SP for that packet and may be acting for a different packet as a destination SP 108; in the former case, the components are master components and in the later the components are slave components. As shown in FIG. 1A, when a request packet is sent from one SP 108 to the network for execution by the same SP 108, during transmission of the packet the components are acting as master components and during receipt of the request packet, the components are acting as slave components. This same master/slave concept applies for DSA transfers, as shown in FIG. 4C and for user data transfers, as shown in FIG. 5C. Thus, as shown in FIG. 4C, the DSA section 400 (FIG. 4) includes a master DSA section 400M (to be described in more detail in connection with FIG. 4A) and a slave DSA 400S (to be described in more detail in connection with FIG. 4B). Likewise, the data pipe section 500 (FIG. 5A) includes within each one of the data pipe groups 502A, 502B, a slave data pipe 506 (i.e., SIOP) to be described in more detail in connection with FIGS. 5 and 5E, and here eight data pipes (I/O Pipes that may be considered as master data pipes) 502 to be described in more detail in connection with FIG. 5A.

It might be noted here that there are two transfer planes: an I/O transfer plane wherein user data is transferred from the host computer/server 102 (FIG. 1) and the bank of disk drives 104 through the data pipe section 500 (FIG. 3) in the storage processors 108, 108; and a control plane wherein control information used to control the user data flow through the system interface 106 (FIG. 1). The control plane includes three types of transfers: (a) messaging for transferring control messages via the message engine 600 (FIG. 3) among the storage processors 108, such messages indicating, for example, the one or ones of a plurality of disk drives in the bank of disk drives is to store the user data; and (b) DSA (Direct Single Access) transfers controlled by the CPU; and (c) maintenance packets, for example, used to configured routing tables within the packet switching networks.

As noted above, message packet, user data packet and maintenance packet transfers from the local/remote memory 210 (FIG. 2) to the PCIE/SRIO protocol controller 212 are referred to as store forward (SF) transfers and transfers directly from the CPU 204 which bypass the local/remote memory 210 are low latency or DSA transfers. As will be described, a DSA transfer by-passes the data pipe section 500 and message engine 600 in both the source storage processor 108 and the destination storage processors 108 and passes, in effect, from the CPU 204 of the source storage processor 108, through a master DSA 400M (FIGS. 4, 4A and 4C), through one of the two packet switching networks 112A, 112B (FIG. 4A) to a slave DSA 400S (FIG. 4, 4B and FIG. 4C) of the addressed one of the destination storage processors 108 without passing through the local/remote memory 210 of the source storage processor 108. The slave DSA 400S at the destination storage processors 108 controls the operation of the specified atomic operation requested by the source storage processor 108 and reports the status of the atomic operation back through the packet switching network to the master DSA 400M of the source storage processor 108. The master DSA 400M of the source storage processor 108 then passes the status of the DSA transfer into the local/remote memory 210 of the source storage processor 108. Finally, the master DSA 400M of the source storage processor 108 sends a completion interrupt to the CPU 204 of the source storage processor 108.

As will be described, the DSA section 400 is used for low latency transfers of, for example, atomic operations. For the case of no congestion, a DSA can efficiently bypass several store-forward packet buffers, to be described in more detail in connection with FIG. 4A which reduces latency significantly. For example in a typical store-forward implementation, a packet is completely stored and error checked before being "forwarded" to the upstream module. Typically, a SF buffer consumes two clocks (one associated with loading the buffer, one for unloading) for every "word" transferred. The penalty for bypassing a SF packet buffer is that the upstream module can receive errant packets that may contain, for example, CRC link errors. In conventional packet switched designs, errant packets are dropped (and retried) and the upstream modules only receive error free packets. Additional complexity is needed when bypassing SF buffers since now the upstream logic must drop the packet (but the retry is still done at the physical link layer). DSA transfers are described in U.S. Pat. No. 6,594,739 entitled "Memory System and Method of Using Same", inventors Walton et al., issued Jul. 15, 2003; U.S. Pat. No. 6,578,126, entitled "Memory System and Method of Using Same", inventors MacLellan et al., issued Jun. 10, 2003; and entitled "Memory System and Method of Using Same", inventors Walton et al., issued Apr. 19, 2005 all assigned to the same assignee as the present invention, the subject matter thereof being incorporated herein by reference.

As noted above, the data pipe section 500 and message engine 600 will be described in more detail in connection with FIGS. 5 and 6, suffice it to say here that the message engine 600 passes messages generated by the CPU section 204 (FIG. 1) in one of the storage processors (SPs) 108 to one or more of the storage processors SPs 108 via either one of the packet switching networks 112A, 112B (FIG. 1) to facilitate control of the user data passing between the bank of disk drives 104 (FIG. 1) and the host computer/server 102 via the system interface 106; more particularly, as the user data passes through the data pipe sections 502A, 502B (FIG. 5) of the front and back end storage processor 108 (FIG. 1) via one or both of the packet switching networks 112A, 112B (FIG. 1).

Figure 4:
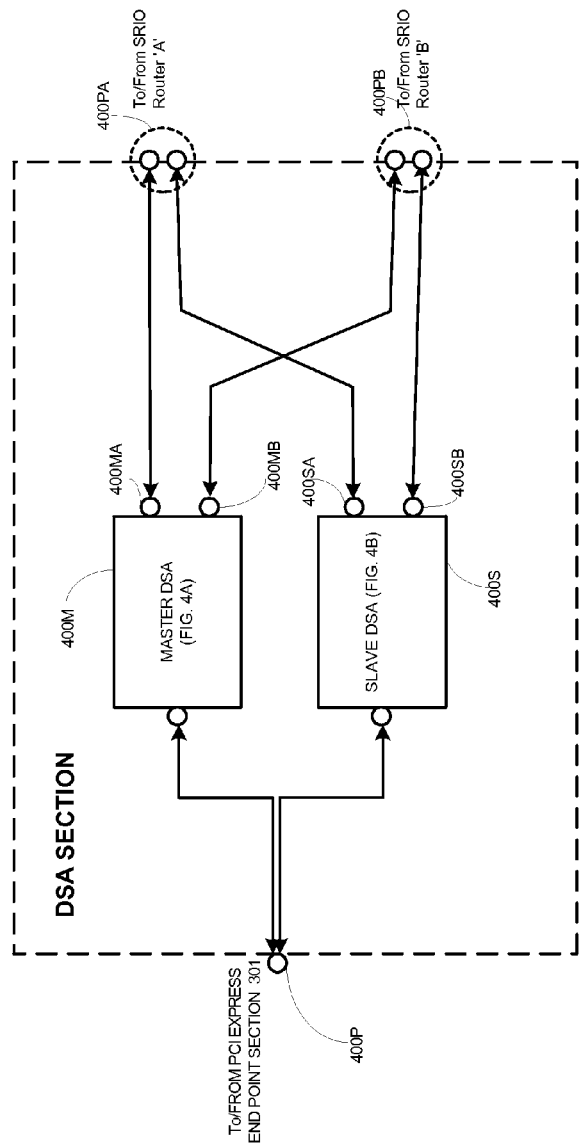
FIG. 4 is a block diagram of a DSA section used in the PCIE/SRIO protocol controller of FIG. 2 according to the invention.
Figure 4C:
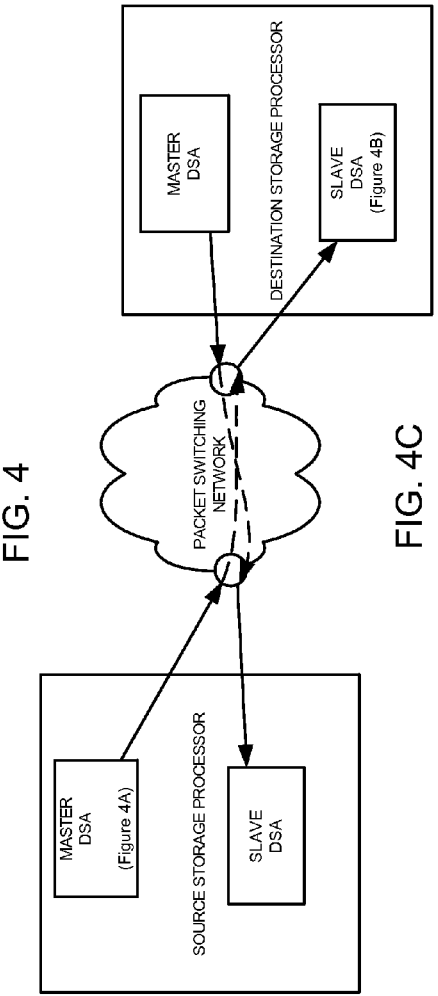
FIG. 4C is a diagram showing a pair of SPs of FIG. 2 interconnected through a packet switching network, such each of the SPs having a master DSA and a slave DSA of FIGS. 4B and 4C, respectively, according to the invention.

DSA Section 400 (FIG. 4)

As described above, a DSA transfer is used for a CPU 206 (FIG. 2) (referred to herein as a CPU core within the CPU section 204 of a storage processor (SP) 108) to indirectly access a local or remote memory 210 in any SP on the packet switching network 112A. 112B. A DSA transfer is "indirect" because in the present system the CPU 206 is "detached" from the operation as soon as the DSA operation is flushed from a buffer (not shown) internal to the CPU core 206.

Referring to FIGS. 3 and 4, the DSA section 400 is connected between: the PCIE End Point section 300 via port 400P; and to the pair of packet switching networks 112A, 112B (FIG. 1) through the pair of SRIO Routers 900A, 900B respectively as described briefly above. More particularly, the DSA section 400 has a port 400PA connected to the SRIO Router "A" router 900A and a port 400PB connected to the SRIO Router "B" 900B. The SRIO Router "A" 900A is connected to the packet switching network 112A through SRIO "A" end point 1000A and the router SRIO Router "B" 900B is connected to the packet switching network 112B through SRIO "B" end point 1000B, as shown and as described above.

Further, the DSA section 400 of each one of the storage processors (SPs) 108 includes, as noted above, the master DSA 400M and the slave DSA 400S (FIG. 4). Thus, referring briefly again to FIG. 4C, it is noted that a DSA request from a source storage processor 108 is sent through a master DSA 400M to a slave DSA 400S in a destination storage processor 108 through one of the pair of packet switching networks 112A or 112B. Thus, while the master DSAs 400M of each one of the storage processors is identical and each of the slave DSAs 400S of each one of the storage processors are identical, here we will describe the operation of a DSA transfer by considering it initiated through the master DSA 400M of a source storage processor 108 to the slave DSA 400S of a destination storage processor 108.

Referring again to FIG. 4, the master DSA 400M has a port connected to the port 400P of the DSA section 400 (which is connected to the PCIE End Point 300) and a pair of ports 400MA and 400MB. The port 400MA is connected via port 400PA to the switching network 112A as described above, and the port 400MB is connected via port 400PB to the switching network 112B as described above. Likewise, the slave DSA 400S has a port connected to the port 400P of the DSA section 400 and a pair of ports 400SA and 400SB. The port 400SA is connected via port 400PA to the switching network 112A as described above, and the port 400SB is connected via port 400PB to the switching network 112B as described above.

As shown in flowchart FIG. 4I, a DSA request is initiated by one of the CPUs 206 (FIG. 2) in the source storage processor 108 (FIG. 2), by assembling a data structure referred to as a DSA cache setup that defines the DSA operation to be performed (e.g. Add with carry mask) with the appropriate parameters (e.g. address to perform DSA operation on). The DSA cache setup must be completely assembled within the CPU Core 206 cache, not shown, before it is sent (e.g. flushed by the CPU) to the root complex 202 (FIG. 2) and finally to the DSA section 400 (FIG. 3) within the PCIE/SRIO Controller 212, Step 4000. The content and format for the DSA cache setup is contained in FIG. 4H. The DSA request which contains the DSA cache setup is formatted as a PCIE memory write request by the root complex 202 (FIG. 2) with the format shown in FIG. 4E when it arrives as an input to the PCIE/SRIO Controller 212, PCIE end point 300 (port 230).

Next, the CPU 204 (FIG. 2) waits until the DSA setup is flushed, Step 4002 while the DSA request is processed, Steps 4004 through 4012. Thus, in Step 4004 the DSA atomic operation request is encoded from PCIE format to SRIO format in the packetizer 414 (FIG. 4A). Next, the SRIO formatted packetized request is sent to the packet switching network 112A, 112B where it is forwarded to the destination storage processor 108, Step 4006, see FIG. 4C. The slave DSA (SDSA) 400S (FIGS. 4B and 4C) receives the packet at port 230A or 230B (with packet format shown in FIG. 4E) of the PCIE/SRIO Controller 212, FIG. 3) at the destination storage processor 108. The received packet passes to port LL of the receiving one of the end points 1000A, 1000B (FIG. 3) then through one of the SRIO Router "A" 900A or SRIO Router "B" 900B to either port 400PA or 400PB of the DSA section 400. Referring to FIGS. 4 and 4B, the received packet passes to either port 400SA or 400SB of the slave DSA 400S. Next, as shown in FIG. 4I, the slave DSA 400S executes the atomic operation, Step 4008. The slave DSA 400S then assembles and encodes the atomic SRIO response and returns it to the master DSA 400M of the source storage processor 108, Step 4010, see FIG. 4C. The master DSA 400M of the source storage processor 108 writes a DSA status and old data to the local memory 210 (FIG. 2), Step 4012 and notifies the CPU 204 of the source storage processor 108 of the status of its DSA request, Step 4012. The CPU 204 checks the completion of the request, Step 4014 and the CPU 204 is available to initiate a new DSA request.

More particularly, the DSA request (i.e. a PCIE memory write) is fed through the root complex 202 (FIG. 2) to port 230 of the PCIE/SRIO Controller 212, by-passing the local/remote memory 210 (FIG. 2). The DSA request at port 230 is fed through the PCI End Point 300 (FIG. 3) to port 400P bypassing the "buffer section" 302 (FIG. 3) as shown through the selector 304 path labeled "DSA Transfer". The low latency DSA transfer path is used to bypass the conventional store forward (SF) packet buffers 302 used for user data, maintenance, and message packet transfers. Low latency transfers through a PCIE End Point are described in more detail in co-pending U.S. patent application Ser. No. 10/846,386, filed May 14, 2004, inventors Davis et al., assigned to the same assignee as the present invention, the subject matter thereof being incorporated herein by reference.

Referring to FIG. 4A, the DSA request at port 400P is fed to a cut through buffer 404 as shown in FIG. 4A, and to a Store Forward (SF) Context buffer 406. The output of the Context buffer 406 is fed to one input of a selector 408 and the output of the cut-through buffer 404 is fed to the other input of the selector 408. A DSA controller 410 drives a control signal on line 412 that is used to selectively pass either the store-forward DSA request in buffer 406 or the cut-through DSA request in buffer 404 to a SRIO packetizer 414 in a manner to be described. The conversion of the PCIE packet to the SRIO packet performed by the packetizer is shown in FIG. 4E.

Referring to the flowchart in FIG. 4J (Egress Cut-thru), after the CPU flush as described in Step 4000 of FIG. 4I, the controller 410 (FIG. 4A) selects (Steps 4102, 4106) the cut-through path (i.e., selects Cut-Through Buffer 404 (FIG. 4A) only when the following conditions are met: (1) The Cut-through Buffer is empty (Step 4102); (2) there is an available SF buffer (i.e., SRIO Credit available), (Step 4102) within the SRIO End Point 1000A or 1000B (FIG. 3); and either (3a) the DSA setup arrives as a single 128 byte packet (Step 4102); or (3b) for the case when the DSA setup arrives in two 64 byte packets the $2^{nd}$ packet is cut-through, not shown, and described later).

Otherwise, the Context buffer 406 (FIG. 4A) output is selected by the controller 410 Step 4102, 4112.

More particularly, if the SRIO End Point 1000A, 1000B SF buffers 316 (FIG. 3) are full (i.e. no buffer credits are available on SRIO egress), such that a DSA request packet cannot be accepted into the cut-through buffer 404 (FIG. 4A), the DSA will switch into a SF manner; that is, it will accept all packets from PCI-Express and fully buffer these packets in the Context store forward buffer 406 (Step 4102, 4112). As soon as a SRIO SF buffer frees up, subsequent DSA setups will again be directed to the cut-through buffer 404 as long as the packet size requirements are met as described above (Step 4100). The SRIO End Points 1000A, 1000B are designed with fifteen Store Forward (SF) packet buffers 316 dedicated to low latency paths to try to reduce the chance of backpressure (i.e., congestion) from the SRIO Endpoints 1000A, 1000B. In addition, DSA request packets are typically issued at a SRIO priority of two which is treated as higher priority by the packet switching network 112A, 112B, and SRIO End Points than the IO ("user data") traffic (typically priority 0) so fabric (i.e., packet switching network 112A, 112) congestion for DSA traffic is reduced.

The packet then passes to either switching network 112A or 112B or to both networks 112A and 112B as determined by the switching network selector 415 under control of the controller 410 (FIG. 4A). The packet switching network selection by the controller 410 is described below in a section entitled "DSA Setup and flush operation" (Step 4000, FIG. 4I).

The packetized DSA request (Step 4108) passes via one of both switching networks 112A, 112B to the slave DSA 400S (FIG. 4B and the Flowchart in FIG. 4M) of the destination storage processor 108. Thus, referring to FIG. 4B, the packeted DSA request is received by one of the pair of ports 400SA or 400SB coupled to the packet switching network 112A or the packet switching network 112B, respectively as indicated. The received request packet (formatted as in block 4500, FIG. 4K) is passed to a ping-pong selector 452. The Ping-pong Selector 454 includes two 4 packet deep request FIFOs 402SA and 402SB. There is one FIFO per SRIO port 402SA, 402SB. The ping-pong selector 454 selects between the two DSA request FIFO's (i.e. queues). The selected DSA request packet is then checked for errors (such as parity or marked to be stomped (i.e. discarded)) Step 4306, FIG. 4M. If errors exist an error response is immediately sent back to the initiating SP (Step 4318). Next the packet is checked to ensure the address fits into the protection window as previously programmed by software to guard certain areas of local memory as mentioned above in relation to local/remote memory access. (A more detailed description of the data protection window logic is described in the Router section below). If there is no errors, and the request is to a valid memory range, the SRIO packet is formatted to the PCIE End Point 300 as a memory read or memory write operation in a PCIE formatter 462 as shown in FIG. 4B; Block 4502, FIGS. 4K, and 4M (Step 4308).

At this point, the operation depends on the type of DSA request being processed. For the case of a DSA write, once the PCIE memory write is issued to the PCIE link (i.e., the link at port 230), (i.e. the PCIE write is "on the wire"), a "good" SRIO response (with no data payload) is sent to the initiating SP (as a notification receipt) as shown in Steps 4312,4318, FIG. 4M. For the case of a DSA read request, the PCIE read completion packet (i.e. the returned read data from local/remote memory 210) must be processed and converted into a properly formatted SRIO response packet with data payload as shown in Steps 4312, 4314, 4316, 4318; 4504, 4508 FIG. 4K. The atomic payload portion of the received packet is fed to an atomic operation engine 460, FIG. 4B; Step 4310, FIG. 4M.

For the case of an atomic operation, the atomic payload portion represents the "new" data that is to modify the data read from the destination storage processor 108 (i.e., the old data, Step 4316). This old data is stored in the local memory 210 of the destination storage processor. Thus, the old data is also fed to the atomic operation engine 460 as shown in FIG. 4B; block 4504 (PCIE Read completion format), block 4506 (SRIO Read Response format), FIG. 4K. After the atomic operation engine 460 performs the atomic operation (Step 4310), the result (i.e. new data) is converted to PCIE format in the PCIE formatter 462, FIG. 4B; step 4308, and the resulting packet is fed to the local memory 210, FIG. 2; 4502, FIG. 4K of the destination storage processor. Also, the packet response header is returned to the source storage processor 108 via the packet switching networks 112A, 112B via the SRIO synchronizer 452, FIG. 4B. The SRIO "status" response packet passes to the master DSA 400M (Step 4508, FIG. 4K; Step 4318, FIG. 4M).

It is to be noted that to achieve highest possible DSA throughput, the slave pipe (SDSA) 400S (FIG. 4B) must be capable of posting multiple read requests to PCIE to hide the relatively long latencies associated with accessing physical local/remote memory. Since atomic operations must never be interrupted by another DSA operation, posting multiple reads can only be accomplished when the read address ranges for the outstanding operations do not overlap (FIG. 4Q, Step 4402). In addition, writes to PCIE never need to wait behind the read portion of an atomic operation as long as the destination address range does not overlap for the two operations. This address range check is performed by an address range checker 463 in accordance with the process shown in the flowchart of FIG. 4Q, Step 4402.

DSA Packet Formats

Referring to FIG. 4E, an egress PCIE request packet containing the DSA setup request 450E enters port 230 and is converted to an egress SRIO request packet 426E at port 230A or 230B and referring to FIG. 4F, a ingress SRIO packet 456I (FIG. 4F) at either port 230A or 230B is converted to a PCIE write packet (DSA status) packet 450I by the PCIE/SRIO Controller 212, (FIG. 2).

As shown in FIG. 4E, the PCIE packet 450E includes: a PCIE header/address 452E, shown in FIG. 4E; and up to a 128 byte data payload 454E, such payload 454E including DSA cache setup information. The SRIO packet 426E includes: a SRIO request header 458E, a SRIO destination address 460E and a SRIO data payload 452E. More details of the: PCIE Header/Address 452E format is shown in FIG. 4G; the PCIE Data Payload 454E format is shown in FIG. 4H; the SRIO Request Header 458E format is shown in FIG. 4G; the SRIO Destination Address 460E format is shown in FIG. 4H (Primary Address Format is shown in detail in FIG. 4D); the SRIO Data Payload 452E to be described in more detail hereinafter includes: from 8 to 64 bytes if memory command is Nwrite; 0 byte if memory command is Nread; 32 byte if memory command is MCMS-64; 64 byte if memory command is MCMS-128; 16 byte if memory command is ACM-64; 32 byte if memory command is ACM-128.

Figure 4O:
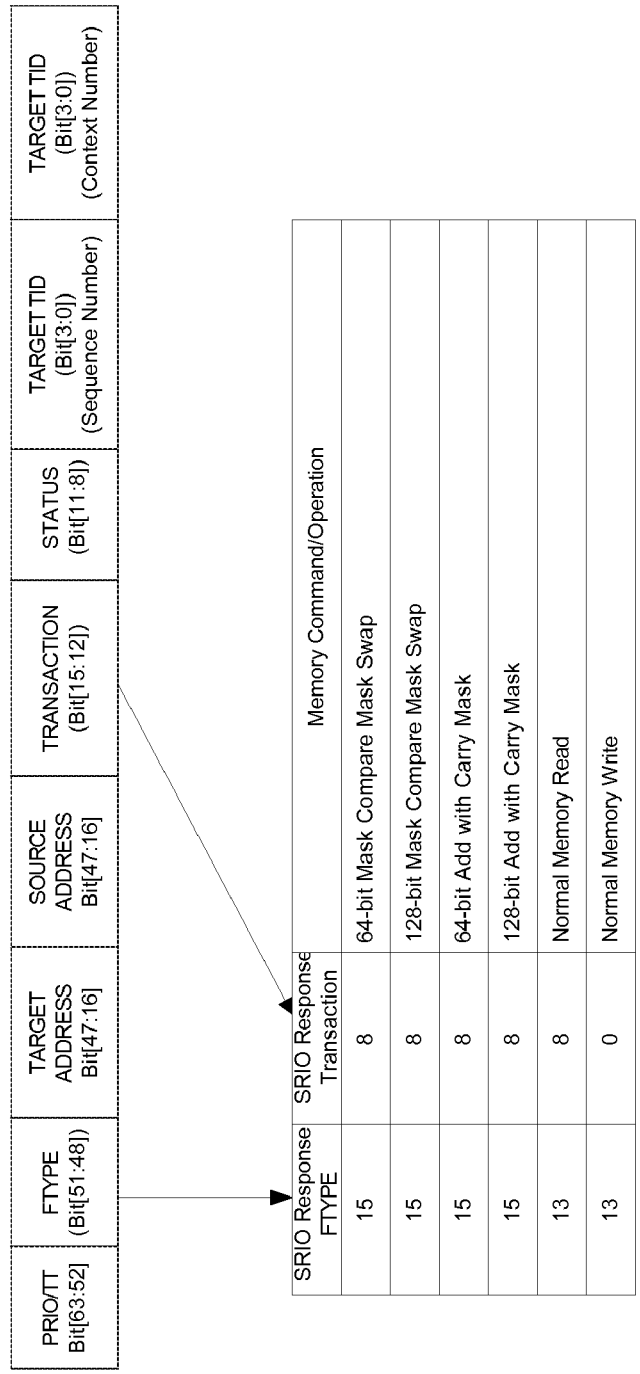
FIG. 4O shows an SRIO response header format used by the system of FIG. 1 according to the invention.

As shown in FIG. 4F, the SRIO response packet 456I includes a SRIO response header 458I and a SRIO response data payload 460I. The PCIE packet 450I includes a PCIE header 452I, a PCIE data payload 454I which includes the DSA status, FIG. 4L. The format of SRIO Response Header 458I is shown in FIG. 4O. The SRIO Response payload 458I contains DSA status and retuned read data (if any) 460I is: 0 byte for Memory Write; 8-64 byte for Memory Read (depending on a programmable length from 1-8 words); 8 byte for memory command MCMS-64, ACM-64; and 16 byte for memory command MCMS-128, ACM-128. The PCIE Address 452I comes from Cache Setup offset 0x50 (local memory address) shown in FIG. 4H; the PCIE data payload 454I format shown in FIG. 4L.

DSA Setup and Flush Operation (Step 4000, FIG. 4I)

The CPU of the source storage processor 108 (i.e., the initiating CPU): assembles a 128 byte "DSA setup" structure within a write coalescing buffer, not shown, inside the CPU core 206 (FIG. 1). (A write coalescing buffer allows writes to sequential addresses to collect and be combined into larger, more efficient writes.) After the setup is assembled, the CPU 206, in accordance with a program stored therein, causes the write coalescing buffer in the CPU to be flushed, optimally as a 128 byte write which is subsequently converted by the root complex 202 (FIG. 2) to a PCI-E memory write with a payload of 128 bytes as shown in FIG. 4E.

A DSA setup transfer is identified by a unique cacheable memory mapped address provided by the CPU and decoded in the programmable BAR (Base address register 0) 301 (FIG. 3) in the PCIE Express end point section 300 per the PCIE standard. The PCIE address fields are shown in FIG. 4G and provide control information which accelerates the PCIE to SRIO conversion since the address arrives with the first indication from the PCI-end point (EP) that a DSA request has arrived. The 'early command' field is defined within bits 17:8 of the PCIE address as shown in top left side of FIG. 4G. The 'early command' field provides the desired DSA context number (described in more detail later) in which to perform the DSA in the range of from 1 to 8, the type of DSA command (memory write, memory read, MCMS64/128, ACM64/128), the length (TLC or transfer length count) of the DSA in 8 byte words, and the 'Dual Enable' bit indicates if the DSA request is a single DSA (the DSA request is sent to one destination SP node) or dual DSA (the DSA request is sent to two destination SP nodes). Dual enable allows control data to reside on two independent destination storage processors which have the distributed global cache memory, described above, for increased fault tolerance.

The DSA setup in FIG. 4H that is presented to the PCIE/SRIO Controller 212 is organized as follows. The $1^{st}$ column contains the cache offset in hexadecimal format. Each offset contains 8 bytes of setup information and the entire setup contains 128 decimal bytes (from 0x0-0x7F in hexadecimal). The offset selected is determined by address bits 7:0 within the PCIE address at the top of FIG. 4G. Subsequent columns identify the fields that need to be programmed at the various offsets in the cache setup for the various DSA commands.

The primary address and secondary address formats are identical and are shown in a separate detail at the bottom portion below the cache setup table in FIG. 4H. Offset 0x0 is common to all DSA commands and is referred to as the DSA Primary address. The primary address is always required for any DSA operation and contains (among other things) the 39 bit destination memory address (bits 38:0) and the 16 bit SRIO destination node ID (bits 55:40] of the storage processor 108 to perform the DSA operation (i.e., the destination: storage processor 108). Similarly, the secondary address is contained within offset 0x8 of the DSA cache setup and always contains the secondary memory address and secondary node address which is only used if 'dual enable' is set (as selected by the PCIE address and discussed earlier).

Bit 63 of the primary or secondary address in FIG. 4H is the 'context enable' which ensures that the setup directed to a particular context was fully assembled by the program (i.e., software) running on the CPU before it was evicted. For proper operation, the last step the software must perform before flushing the DSA setup is to set the context enable bit. If the enable is not set, the context will be discarded by the DSA controller (FIG. 4A) to prevent data corruption. With some CPU's, a premature eviction can sometimes take place before the programmed flush cycle. To cover for this case, the $1^{st}$ flush will not have context enable set (since the premature eviction happens before the CPU performed the flush) but the $2^{nd}$ flush (i.e. the intended flush operation under direct software control) will have the context enable set.

Bits 61:60 define the SRIO request priority and per the SRIO specification there are three priorities where 0 is the lowest and 2 is the highest priority. The A/B port (bit 56) indicates if the DSA request should be directed to packet switching network 112A or network 112B and controlled by the switching network selector 415, FIG. 4A.

The Data 0 through Data7 fields at offset 0x10 through 0x48 apply to a DSA write operation and depend also on the size of the DSA write as indicated by the TLC (transfer length count) as described above. For example, if the DSA write was one word as indicated by TLC=1, only Data 0 would be written to the destination SP's memory. Data words 1 through 7 are don't care's in this case.

The compare mask, compare data, swap mask, swap data, add data, and carry mask words at offsets 0x10 through 0x28 are applicable to DSA atomic operations only and described below in the data transfer description.

The local memory address at offset 0x50 is used to determine what address location in local memory 210 (FIG. 2) is to be used to store the DSA status after the DSA transfer completes.

The DSA setup is held within a store-forward (SF) context buffer in FIG. 4A. The context buffer 406 (FIG. 4A) is used to hold up to eight active (concurrent) DSA setup entries, as will be described in more detail in connection with FIG. 4P. See FIG. 4H for DSA setup structure (i.e. the programming model).

Depending on the CPU vendor, there are variations and corner cases that can be supported by the CPU device such as (a) the size of and number of packets that contain the 128 byte DSA setup; and (b) if a write combining buffer(s) are used the setup may be segmented into multiple 8 byte packets (due to a partial flush operation) which may or may not arrive in order, or (c) a cache line readback may be issued by a CPU at any time to repopulate a prematurely evicted cache line.

To handle case (a) above, 64 bytes and 128 bytes are supported; however only the 128 byte accesses (and to some extent the 64 byte accesses) utilize the cut-through buffer 404 (in FIG. 4A). For the case where the setup is received as two 64 byte packets, the $2^{nd}$ half of the setup (offsets 0x40-7F) should be flushed by the CPU before the $1^{st}$ half. The $2^{nd}$ half of the setup is stored within the SF context buffer 406 while the $1^{st}$ half is cut-through to the SRIO end point (EP). This reduces latency since the $1^{st}$ half which contains the information needed (such as context enable) to encode to the SRIO packet format can be encoded as soon as it arrives from PCI-End Point (assuming $2^{nd}$ half already stored in context buffer 406). The DSA performance is optimized only for the case of efficient (a single 128 byte payload) or two 64 byte payloads flush operations which are considered to be the typical case.

To handle case (b), the context buffer 406 is made directly addressable within the BAR0 (301, FIG. 4A) address space defined for DSA so that 8 byte write request packet ordering is not an issue and scoreboard logic (within the controller of FIG. 4A) is used to ensure all words of the setup (a context entry) were populated before sending a DSA request to SRIO). That is, the DSA master cannot send a DSA request to SRIO Router 900A, 900B unless it receives the entire setup FIG. 4H.

Finally, for case (c) the context buffer 406, FIG. 4A, is readable so at any time the CPU 206 may repopulate a cacheline that was written to the PCIE/SRIO Controller 212. For this case, the context buffer 406 is being read and cannot accept a DSA setup for a context entry since the context buffer 406 is not dual ported. To prevent a conflict, the PCIE End point is temporarily held off by an internal WAIT signal which is built into the interface protocol between the PCIE end point and DSA section 400.

Once the setup is assembled, and flushed, the CPU is free to perform other work (if there is work not dependent on a DSA in flight) until the DSA transfer is completed, 4002 FIG. 4I Context Switched DSA Since the development of commercially available of multiple core (DUAL, QUAD for example) CPU's by Intel and others, it is advantageous to support multiple virtual DSA "pipes" to allow multiple CPU cores to issue DSA's concurrently (as shown in flowchart FIG. 4P) to increase system throughput. For example, one CPU core may issue a DSA request using DSA Context #1 (step 4602) while concurrently, another CPU core (or possibly the same CPU core) may issue a DSA request using DSA Context 'n' (steps starting at 4620).

In order to reduce gate count and to allow for future scalability (by adding a larger context RAM 406, FIG. 4A) one physical DSA pipe (FIG. 4A) can switch between 8 active "contexts". A context (498, FIG. 4A) holds the DSA setup information and associated status for a particular DSA transfer.

To match a particular DSA response to its slot in the 8 deep context buffer 406 (FIG. 4A), the context number (from 1 to 8 for example) is embedded as a sequence number into the SRIO request packet (encoded as in FIG. 4G) and returned in the associated response. In this way, the DSA hardware can correlate the outstanding DSA setup "opened" (step 4604) in the context buffer 406 with the DSA status (stored in the 8 entry status RAM 409 in FIG. 4A) for up to 8 contexts in this implementation. Each of the eight 128 byte contexts is located within the BAR 0 address space in the memory map space generated during system boot-up. A context is "closed" (step 4610) (i.e. available to be used again for another DSA) when the DSA is completed as notified by receipt of a SRIO response packet (step 4608), and the DSA status pushed to local memory 210 (at the address specified in the DSA setup packet).

Relative ordering of DSA operations is not guaranteed by the implementation described here. Software may control ordering only by using the same DSA context number from within the same source SP. For example, if it is important that one DSA operation is completed before the next DSA operation is issued (from the same SP) then both operations must use the same context number.

DSA Status

When the DSA is completed, the DSA status and data (if applicable) is "pushed" into the initiating, or source SP's local memory 210 and an interrupt generated to the initiating CPU for completion notification. (Polling of the DSA status word in local memory is also possible for absolute lowest latency when no forward progress can be made until the DSA transfer is completed). The DSA status is shown in FIG. 4L. The status is pushed into local memory by the DSA section 400 after the DSA response is received or a timeout occurs. The DSA status is collected by the CPU 206 to check that the DSA completed successfully and to retrieve the read data (or old read data) for the atomic operations. There are many types of errors that can occur and these are shown in the pipe status/Error in the detail below the table in FIG. 4L. If there was no error during the execution of the DSA operation the 'done' bit 7 would be set without any other error indication for the primary operation and the optional secondary operation (which is used only for the case of dual write DSA). MCMS success indicates that the atomic operation mask and compare was successful (e.g. lock obtained). A status of success applies only to Mask Compare Mask Swaps which are essentially a "test and set" atomic operation which can manipulate 64 bits or 128 bits respectively.

DSA Transfer Requests

There are four DSA commands supported: (a) DSA read from 1 to 8 global memory words; and (b) DSA write from 1 to 8 global memory words; and (c) Mask Compare Mask Swap (MCMS64, MCMS128) which, as noted above, is essentially a "test and set" atomic operation which can manipulate 64 bits or 128 bits respectively; and (d) Add with carry mask (ACM64, ACM128) atomic operation which is useful for example to increment shared counters.

The DSA read (from 1-8 global memory words which is 8-64 bytes) is issued from a source SP when it is desired to read up to 64 data bytes from a local/remote memory of a destination storage processor 108 at the command of a source storage processor 108, as shown in FIG. 1A.

The DSA write (from 1-8 global memory words which is 8-64 bytes) is issued from a source SP when it is desired to write up to 64 bytes of data to a local/remote memory of a destination storage processor 108 at the command of a source storage processor 108, as shown in FIG. 1A. A DSA dual write is a variation of the basic DSA write. When the dual write bit 8 of the PCIE header/address, FIG. 4G, is set along with both a primary and secondary address in the DSA setup, the DSA section 400 (FIG. 4A) Packetizer block replicates the write request and sends it to two different destination storage processor 108s on the same or different switching networks 112A 112B (i.e., fabrics) depending on how many fabrics (switching networks) are operational. This is useful when system level mirroring is used to protect "meta" data i.e., control data, that the software uses to control the flow of user data.

One technique used to perform an atomic operation initiated by a source storage processor 108 is described in U.S. Pat. No. 6,578,126 entitled "Memory System and Method of Using Same", inventors MacLellan et al., issued Jun. 10, 2003, assigned to the same assignee as the present invention, and requires the global cache memory section in a destination storage processor 108 to lock or prevent access to this memory section by the other ones of the storage processor 108 until completion of the atomic operation. More particularly, an atomic read-modify-write operation modifies the read data and writes the modified data back into the same memory location from which it was originally read. This operation requires that the read-modify-write operation be an atomic operation because the operation cannot be interrupted until completed. That is, the memory location being read, modified, and re-written is reserved exclusively for this entire operation.

Specifically, one DSA atomic transfer referred to as Mask Compare Mask Swap (MCMS) provides a so-called "test and set" atomic operation that is used for example as a mechanism to change ownership of a cache lock control word to the initiating SP's "identification, i.e., ID)". The cache lock is associated with a cache slot such that if the control word is locked to a particular SP, no other SP can change ownership of the lock or the associated cache slot (which is used for caching a block of user data). One technique for performing atomic operations is described in U.S. Pat. No. 6,973,551 entitled "Data storage system having atomic memory operation, inventor John K. Walton, issued Dec. 6, 2005, assigned to the same assignee as the present invention.

For the atomic operation, the atomic payload of the packet providing the requested atomic operation is fed to an atomic operation engine (FIG. 4B, 4K) along with the "old data" returned. The "old data" (in FIG. 4B, 4K) is processed by the atomic operation engine, here modified in accordance with the requested atomic operation, and then fed as "atomic new data" (in FIG. 4B, 4K) to the PCI-formatter and then written to the local/remote memory as described above.

The MCMS (64, 128) is a type of atomic read-modify-write operation that conditionally acts upon a single (64) or double (128) memory word location(s), with the purpose of selectively modifying a portion of the existing memory word. Four words are included in the DSA cache setup: a mask for the compare (Compare Mask), a compare data word (Compare Data), a mask for the write (Swap Mask), and a word containing "new" data to be written (Swap Data). The MCMS only performs a write if the compare operation was successful. Success occurs when the "old data" returned matches the unmasked bits of the "compare" data. For the example above, if the global cache control word has a field or bit (which is specified in the compare mask word) that indicates that no director has a lock in progress the initiating DSA would get a "success" status and the initiating SP's "owner" identification (ID) (as specified by the combination of the write data and the write mask) would be merged into the global memory control word atomically. Once the global cache control word is locked, subsequent accesses by other SP's will result in "unsuccessful" status being returned (and the data in memory will remain unchanged).

As described in more detail in the above-referenced U.S. Pat. No. 6,578,126, the ACM (64, 128) is a type of atomic read-modify-write operation that is defined as a write of a single (64 bytes) or double (128 bytes) memory word ('ADD Data' in the DSA Cache setup FIG. 4H) which is mathematically summed to the existing contents of memory, with the ability to isolate individual terms by gating-off arbitrary carry bits within the summation. This is useful when defining shared variables, error or performance counters that are manipulated by more than one SP. Each SP for example could increment a Software error counter in global memory without having to be concerned that another SP is "stomping" on the same counter at the same time causing the counter to be incremented incorrectly. The carry bit control depends on the bit size of the shared Software counter. For example, a 32 bit counter could be prohibited from wrapping into bits 64:33.

DSA Transfer Responses

A SRIO response is issued by SDSA for every matching DSA SRIO request. A flowchart of the operation of the slave DSA 400S, FIGS. 4 and 4B, is shown in FIG. 4M. Associated requests and responses are always on the same SRIO port per the SRIO standard, see publications by the RapidIO Trade Association including those referenced above. The SRIO response header of the response packet is a modified version of the response packet (from FIG. 4G). The SRIO response data payload for the case of memory reads and atomic operations (FIGS. 4F, 4O, and 4L) depend on the type of DSA operation requested. The SRIO selector 470 shown in FIG. 4B selects the response header or response payload (returned read completion data from PCIE EP) before writing the data into an 8 deep response FIFO queues 472. The queued response will be returned to the Master DSA as soon as there is available buffer credit from the SRIO Router 902A, 902B, FIG. 3.

Referring again to FIG. 4A, and FIG. 4N (Ingress Cut-Thru flowchart) the response packet from the slave DSA of the destination storage processor 108 is on one of the pair of SRIO ports 400MA, 400MB of the source storage processor's master DSA pipe. There is one queue per SRIO port. A ping-pong arbiter in controller 410 selects between the two SRIO ports through selector 494. The cut-thru path 480 is selected (step 4202) through selector 492 to reduce latency when the following conditions are met (1) there is no entry in the response FIFO 478 (per SRIO port); (2) the DSA status cache is not being updated as part of the initialization for the DSA setup (path 491 in FIG. 4A). Otherwise, the received response packet is stored in a store-forward manner (steps 4204, 4206) to a 4 packet deep response FIFOs 478 (FIG. 4A).

There is several validation checks done within the SRIO Packet Decode/validate block 490 (FIG. 4A); step 4210, FIG. 4N: (a) check that received response matches an open context (b) check that received sequence number matches the sequence number sent (c) that the packet was not marked to be stomped (e.g., discarded) due to SRIO link errors (d) that the payload size expected matches actual received payload size (e) check that SRIO Router 900A, 900B status contains no errors (f) after the validation, the SRIO response payload gets written into the DSA status cache 409 (FIG. 4A) through selector 492. DSA then writes the DSA status (step 4212, FIG. 4N) to the local/remote memory of the source storage processor. When stored therein, the CPU initiating the DSA request is advised of the status of the DSA request via a standard MSI-X interrupt.

It should also be noted that when the DSA request packets were originally sent to the packet switching network, the ACK Manager 496 also stored the request header in a header RAM (not shown) within the ACK Manager for a later comparison with the response packets from the packet switching network. The response packet that comes back from the packet switching network will then be compared to one of the outstanding header entries—if it matches, the ACK Manager 496 will discard this entry. Because the response coming back from the packet switching network could be out-of-order, the ACK Manager 496 should be capable of accepting out-of-order responses. ACK Manager 496 can hold up to 16 header entries to manage 16 pending requests. ACK Manager uses the response's Target (TID) field for its look-up. If there is a match, then it will compare the data with the SRIO header for a field mismatch such as FTYPE, TTYPE, Node-Id and remove this entry from the ACK Manager. If there isn't a match (none of the TID in the ACK manager 496 matches with the one from packet switching network), DSA considers this a errant packet and discards it, where FTYPE, TTYPE, Node-id and TID are defined in the Rapid IO Interconnect Specification, version 1.3

DSA Local Atomics

The source SP and destination SP of any DSA command can also refer to the same SP when the DSA operation is directed to the same SP. This "reflection" is accomplished by the SRIO switch component (not shown), within the Packet Switching Network in FIG. 1B since the source and destination nodes refer to the source. One benefit of this is that coherency is maintained since even the local CPU and remote CPU(s) must go through the local CPU's "atomic engine" which permits only one atomic operation to access the local CPU's memory space at a time. If the local CPU were to directly write his own local/remote memory thus bypassing the DSA atomic engine, coherency could not be maintained as the CPU's operations in local/remote memory are not known to the PCIE/SRIO Protocol Controller 212.

Figure 5:
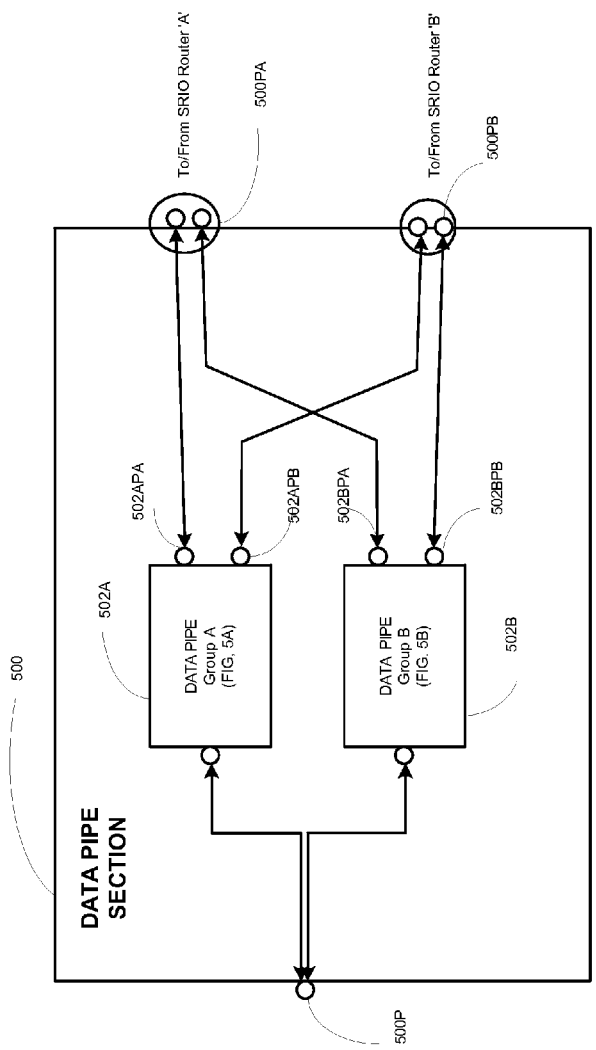
FIG. 5 is a block diagram of a data pipe section used the PCIE/SRIO protocol controller of FIG. 3 according to the invention.
Figure 5C:
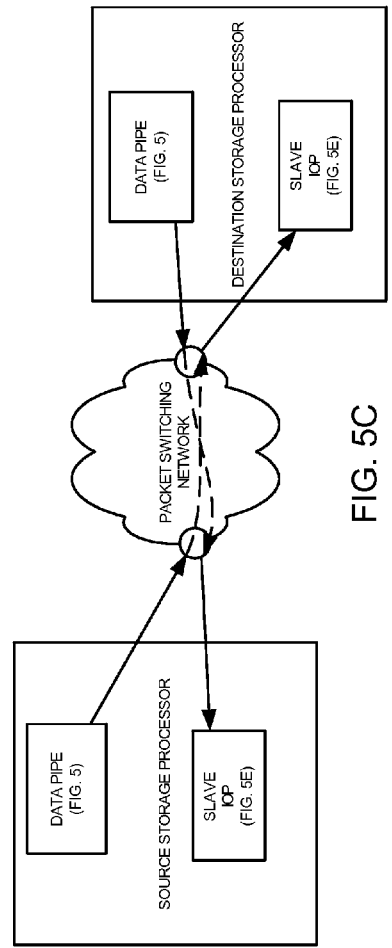
FIG. 5C is a diagram showing a pair of SPs of FIG. 2 interconnected through a packet switching network, such each of the SPs having a master data pipe section of FIG. 5D and a slave data pipe section of FIG. 5E according to the invention.

Data Pipe Section 500, FIG. 5

Figure 5B:
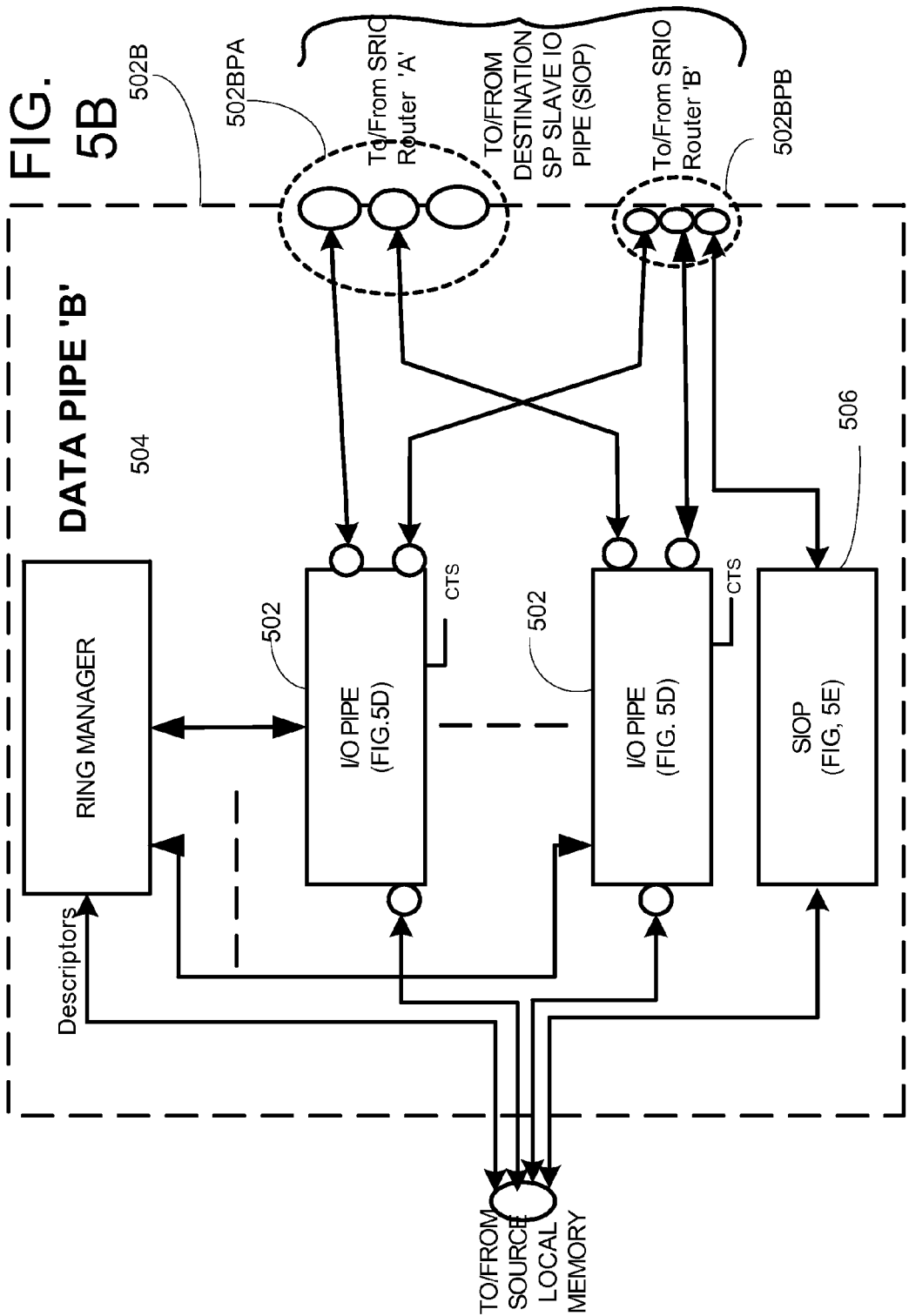
FIG. 5B is a block diagram of an exemplary the other one of a pair of data pipe groups used in the data pipe section of FIG. 5 according to the invention.

Referring now to the data pipe section 500, reference is made to FIG. 5. Referring again briefly to FIG. 3, the data pipe section 500 is connected to the PCIE express end point 300 via port 500P and is connected to the pair of packet switching networks 112A, 112B (FIG. 5) via ports 500PA and 500PB, respectively, through: SRIO Router "A" 902A and SRIO "A" end point 1000A; and, SRIO Router "B" 902B and SRIO "B" end point 1000B, respectively as indicated. Referring to FIG. 5, it is noted that the data pipe section 500 includes two groups of data pipes: a Group A 502A (FIG. 5A); and a group B 502B (FIG. 5B). Group A 502A is associated and controlled by request descriptors stored in a first set of four pairs of the 8 pairs of descriptor rings 213 (FIG. 2) and Group B 502B is associated and controlled by request descriptors stored in a second set of four pairs of the 8 descriptor rings 213 stored in the local/remote memory (FIG. 2). The Groups 502A and 502B are shown in detail in FIGS. 5A and 5B, respectively. As noted above, the data pipe 502 is coupled to both packet switching networks 112A and 112B. Thus, referring to FIGS. 5 and 5A, group 502A has a pair of ports 502APA and 502APB and referring to FIGS. 5 and 5B group 502B has a pair of ports 502BPA and 502BPB. The ports 502APA and 502BPA are connected to port 500PA of the data pipe section 500 and the ports 502APB and 502BPB are connected to port 500PB of the data pipe section 500. Thus, each one of the two Groups 502A, 502B is connected to both SRIO Router 902A and 902B and thus to the pair of switching networks 112A, 112B through the SRIO end points 1000A and 1000B, as indicated in FIG. 3.

Figure 5D:
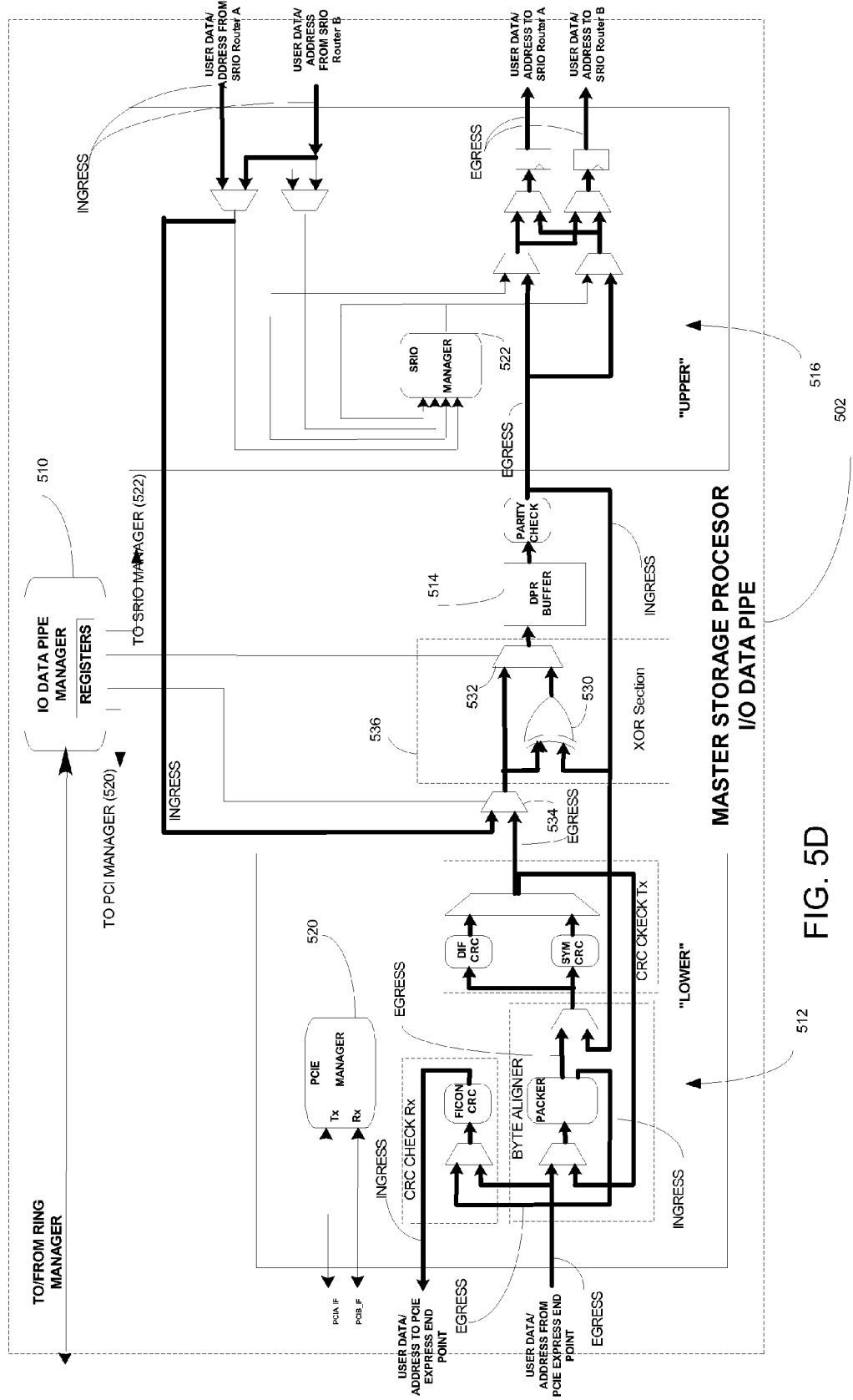
FIG. 5D is a block diagram of the master section of an exemplary one of the I/O data pipes used in the pair of data pipe groups used in the data pipe section of FIG. 5 according to the invention.
Figure 5E:
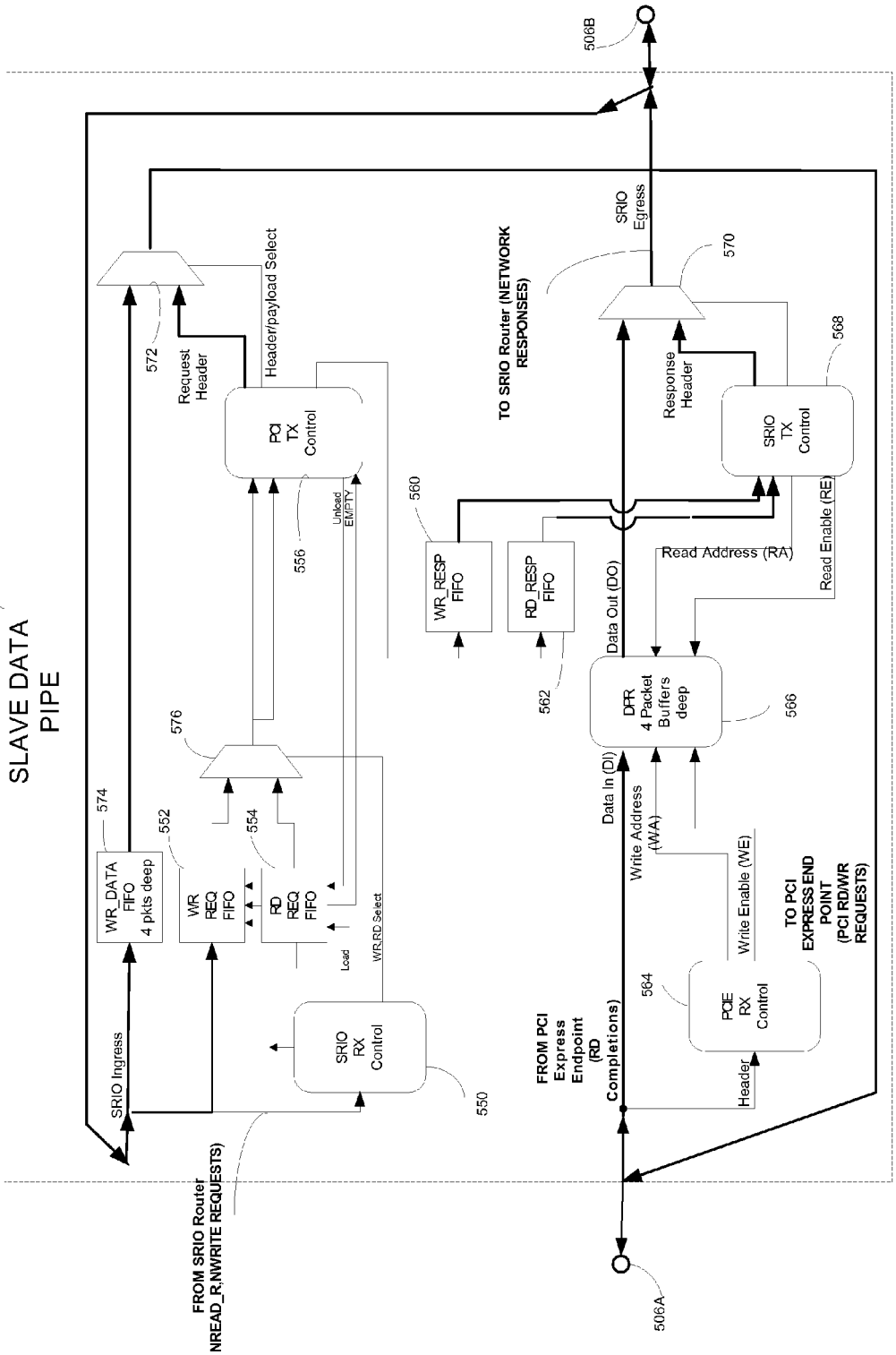
FIG. 5E is a block diagram of the slave section of an exemplary one of the I/O data pipes used in the pair of data pipe groups used in the data pipe section of FIG. 5 according to the invention.
Figure 5G:
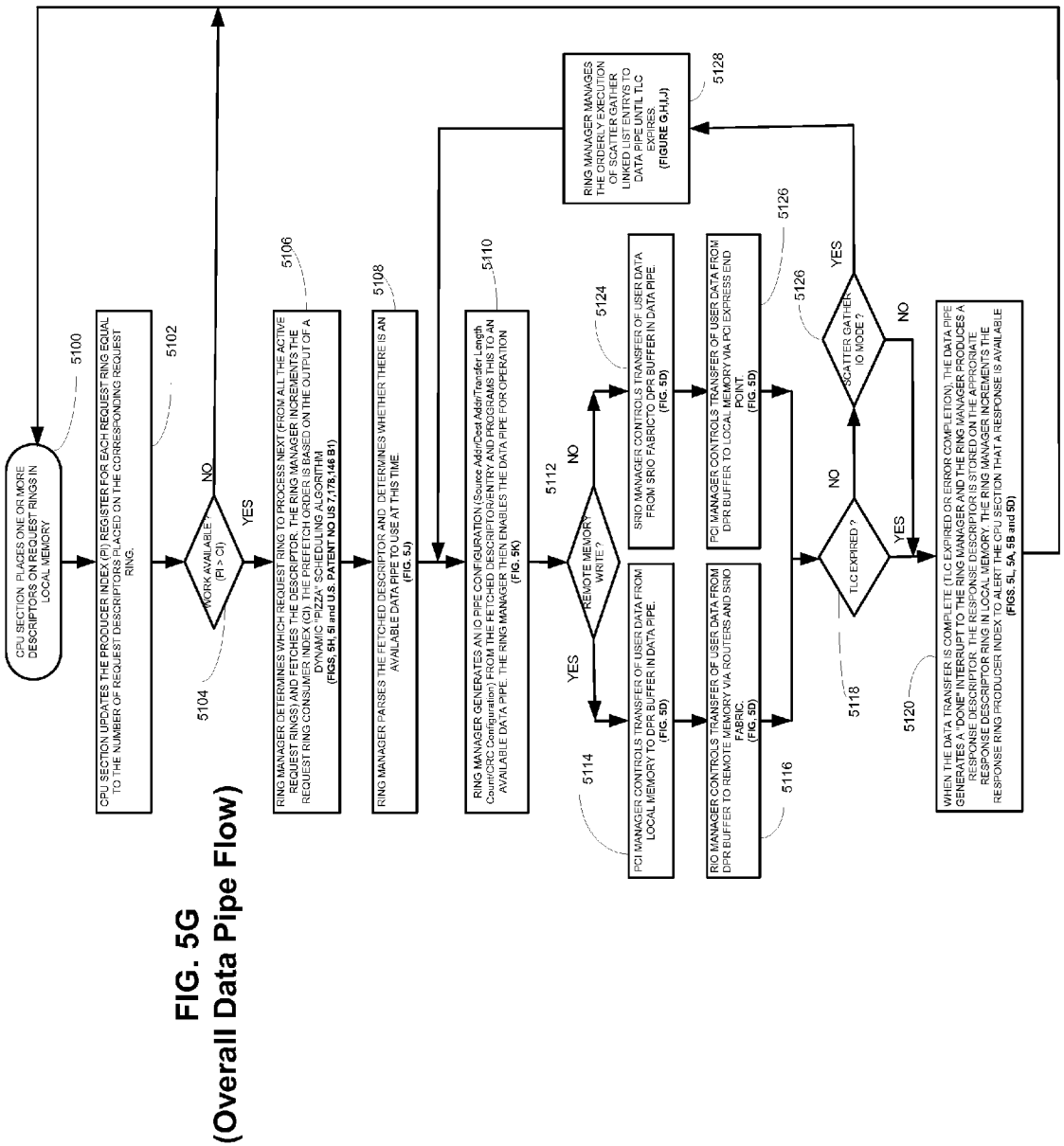
FIG. 5G is a more detailed flowchart of a process used to control the flow of user data through a data pipe of FIG. 5.

Referring now to FIG. 5A, the Group A 502A data pipe section includes a ring manager (i.e., data pipe controller) 504, here a microprocessor programmed to effect the flow diagrams in FIGS. 5F and 5G; a Slave I/O Pipe (SIOP) 506 and a plurality of, here 4, parallel connected data pipes 502, an exemplary one thereof being shown in more detail in FIG. 5D. Each one of the data pipes 502 is configured in accordance with request descriptors retrieved by the ring manager 504 from the associated one of the pair of 4 descriptors rings 213; such descriptor being generated by a corresponding one of the CPUs 206 (FIG. 1) in the CPU section 204 and stored in the corresponding one of the request descriptor rings 215. It is noted that the ring manager 504 communicates with each one of the four data pipes 502 and that each one of the four data pipes 502 is connected via ports 502APA and 502APB to through both SRIO Router 902A and SRIO Router 902B to both packet switching networks 112A. 112B. On the other hand, the SIOP 506 is connected to only port 502APA and hence to only one of the packet switching networks, here packet switching network 112A.

Referring now to FIG. 5B, the Group B 502B data pipe section includes a ring manager 504; a Slave I/O Pipe (SIOP) 506 and a plurality of, here 4, parallel connected data pipes 502. Each one of the data pipes 502 is configured in accordance with request descriptors retrieved by the ring manager 504 from the associated one of the pair of 4 request descriptors rings 215; such descriptor being generated by a corresponding one of the CPUs 206 (FIG. 1) in the CPU section 204 and stored in the corresponding one of the request descriptor rings 215. It is noted that the ring manager 504 communicates with each one of the four data pipes 502 and that each one of the four data pipes 502 is connected via ports 502APA and 502APB to through both SRIO Router 902A and SRIO Router 902B to both packet switching networks 112A. 112B. On the other hand, the SIOP 506 is connected to only port 502BPA and hence to only one of the packet switching networks; here packet switching network 112B. Thus, the SIOP 506 in group A 502A is connected to only one of the pair of switching networks, here network 112A while the SIOP 506 in group B 502B is connected to only to the other one of the pair of switching networks, here network 112B.

Traditional producer/consumer rings are used to facilitate all user data transfers through the PCIE/SRIO Controller 212, (FIG. 2). The producer/consumer ring model allows the ring manager 504 (FIGS. 5A and 5B) to provide an abstraction layer between the CPU section 204 (FIG. 2) and the lower level control in the state machines of the data pipes 502 (FIGS. 5A and 5B). This allows the CPU section 204 to not worry about the intricate details of programming and managing the data pipes for user data movement.

All user data transfers are executed by one of eight master data pipes, i.e., the four I/O data pipes 502 in group A 502A and 502B. The ring manager 504 selects an available data pipe and then programs and enables it to transfer user data to/from PCIE Express Endpoint 300 to/from one or SRIO endpoints 1000A, 1000B.

The attributes of a user data transfer are fully described by the fields contained within a request descriptor. Typical attributes contained in a descriptor needed by the data pipe to move user data, include source address, destination address, transfer length count, transfer direction, and CRC protection control.

Each request descriptor produced by the CPU Section 204 in FIG. 2, has a corresponding response descriptor produced by the ring manager 504 once a user data transfer or "IO" has completed. This response descriptor typically displays status information of the user data transfer and is placed on a response ring in local memory by the ring manager.

Referring now to FIG. 5D, the data pipe 502 in exemplary one of the two data pipe groups 502A, 502B, here the data pipe 502 in Group 502A is shown in more detail. The descriptors retrieved by the ring manager 504 (FIG. 5D) contain data pipe control configuration which is extracted and stored in a register array in an IO Data Pipe Manager 510. These descriptors generate control signals for the data pipe 502. More particularly, the fields of the descriptor are loaded into a register array in the IO manager 510 to thereby configure the data pipe 502 by enabling certain features (such as XOR accumulation) to be described.

User data is fed, during a data write operation (i.e., where user data is to be stored in the bank of disk drives), to port 500P (FIG. 5) of the data pipe 502. Processing such as byte alignment, CRC checking, and XOR operations are performed in the "Lower" section 512 of the data pipe 502 if enabled via the request descriptor. Next, the data in a dual port RAM 514 is sent to one or both of the packet switching networks 112A, 112B via either port 502APA or 502APB; or both ports 502APA and 502APB in section 516 of the data pipe 502.

Referring now to FIG. 5F, the overall flowchart of the operation of the ring manager 504, FIG. 5A or 5B is shown. A more detailed flowchart is shown in FIG. 5G.

Referring to FIG. 5F, the CPU section places descriptors on one or more of the request rings 215 (FIG. 2) and updates the producer index register in the Ring Manager, Step 5000. Next, the ring manager 504 determines which request ring to service next using a run-list generated from a dynamic prioritization algorithm. The ring manager 504 then finds (i.e., selects) a free one of the data pipes 502 and fetches a descriptor from a request ring, Step 5004. Next, the ring manager 504 examines the request descriptor and programs the desired configuration through the data pipe manager 510 (FIG. 5D) in the selected data pipe, Step 5004. Next, the ring manager 504 oversees the data transfer operated on by the selected data pipe 502 and reprograms the selected data pipe 502 via the program manager 510 as required to complete the entire data transfer, Step 5006. Next, when the data transfer is complete, the ring manager 504 collects status information from the selected data pipe 504 and places a descriptor on a response ring 215 (FIG. 2), Step 5008.

More particularly, referring to FIG. 5G, the CPU section 204 (FIG. 2) produces request descriptors onto one or more request ring(s) 215 in local memory 210 (FIG. 2), Step 5100. For every request descriptor placed on a request ring, the CPU section 204 updates the producer index (PI) register in the ring manager 504, not shown, for the corresponding request ring 215 equal to the number of request descriptors placed on the same ring. The mechanism of updating the request ring 215 producer index alerts the ring manager 504 (FIG. 5A, 5B) of new work being available, Step 5102.

The CPU 204 determines whether there is work available, i.e., whether the request ring producer index (PI) is greater than the request ring consumer index (CI). If PI is not >CI, the ring manager 504 checks if there is other tasks it can process; otherwise, the ring manager 504 determines which request descriptor ring 215 to process next (from all active request descriptor rings) and fetches the descriptor, Step 5102.

Next, in Step 5106, the ring manager 504 determines the next active request ring 215, based on the output of a scheduling process described in U.S. Pat. No. 7,178,146, the subject matter thereof being incorporated herein by reference, see FIGS. 5G and 5I. More particularly, the ring manager 504 fetches a request descriptor from a request ring 215 based on pre-computed run-list which is computed based on ring priority and a fairness scheme, Step 5106.

Next, in Step 5108, once the ring manager consumes the request descriptor from the request ring 215, the ring manager 504 will update the consumer index (CI) for the request ring 215 that sourced the request descriptor, the ring manager 504 parses the fetched descriptor and determines whether there is an available data pipe to use at this time, as described in more detail in flowchart FIG. 5J. More particularly, the ring manager 504 logically parses the contents of the descriptor and checks it for possible errors. If the descriptor is logically correct, the ring manager 504 proceeds to create a data structure in its local data RAM, not shown, to control the data transfer on the data pipe including formatting the contents to be programmed to the data pipe, see flow chart in FIG. 5K.

Next, in Step 5110, the ring manager 504 (FIGS. 5A, 5B) generates a data pipe configuration (e.g., source address, destination address, transfer length) from the fetched descriptor and programs this to an available data pipe 502. The ring manager then enables the data pipe 502 for operation, as described in more detail in flowchart FIG. 5K. Thus, the ring manager 504 then finds a free data pipe 502 and programs the IO Data Pipe Manager 510 in the data pipe 502 with the pre-formatted contents previously described. It then enables the pipe for operation.

If, in Step 5112, the operation commanded by the CPU section 204 (FIG. 2) is a write user data transfer to a remote storage processor 108 (as distinguished from an operation wherein user data from a remote storage processor 108 is to the fed to the data pipe of the source storage processor 108), the PCIE manager 520 in the data pipe 502 controls the transfer of user data (step 5114) from the local/remote memory of the source storage processor 108 to the dual port RAM (DPR) 514 in the "Lower" section 512 in the data pipe, FIG. 5D. Then, the SRIO manager 522 in the data pipe 502 controls the transfer of user data from the DPR 514 to the remote storage processor's local/remote memory via one of the SRIO Router 902A or SRIO Router 902B routers and packet switching networks selectively in accordance with the descriptor controlling the user data transfer, Step 5116.

On the other hand, if in Step 5112, the operation commanded by the CPU section is a read user data transfer from a remote storage processor 108, the SRIO manager 522 in the data pipe 502 controls the transfer of user data from the packet switching network through the DPR 514 in the data pipe, Step 5124. Then, the PCIE manager 520 in the data pipe 502 controls the transfer of user data from the DPR 514 to the local/remote memory 210 via the PCIE express end point, Step 5126.

Figure 5I:
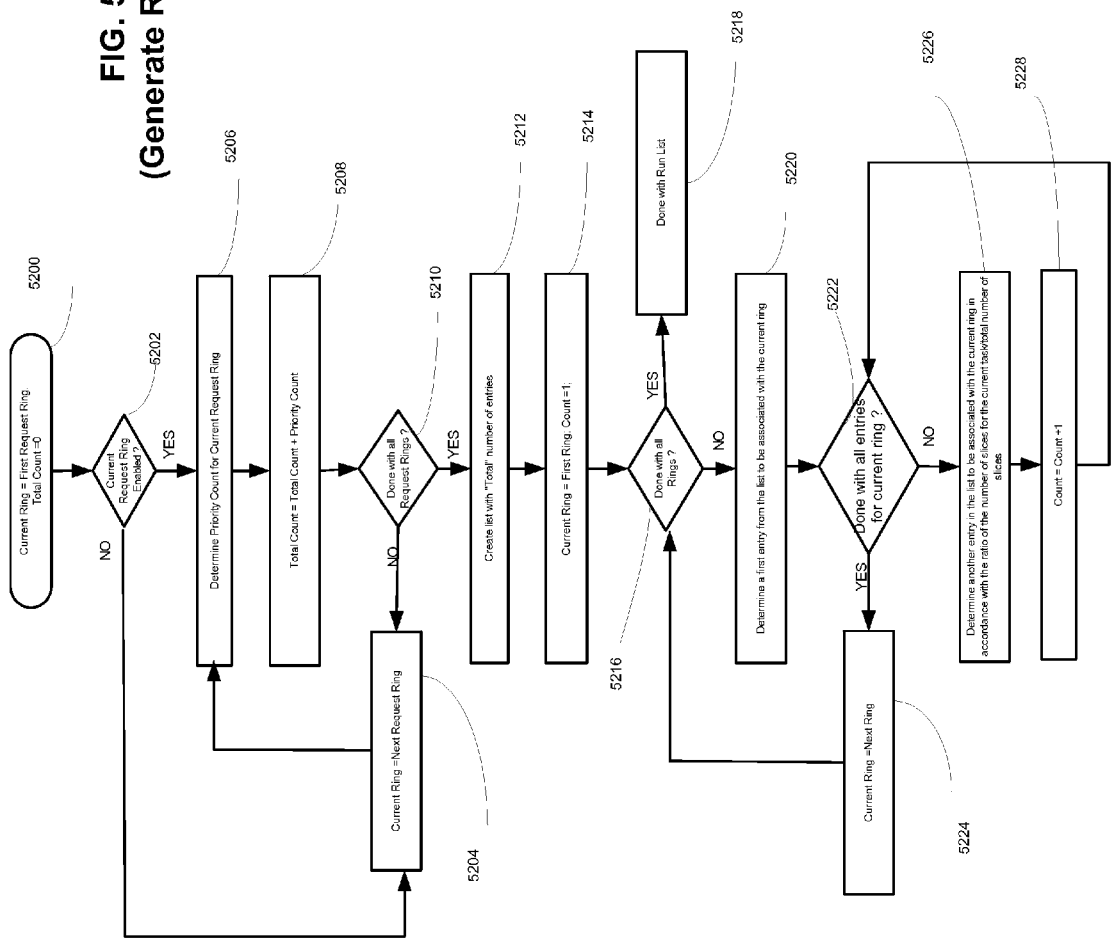
FIG. 5A is a block diagram of an exemplary one of a pair of data pipe groups used in the data pipe section of FIG. 5 according to the invention.
FIG. 5F is an overall flowchart of a process used to control the flow of user data through a data pipe of FIG. 5.
FIGS. 5H through 5V are flowcharts of individual processes used in the process used to control the flow of user data through a data pipe of FIG. 5.
Figure 5K:
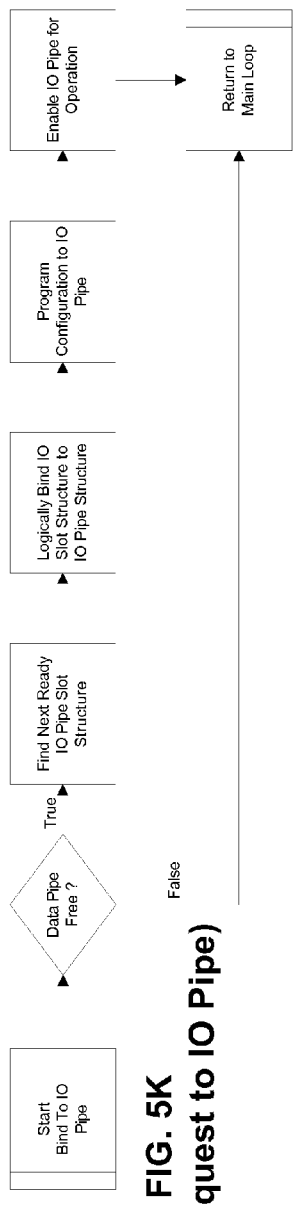
Figure 5L:
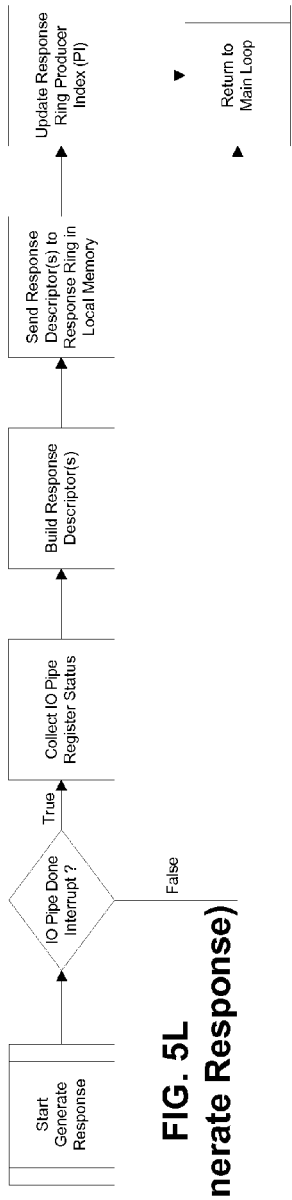
Figure 5M:
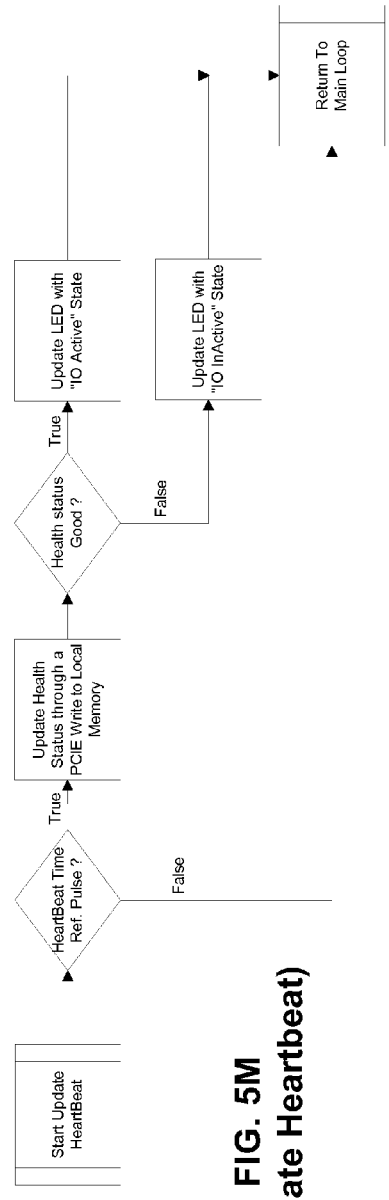

With either a destination storage processor 108 write or a source storage processor 108 read, if there is a Scatter-Gather Linked List (SGL), the ring manager 504 orderly manages the execution of Scatter Gather Linked List Entries (SGL) entries to the data pipe 502 until the TLC execution expires as described in detail in flowcharts FIGS. 5N, 5O and 5P, 5Q Steps 5118, 5126, 5128, and 5120; otherwise, when the user data transfer is complete (transfer length (TLC) expired or error completion), the data pipe 502 generates a "Transfer Done" interrupt to the ring manager 502 and the ring manager 504 produces a response descriptor, as detailed in FIG. 5L. The ring manager 504 increments the response ring 217 producer index (PI) to alert the CPU section that a response is available. This gives the CPU section an alert that the user data can now be found at its destination address, Step 5120.

More particularly, there are two classes of user data transfers; a Fixed Block transfer, and a Scatter-Gather (SGL) transfer. A fixed block transfer typically has one source and one or two destination address and the user data is contiguous in memory. If a user data transfer requires multiple source addresses (i.e. the transfer is not contiguous in memory), SGL entries (scatter-gather list entries) can be linked together with the head of the list being request descriptor on the request ring 215 (FIG. 2). Each SGL entry defines a partial user data transfer with one source pointer and one or two destination pointers.

All fixed block user data transfers are typically defined using a FDMA (Fixed Block DMA Request) IO request descriptor (shown in FIG. 5S) which are placed directly on the request ring 215 (FIG. 2). This request descriptor fully describes the user data transfer operation. For example, an FDMA remote write operation moves a contiguous block of data from local memory of one storage processor 108 to a remote storage processor 108 memory. When the ring manager 504 receives an FDMA IO request descriptor with the transfer control fields indicating the data source is local memory and the destination is remote memory, the ring manager 504 will program a free (write) data pipe 502 with the remote memory address, local memory address, TLC, CRC seeds, and CRC control. An FMDA remote read operation moves data that is stored contiguously in remote memory to local memory. When the ring manager 504 fetches an FDMA IO request descriptor with the transfer control fields indicating the data source is remote memory and the destination is local memory, the ring manager 504 will program a free (read) pipe with the remote or "Upper" address, local memory (PCI) or "Lower" address, upper and lower TLC's, CRC seeds, and CRC control, etc. The data pipe 502 will post up to eight reads to the SRIO fabric (NREAD)(i.e., packet switching network) and wait until the data response packets are directed back to the data pipe 502 by the SRIO endpoint and SRIO Router 902A, 902B. The response headers are sequence checked by the data pipe RIO manager, validated and discarded. The payload data can optionally be processed by the various CRC data protection machines (CRC_Tx and CRC_Rx in lower machine 512) before heading to PCIE and local memory. As each SRIO response packet arrives, a new read request (NREAD) can be issued. After the entire sub-transfer is completed, the ring manager 504 will receive a Done interrupt.

All scatter-gather user data transfers are typically defined using a scatter-gather list (SGL). The SGL is a linked list data structure, where the head of the list is a request descriptor on the request ring 215 (FIG. 2), and the remaining entries called SGL entries are linked via next pointers contained within each SGL Entry. The SGL lists are also referred to as 'spokes', as shown in FIG. 5S. There is no ordering between work on different 'spokes' but work along one spoke, of here 3 spokes $S_0$, $S_1$ and $S_2$ (FIG. 5S) has to be executed in order.

Still more particularly, the process begins by an initialization and configuration wherein the ring manager 504 is reset, and the request ring 215 (FIG. 2) is initialized. During this initialization of configuration, an arbitration process generates a run list; i.e., prioritizes the request ring 215 (FIG. 2) to be requested as will be described in more detail in connection with flowchart FIG. 5I. Suffice it to say here that, as described in U.S. Pat. No. 7,178,146, the entire contents thereof being incorporated herein by reference, each task to be executed is determined by a count representing the number of times out of the total run list each task is considered for scheduling. The total run list is the sum of all the counts for all tasks. Each time a task starts, exits, or has its count reset, the total number of counts is computed and tasks are distributed throughout the run list. Each task is distributed in the run list in accordance with its number of counts such that a minimum number of intervening tasks appear between each successive appearance of the same task. The computed run list is then used by a scheduler program in the ring manager 504.

Figure 5T:
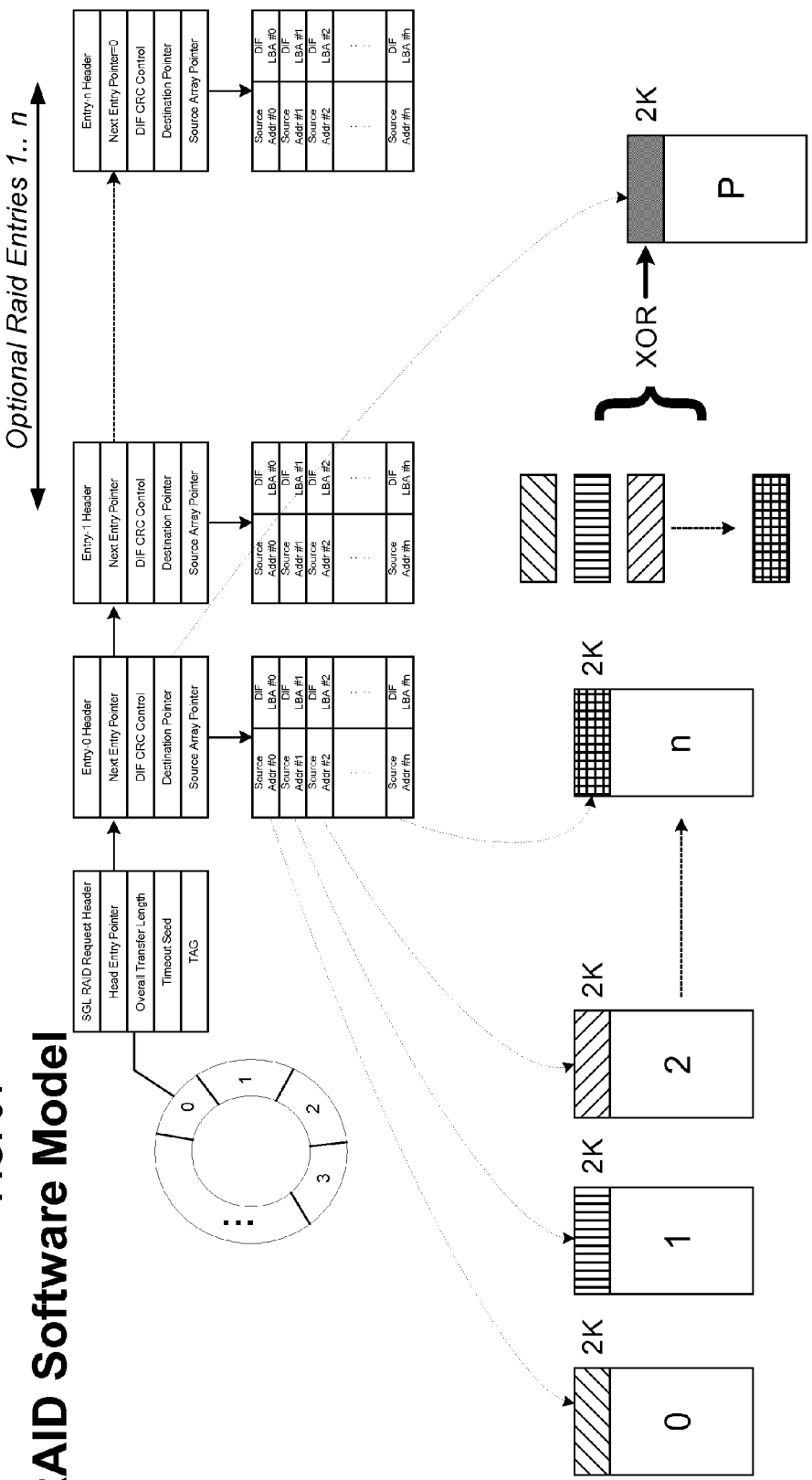
Figure 5U:
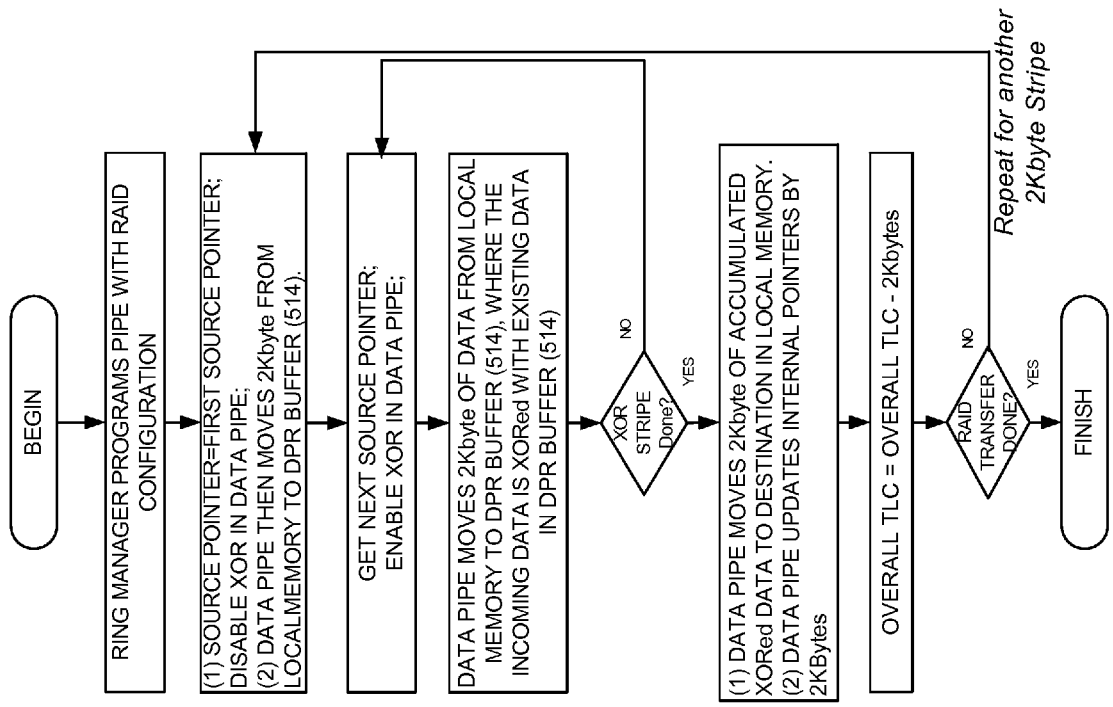
Figure 5V:
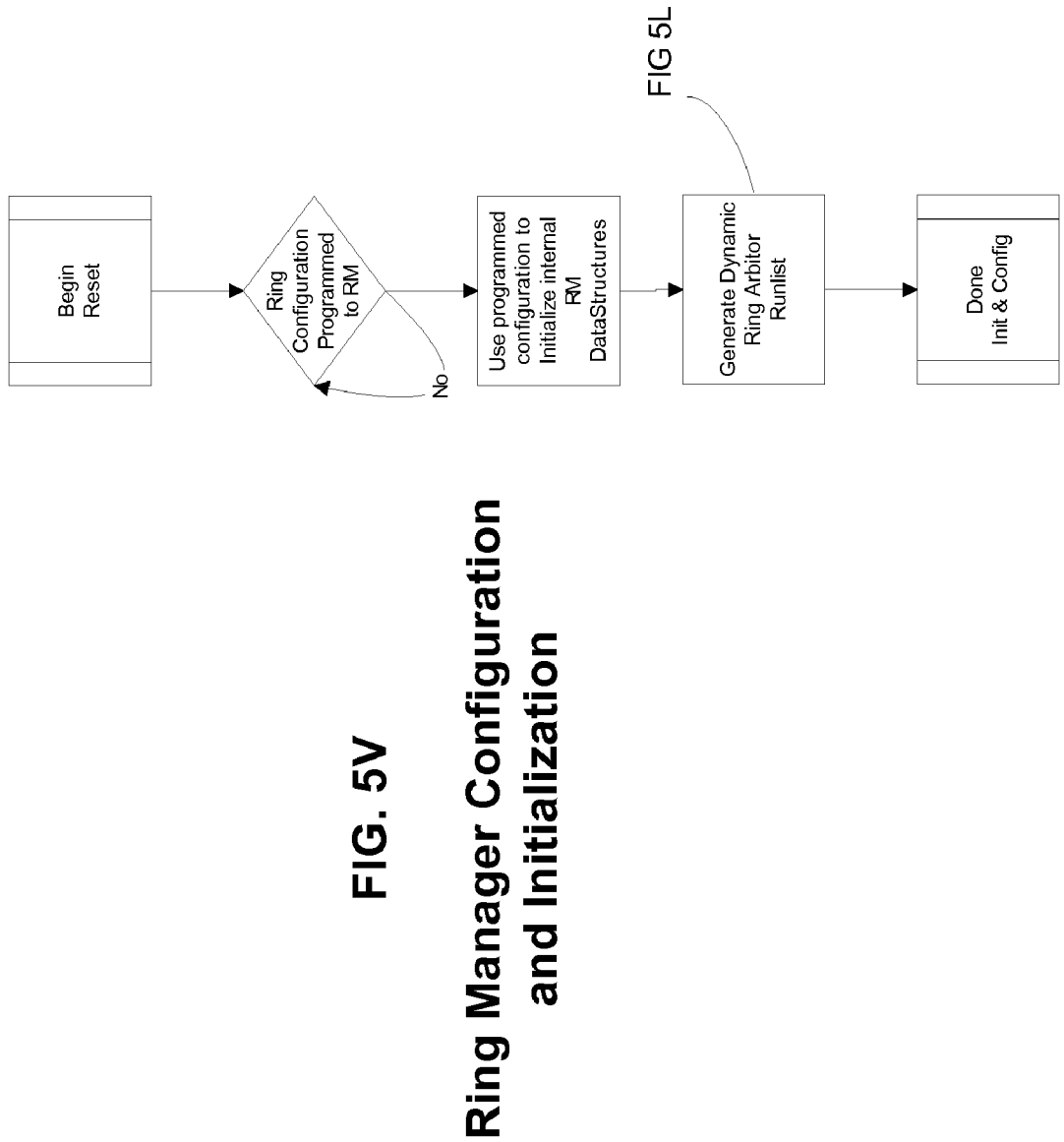

Thus, referring to flowchart FIG. 5V, during the initial configurations process, the request and response descriptor rings 217 (FIG. 2) in the local/remote memory are initialized by the CPU section in accordance with a system level program defined by the system interface. Next, the run list is generated by the ring manager 504 in generally accordance with the above described this U.S. Pat. No. 7,178,146 as will be described below in connection with FIG. 5V.

Referring again to flowchart FIG. 5V, after the run list is generated, the initialization and configuration process is completed.

As described briefly above in connection with flowchart FIG. 5G, when the producer index (PI) is greater than the consumer index (CI), the ring manager 504 (FIGS. 5A, 5B) fetches a descriptor from a request ring 215 (FIG. 2) pointed to by the prioritized run list, as shown in more detail by the flowchart in flowcharts FIG. 5H. First, the ring manager 504 determines where an IO slot is available. If it is available, the ring manager 504 (FIGS. 5A, 5B) reads the current ring number or ring ID from the runlist. Then, if the ring is enabled, and the ring is empty; the runlist ring pointer is incremented. In the other hand, if the ring is not empty, and if there is room for a response on the response ring 217 (FIG. 2), the ring manager 504 fetches an IO request descriptor from the local memory.

Referring now to FIG. 5J, the descriptor is read from the request descriptor ring 215 (FIG. 2) in the local/remote memory. The ring manager 504 first determines if there is a descriptor available in its local buffer. If there is a descriptor ready, the ring manager 504 then determines whether there are any available I/O data pipes 502. When a data pipe 502 is available and after the read descriptor is ready, the ring manager 504 reads in the descriptor and updates the request descriptor ring 215 (FIG. 2) consumer index (CI). Next, the ring manager 504 logically parses the request descriptor ring 215 (FIG. 2) for common programming errors. Next, if any errors are detected in the parsing stage, the ring manager 504 immediately generates a response descriptor and places it on the response ring 217 (FIG. 2) to terminate the IO (i.e., the user data transfer). If there are no errors, the ring manager checks the SYNC bit in the descriptor. If the SYNC bit is set, the ring manager needs to ensure that descriptors fetched from the request ring 215 (FIG. 2) are executed coherently. In other words, the ring manager needs to ensure that all fetched request descriptors are executed completely before the next descriptor is fetched and dispatched to a data pipe 502.

Next, referring to flowchart FIG. 5K, the ring manager 504 binds the control configuration in the descriptor to the available one of the, here for example, four I/O data pipes. More particularly, the ring manager 504 finds the next ready or available data pipe, it being recognized that while all I/O data pipes 502 are initially available, since each of the I/O data pipes pass user data packet to the packet switching networks at different rates depending on the number of user data packets being buffered in the different ones of the here I/O data pipes 502, different ones of the data pipes 502 may be available at different times. In any event, the available data pipe 502 having the user data packet is configured in accordance with descriptors in the ring manager 504 associated with the user data packet and the data pipe 502 processes the user data packet through the data pipe 502 as such data pipe 502 is configured by the descriptor in the ring manger 504.

Referring now to flowchart FIG. 5L, once the data pipe 502 has processed the user data transfer, the ring manager 504 builds a response descriptor and sends the built response descriptor to the response descriptor ring 217 (FIG. 2) in the local/remote memory of the source storage processor 108. The CPU section is notified of the new response when the ring manager 504 updates the response ring producer index via a memory write to local memory. The user data transfer through the data pipe 502 is now complete.

Next, the ring manager 504 determines by examining the retrieved descriptor whether the descriptor is a scatter-gather (SGL) descriptor. If not, the ring manager 504 services the next descriptor in accordance with the above-described prioritization from the descriptor rings for use by the available data pipe 502.

Referring to FIGS. 5N, 5O, 5P (RAID), 5Q On the other hand, if the retrieved descriptor is an SGL, the ring manager 504 must gather the portions making up the IO transfer from the various memory regions in the local memory. More particularly, the ring manager 504 is responsible for managing the execution order of entries along each linked list. Each SGL entry can be treated a sub-transfer, where the data pipe moves one of the scatter-gather blocks from source to destination. Each SGL entry sub-transfer requires the data pipe to be programmed with a new data pipe configuration. The sum of all SGL entry transfer lengths equals the total transfer length count defined in the overall TLC field as shown in the SGL Request Descriptor, see FIG. 5S. A response descriptor for an SGL user data transfer will not be generated by the ring manager 504 until all entries in the linked list are complete. A typical ring structure highlighting the SGL spokes is shown in FIG. 5S.

More particularly, the ring manager 504 prefetches the SGL entry as shown in flowchart FIG. 5N. More particularly, a ping pong buffer management process is used to prefetch SGL Entries from the linked list. Once an SGL Entry is being executed by a data pipe, the ring manager 504 prefetches the next linked SGL entry such that it is ready for execution when the data pipe completes the current SGL entry.

Next, the ring manager 504 processes the prefetched SGL request entry as shown in more detail in flowchart FIG. 5O. As shown therein, the ring manger 504 reads the prefetched SGL entry from its local prefetch buffer within in the ring manager 504. It then logically parses the SGL entry for common programming errors, and flags any errors in the entry. If any errors are found the ring manager 504 generates an error response descriptor and places it on the response ring 215 (FIG. 2) to terminate the IO (i.e., user data transfer).

Referring to FIGS. 5R and 5S, a method is described for mapping standard producer/consumer rings 215, 217 (FIG. 2) to the I/O data pipes 502. More particularly, the method maps high level DMA data structures which know nothing about underlying hardware to multiple parallel, physical, I/O data pipes 502. In the PCIE/SRIO Controller 212 (FIG. 2), there are multiple competing request rings 215 (FIG. 2) for eight parallel I/O data pipes 502 (FIGS. 5A and 5B). Referring to FIG. 5R, The Ring Manager 504 provides an abstraction layer or "API" between the higher level data structures to the hardware I/O data pipes. This is done by constructing high level data structures called request descriptors, and placing them on standard producer/consumer rings 215, 217 (FIG. 2). All request rings 215 (FIG. 2) are prioritized using a dynamic prioritization algorithm described above and in connection with FIG. 5I (see U.S. Pat. No. 7,178,146 incorporated herein by reference). This algorithm generates a run-list of prioritized request rings 215 (FIG. 2) for execution. However request descriptors on a specific request ring 215 (FIG. 2) are unordered relative to each other, and user data transfers corresponding to these descriptors can complete out of on order on many I/O data pipes, unless the SYNC bit is encountered in a request descriptor. The SYNC bit when encountered will force ordering within a request ring 215 (FIG. 2) (as described above in connection with FIG. 5H, 5J). Responses may not be updated in the same order as the associated descriptors on the request ring 215 (FIG. 2), and are typically updated as the data transfer completes. A TAG in the response descriptor header, FIG. 5S, is used to match the original request descriptor. This allows for higher level software to complete IO's as response descriptors are placed on the response ring 217 (FIG. 2).

Referring to FIG. 5S, all request descriptors may or may not have linked SGL Entries. If a request descriptor is an SGL or RAID SGL IO, the ring manager 504 will queue all SGL entries to one data pipe 502. A data pipe 502 is dedicated to one ring 215, 217 (FIG. 2) descriptor slot including linked list entries connected to that descriptor. When all the SGL's associated with an index entry are complete, the pipe 502 is placed in the free pool of available I/O data pipes 502 and can be programmed again possibly in a different direction. The SGL linked lists can be referred to as spokes (FIG. 5S). There is no ordering between work on different 'spokes' but work along one spoke is executed in order.

Initially work on the rings 215, 217 (FIG. 2) are assigned to free I/O data pipes is ascending fashion until all pipes are busy. There are four data pipes assigned to each Ring Manager 504. Data Pipe_0 (FIG. 5A) in this example is executing a SGL linked list. Data Pipe_1 is executing a RAID SGL linked list and Data Pipe_2 are executing an FDMA descriptor. If all other data pipes are busy, the next data pipe assigned would be Data Pipe_3. The ring manager 504 then wait until one of the four pipes 502 becomes free. If for example data pipe_2 becomes free first, the ring manager 504 would assign the next descriptor to this data pipe.

Note there are two variations of SGL Descriptors, SGL IO and SGL RAID, see FIG. 5S.

An SGL RAID is similar to an SGL IO in that it performs scatter-gather operations, in the case of RAID, it performs a scatter gather RAID-XOR operations on scattered raid packets from local memory. For a RAID SGL, there are also SGL entries but the format is different, hence it is called a RAID SGL entry. For SGL RAID, there is an extra prefetch step which involves reading a RAID Source Array Packet (FIG. 5P) from local memory. The raid source array contains up to 15 source addresses, and 15. LBA fields.

Next, as shown in FIG. 5K, when the user data transfer completes (FDMA or SGL) the data pipe 502 sends a done interrupt to the ring manager 504. The ring manager 504 then re-connects with the data pipe 502, collects status of the user data transfer. The ring manager 504 then produces a response descriptor transfers it to the response ring 217 (FIG. 2), and updates the response ring 217 (FIG. 2) producer index. The CPU Section will eventually remove this response descriptor and update its consumer index to complete the IO operation.

The data pipe 502 is now configured in accordance with the retrieved descriptor for processing the user data from the host computer/server to one or both packet switching networks.

Method for Generating Runlist (FIG. 5I)

Referring now to FIG. 5I, the process of the ring manger 504 in generating the runlist is described. Briefly, a non-priority based technique is used in which each task, here descriptor in the request ring 215 (FIG. 2) to be executed, is allotted a count representing the number of times out of the total run list each task is considered for scheduling. The total run list is the sum of all the counts for all tasks. Each time a task starts, exits, or has its count is reset, the total number of counts is computed and tasks are distributed throughout the run list. Each task is distributed in the run list in accordance with its number of counts such that a minimum number of intervening tasks appears between each successive appearance of the same task. The computed run list is then used by the ring manager 504.

More particularly, first, the ring manager 504 sets the Current Request Ring 215 (FIG. 2) equal to the First Request Ring and sets the Total Count of all rings 215 (FIG. 2) equal to zero, Step 5200.

Next, the ring manager 504 determines whether the Current Request Ring is Enabled, Step 5202. If not, the ring manager 504 sets the current ring equal to the next ring and the ring manager 504 determines the priority count for the current ring, Step 5204; on the other hand, if the Current Request Ring is Enabled, the ring manager 504 determines the priority count for the current ring, Step 5206.

Next, the ring manager 504 sets the Total Count=Total Count+Priority Count, Step 5208.

If the ring manager 504 has not accounted for all request rings 215 (FIG. 2), Step 5210, the ring manager 504 sets the current ring equal to the next ring and the ring manager 504 determines the priority count for the current ring, Step 5204.

In the other hand, if the ring manager 504 has completed all request rings 215 (FIG. 2), the ring manager 504 creates a list with the "Total" number of entries, Step 5212.

Next, the ring manager 504 sets the Current Ring=First Ring and Count=1, Step 5214.

If the ring manager 504 is done with all request rings 215 (FIG. 2), Step 5216, the run list is completed, Step 5218. On the other hand, if the ring manager 504 is not done with all request rings 215 (FIG. 2), the ring manager 504 determines a first entry from the list to be associated with the current ring, Step 5220.

If the ring manager 504 is done with all entries for the current ring, Step 5222, the ring manager 504 sets the current ring equal to the next ring and again determines whether all rings are done; Step 5224, if not, determines an first entry from the list to be associated with the current ring and the process repeats as shown, Step 5216.

On the other hand, if the ring manager 504 is not done, Step 5222, with all entries in the current ring, the ring manager 504 determines another entry in the list to be associated with the current ring in accordance with the ratio of the number of slices, a higher allocation of work, (i.e., there are more time slices given to higher priority rings for the current task/total number of slices, Step 5226. That is, the run list algorithm divides up the total allocation of work into slices, giving a larger allocation to high priority rings.

Next, the ring manager 504 sets Count=Count+1 and the process repeats as shown, Step 5228.

RAID Hardware Assist

Referring to FIGS. 5S and 5D, a hardware assist function to accelerate RAID XOR operations for disk drive parity calculations and rebuild data in case a portion of such data stored in one of a plurality of disk drives fails from the remaining ones of the disk drives is now described. The method described is a RAID XOR assist for "in-place" data (i.e., data in local memory). DIF protection is optionally supported for RAID XOR operations.

Referring to FIGS. 5T, 5U, RAID hardware assist functionality is invoked by placing SGL Raid Descriptors on one or more of eight standard producer-consumer request rings 215 (FIG. 2) (FIG. 5T). Each request descriptor contains a pointer to the RAID SGL entry linked list. At a minimum the number of SGL entries needs to be one for the RAID Hardware assist. Optionally, the number of linked list entries can be added onto the linked list for other pools of data to be included in the disk drive parity calculation and rebuild. Each SGL Entry Linked List optionally contains a pointer to the next entry in the linked list, a pointer to its local source address array, and a destination address. This source address array contains pointers to the source blocks in local memory to be XOR-accumulated. The destination address points to a local memory address where the accumulated parity result is stored. Up to fifteen source addresses are supported in each source array block. The SGL entry linked list is used to ensure that source blocks are XOR-accumulated in a coherent fashion.

Referring to FIG. 5A, 5B, any or all of the eight I/O data pipes 502 (4 I/O data pipes 502 per Ring Manager 504) can be configured for the RAID XOR operation by the ring manager. Referring now to 5D, each I/O data pipe contains a XOR Section 536 which contains a 72-bit XOR tree 530, here shown for simplicity as a single XOR gate (FIG. 5D) a 2K byte accumulate buffer 514, (FIG. 5D) to perform the XOR operation and a XOR path selector 532. Selector 532 would be configured (by the IO Data Pipe Manager 510 (FIG. 5D) based on XOR control field in the request descriptor) to select the XOR tree 530 and selector 534 would be configured to select the "lower" machine 512 data path, in this case, the input user data to be XOR accumulated.

Referring to FIG. 5A, 5S, the CPU Section 204 would set up n IO read transfers (0, 1, 2, . . . n) to collect all the RAID group source blocks from remote memory into local memory. This process of moving the drive data to local memory is first needed to be done before the "in-place" XOR-accumulate can take place.

Once the data is in place in local memory, the CPU Section 204 would then place an SGL RAID request descriptor on a request ring 215 (FIG. 2), including a pointer to an SGL entry linked list and the associated source array packets. The source address array would contain n source address pointers which point to blocks 0, 1, 2, . . . n. The ring manager 504 fetches the descriptor and finds a free data pipe 502 to assign the work. Before programming the selected data pipe 502, the ring manager 504 additionally fetches a RAID SGL Entry and its associated RAID source array. If the fetch process was successful, the ring manager 504 proceeds, to program the selected data pipe 502 with the source addresses, destination address, transfer length count and DIF CRC protection registers in the IO data pipe manager 510 registers, if enabled.

The ring manager 504 then enables the data pipe 502 for operation. Using the source addresses programmed into the data pipe 502, each of the blocks would be read one by one into the 2 Kbyte accumulate buffer (i.e., DPR 514). Internally the data pipe 402 hardware manages n+1 internal address pointers over the 64 Kbyte transfer as follows. Once the 2 Kbytes accumulate buffer (i.e., DPR 514) is full, the data pipe 502 hardware updates (n source pointers+1 destination pointer), for the RAID blocks and updates each pointer by 2 Kbytes. For the first transfer, the data pipe 502 reads Block 0 into its 2K accumulation buffer DPR 514). When the data pipe 502 completes the 2 Kbyte transfer, the data pipe 502 will proceed to move Block 1, 2, . . . n with the data pipe configured to XOR.

After all the source blocks are XOR accumulated, the data pipe flushes (PCIE write) the 2 Kbyte accumulation buffer to the destination pointer. This 2 Kbyte XOR-accumulate process is pictorially represented by the shaded 2 Kbyte stripe in Data Block P in FIG. 5T). The process would then be repeated for another 'stripe' across 0, 1, 2, . . . , n and destination until the overall transfer length count in the Raid SGL Descriptor has been completed. For example, given a 64K transfer, and three source blocks plus one destination block, a total of 32×4=128 sub-transfers are required to complete the entire XOR accumulate. The 128 reprograms are transparent to the Ring Manager 504, instead a state machine in data pipe 502 handles the reprogramming for each 2 Kbyte block.

The data pipe 502 can handle only 64 Kbytes in any one XOR accumulate session. If the overall transfer length as outlined in the RAID SGL request descriptor is larger than 64 Kbytes, the ring manager 504 manages the reprogramming the data pipe 502 for additional 64 Kbytes or whatever the residual transfer length remaining to complete entire XOR operation.

Once the entire RAID XOR operation is complete, the ring manager 504 generates an SGL RAID response and places it on the response ring.

Slave Data Pipe 506

Referring now to FIG. 5E, the Slave Data Pipe 506 (sometimes referred to herein as the Slave IO_Pipe (SIOP)) is shown. The SIOP module 506 is an SRIO slave device. All request packets are initiated by a (master) I/O Pipe(s) across the packet switching networks as shown in FIG. 5C or FIG. 1B for the case where the source and destination nodes refer to the same source SP. To support the full bandwidth of PCIE and SRIO, two SIOP's 506 were instantiated within the PCIE/SRIO Protocol Controller 212, with one SIOP 506 dedicated per SRIO port with independent interfaces to the PCIE End Point as shown in FIGS. 5, 5A, 5B.

The Slave IO_Pipe (SIOP) 506 is an autonomous SRIO-to-PCIE endpoint protocol translation element. Its primary function is to facilitate SRIO read and write access to a PCI-accessible local memory. It will translate SRIO-sourced read and write request packets to corresponding PCIE request packets. It translates/assembles PCIE read completion packets to corresponding SRIO read response packets. It independently processes request and response packets by simultaneously moving write request data from SRIO to PCIE and read response data from PCIE to SRIO to maximize performance.

The Slave IO Pipe has the following duties/capabilities:
- To inspect, parse and queue incoming SRIO read and write request packets into separate staging/processing queues
- To prioritize and process queued SRIO requests with sensitivity to:
  a) Order of receipt, since it's possible for the root complex to reorder requests
  b) Available PCIE End Point packet buffer resources
  c) SRIO and PCIE ordering rules
- To format and send SRIO Error Response packets in response to unserviceable SRIO request packets (if the sender can be identified)
- To translate valid incoming SRIO request packets into corresponding PCIE request packets
- To format and send SRIO Write Response packets upon receipt of corresponding PCIE Write Request packet commit flags
- To validate, aggregate and reorder (if necessary) received PCIE Read Response packets
- To format and send SRIO Read Response packets upon receipt of requested PCIE read completion data As shown in FIG. 5E, the slave data pipe SIOP 506 is shown in more detail. As described above in connection with FIG. 5A, port 506A is connected via port 500P to the PCIE endpoint 300 (FIG. 3) and a port 506B is connected via port 502APA to the SRIO Router A 902A (FIG. 3). Each data path also contains associated buffering, steering and handshake logic. As implied in the overview, the Slave IO Pipe (SIOP) 506 is a dual-data path full-duplex pipeline with in-line (store-forward) data storage. There is independent pipeline hardware dedicated to SRIO request and to SRIO response data. There are queuing/staging/rate-matching buffers in both directions managed by functionally asynchronous input and output ("upper" SRIO and "lower" PCI) control machinery. There is independent control machinery dedicated to SRIO request receipt, PCIE request transmission, and PCIE response receipt and SRIO response transmission.

A brief description for each of the control functions in FIG. 5E is described below:

SRIO_Rx_Control 550: Autonomous logic which receives incoming SRIO packets from the SRIO Router 902A, 902B, validates, condenses & queues packet header information, and sizes & queues packet payload (if any). Two header FIFO queue's (read FIFO queue 554 and write FIFO queue 552 as selected by selector 576) will be maintained, each sized to contain 4 (minimum) 2-word packet header entries. Write header entries will not be posted until the associated payload (which is stored in the write data FIFO 574 has been counted and queued. Header queue watermarks are available to the SRIO Router 902A, 902B module for SRIO End Point buffer credit calculation purposes.

PCI_Tx_Control 556: Autonomous logic which monitors SRIO read FIFO 554 and write FIFO 552 request header queues (loaded by SRIO_Rx_Control 550), negotiates with PCIE End Point section 300 for access to the PCIE End Point, formats and transmits PCIE request packets (observing PCIE configured read packet posting limits and 4K address boundaries) and queues condensed SRIO read and write response information to write and read response FIFOs (560, 562) for further processing. During transmission of packets to PCIE End Point, selector 572 selects the request header (552, 554) or the data payload from the write data FIFO 574 to form the PCI-E request packet.

PCI_Rx_Control 564: Autonomous logic which receives incoming PCIE read response packets (requested by PCI_Tx_ Control 556 from PCI-End Point 300 validates packet headers, and aggregates, orders and queues packet payloads to the DPR (Dual Ported RAM) 566. Each packet header will contain an incrementing (0-3) tag used to index into the DPR 566. The DPR 566 is sized to contain four 256-byte packets (the PCIE read request post limit maximum). The DPR 566 will behave like an indexing register file on the "load/PCI" side and a quad FIFO (i.e., DPR 566) on the "unload/SRIO" side. The write address (WA) and write enable (WE) is used to control the DPR 566 when the read data is loaded into the DPR 566.

SRIO_Tx_Control 568: Autonomous logic which monitors SRIO read and write response queues 562, 560, respectively, (loaded by PCI_Tx_Control 556), monitors DPR 566-resident PCIE read response payload FIFOs (i.e., DPR 566) negotiates with the SRIO Router 902A, 902B for SRIO endpoint access and formats and transmits SRIO response packets. The read address (RA) and read enable (RE) is used to control the DPR 566 when the read data is unloaded from the DPR 566. During transmission of packets to the router, selector 570 selects the response header 568 or the data payload from the DPR 566 to form the PCIE request packet.

Other considerations related to read request processing:

Read completions can be broken up by the root complex 202 into 64 or 128 byte packets following the read completion rules found in the PCI-E standard. Completion data associated with a particular outstanding read request (ORR) Tag is aggregated into the selected DPR FIFO 566 until the read request word count is satisfied which could take between 1-4 PCIE completion transactions from the PCI-End Point since the maximum SRIO read request size is 256 bytes. If more data arrives than requested, SIOP poisons the DPR entry, queues an error response to the initiating SP, and logs an error. Read completions may or may not arrive in the same order the read requests were transmitted to the root complex 202. To handle out of order read completions, the SIOP maintains an ORR (outstanding read request) tag that also uses a field within the PCIE request packet to track outstanding completions to their associated requests.

To reduce the impact of root complex latencies on read performance, the SIOP supports "posting" of up to 4 read requests to PCIE with a programmable setting used for performance tuning As known in the art, the idea is to hide the effects of relatively slow read completion latencies as much as possible by pipelining read requests before a previously issued read request completes.

Per the PCIE express standard, a read or write request cannot be allowed to cross a 4K boundary. However, since the SRIO standard has no such restriction, accommodations must be made to satisfy both standards.

Message Engine (ME) 600

Figure 6B:
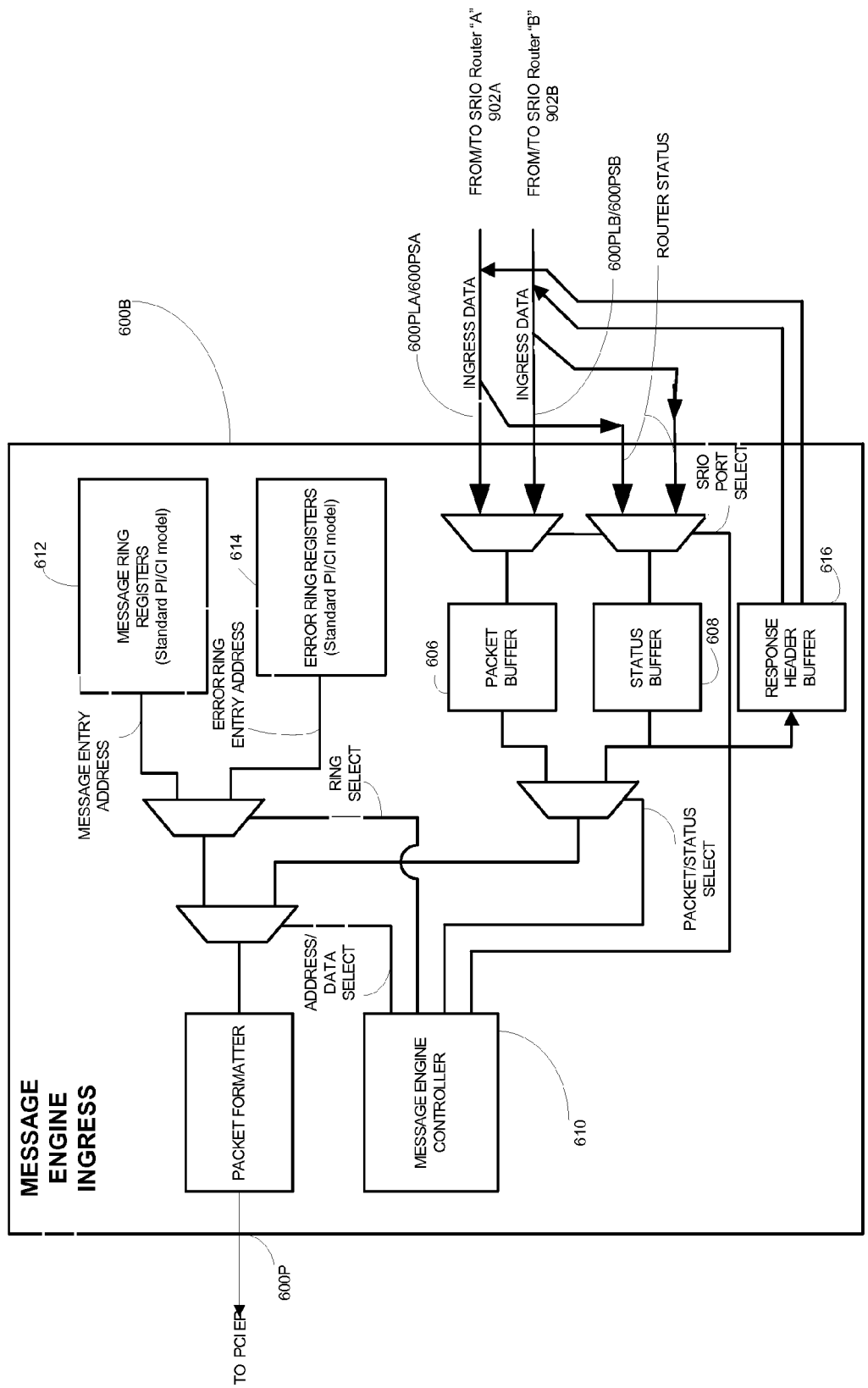
FIG. 6B is a block diagram of the ingress ME portion of the ME of FIG. 6.

Referring now to FIG. 6, the message engine (ME) 600 includes an egress message engine (ME) section 600A and ingress ME section 600B. Both ME 600A, 600B are connected to the PCIE End Point 300 port 600P as shown in FIG. 3. The egress ME 600A is connected to SRIO A 1000A via SRIO Router 902A port 600PSA and is also connected to SRIO B 1000B via SRIO Router B router 902B port 600PSB, as shown in FIGS. 3 and 6A. The ingress ME 600B is also connected to SRIO A 1000A via SRIO Router 900A and SRIO Router 902A and to SRIO B 1000B via SRIO Router B 900B and SRIO Router 902B, as shown in FIGS. 3 and 6B. The egress ME 600A is used primarily to transmit messages (i.e., SRIO message packets) to one or more of the other ones of the storage processors. More particularly, the Message Engine (ME) 600 (FIG. 3) works as a full duplex message pipe which is used as a means to communicate between one SP 108 to other SPs 108 on a storage system 100 (FIG. 1). The ME 600 is associated with three rings 220, 222, 224 stored within the local memory 210 (FIG. 2): the outbound message ring 222, the inbound message ring 220 and an inbound error ring 224 (FIG. 2). The ME 600 connects to the PCIE end point (EP) 301 (FIG. 3) and then to the packet switching networks 112A, 112B via two SRIO Router A 900A, SRIO Router 902A, SRIO Router 900B, SRIO Router 902B and the SRIO A 1000A, SRIO B 1000B end points as described above.

The egress ME 600A permits a SP 108 to send a message to ingress MEs 600B of other SPs 108 through either of the packet switching networks 112A, 112B using associated outbound message rings 222. An ingress ME 600B is used for packets directed to the message ring 220 or error ring 224 (FIG. 2). The inbound message ring 220 stores incoming messages arriving from remote SP 108. The ME 600 collects errant packets on the packet switching networks 112A, 112B and stores them to the inbound error ring 224 to facilitate system debugging.

The egress message engine 600A implements a "transparent mode" operation in which the packets on the outbound ring 222 are formatted by software to closely match the format used by the SRIO End Points SSIO A 1000A and SRIO B 1000B, FIG. 3. With "transparent mode" software can use the ME 600 for variety purposes besides sending messages, such as to send maintenance packets, inject packet errors on the packet switching networks 112A, 112B or to test error recovery methods.

Figure 6C:
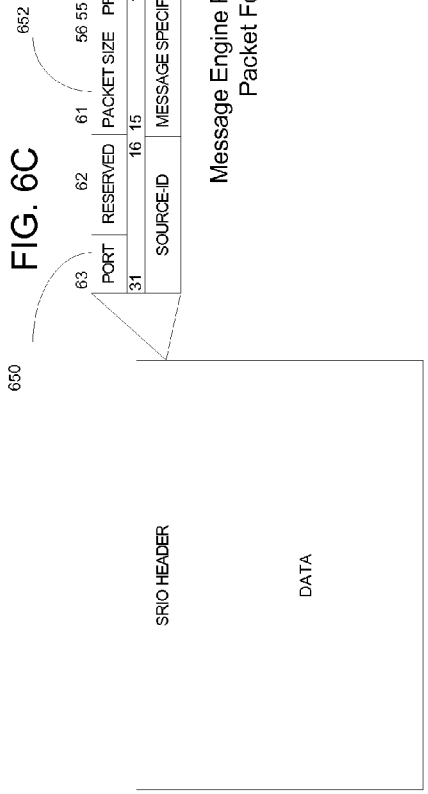
FIG. 6C shows a ME PCIE outbound packet format used by the ME of FIG. 6.

Referring now to FIG. 6A, to send an egress Message from an egress ME 600A of a source SP 108 to the ingress ME 600B of other SPs 108, (i.e., destination SPs), the source SP 108 will first put the message(s) on a 512 byte slot of the "outbound message ring" 222 (FIG. 2) in the format shown in FIG. 6C. The source SP 108 will then update the ME's outbound ring producer index (PI) to let the egress ME 600A knows that there is a message(s) on the outbound message ring 222 that is needed to send out. The egress ME 600A will perform a PCIE read of 128 byte to retrieve the packet and then store it inside its packet buffer 602. If the "Packet Size" field 652 indicates that the SRIO packet is greater than 128 byte, the egress ME 600A will read the remaining bytes of the packet. After receiving the completed SRIO packet as indicated in the "Packet Size" field 652, the egress ME 600 formats the PCIE packet into SRIO packet format 604 by removing the "Port" field 650 and the "Packet Size" field 652. Subsequently, the controller 608 will send the packet to the correct SRIO port 230A, 230B (FIG. 2) as indicate by the A/B port selector (i.e., the output of controller 608) (i.e., packet switching network 112A, 112B) as indicated by the Port bit (bit 63—FIG. 6C). Once the packet has been sent, the egress ME 600A updates the outbound address (address+1), the consumer index (CI+1) then issues an interrupt (as determined by a ring watermark threshold setting) to the source SP 108 CPU via a standard PCIE MSI-X interrupt.

Referring now to FIG. 6B, and flowchart FIG. 7A, for all inbound packets, once the ingress ME 600B receives the SRIO packet from the packet switching networks 112A, 112B, through the SRIO End Point 1000A, 1000B (step 780), and through the SRIO router (step 782), ME stores the packet in its packet buffer 606 and stores the router status FIG. 9I (to be described below in the SRIO router) in its status buffer 608. While receiving the SRIO packet, the ingress ME 600B counts the number of words (a word is 8 byte) in the SRIO packet (including the header) it receives and stores this "word count" in the status buffer 608. When the controller 610 sees the status FIFO 608 is not empty, it starts the process of writing the SRIO packet and the associated word count and status to either the inbound message ring 220 using the address in message ring registers 612 or inbound error ring 224 using the address in error ring registers 614 based on the incoming router status (from SRIO Router). (The router status is described in a later section.)

Figure 6D:
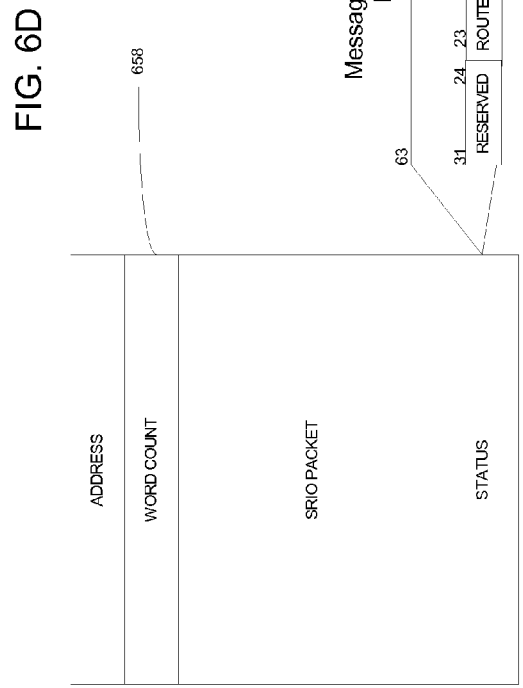
FIG. 6D shows a ME PCIE inbound packet format used by the ME of FIG. 6.

The procedure for writing the packet on the ring 220, 224 (FIG. 2) is same for message or error packet. The ingress ME controller 610 first selects the address from either the message ring registers 612 or error ring registers 614 based on the status of the packet as mentioned above. It then sends the word count from the status buffer 608, the whole SRIO packet from the packet buffer 606, and last is the status from the status buffer 608 (FIG. 6D). Once the whole packet has sent to the PCIE End Point (step 784), the ingress ME 600B updates its inbound message ring or error ring address (address+1), message or error ring producer index (PI+1) (step 786, FIG. 7A), writes the producer index to local memory (step 788), and sends an interrupt to the source SP 108. The CPU section 204 then examines (i.e. consumes) the received packet and writes to the consumer index (CI+1), step 790. For some specific inbound request message type, the ingress ME 600B needs to generates a response header and store in the Response Header Buffer 616 which will be sent out through the egress ME 600A.

If the ME ingress 600B encounters a fatal error (such as PCIE port 600P is not accessible) it enters a comatose mode. In this comatose mode, ME ingress 600B will not send any SRIO ingress packet it received from SRIO Router A 902A or SRIO Router B 902B to either message ring or error ring. ME 600B will discard the error packet. For message packet that ME 600B needs to do a response, it issues an error response back to the initiator.

SRIO Routers 902A, 902B

Referring now to FIGS. 9A and 9B, an exemplary one of the SRIO Router A 902A, SRIO Router B 902B, SRIO Router A 900A, SRIO Router B 900B, here 902 router is shown. Routers 900A, 900B, 902A and 902B are identical in design. The router 902 is segmented into two main functions, the egress portion 902E and the ingress portion 902I is shown.

The router supports dump mode and Drop modes. The dump mode is used when it is desirable to direct all inbound traffic from the packet switching network to the message engine error ring for system debug and fault diagnosis purposes. The drop mode is used to discard packets directed to the error ring.

Ingress Packet Routing (FIG. 9C)

Reference is made to U.S. patent application Ser. No. 11/238,514, filed Sep. 29, 2005, entitled MANAGING SEQUENCES OF MEMORY REQUESTS, inventors Magnuson, Brian D., Porat, Ofer, Campbell, Brian K. and Kosto, Steven, assigned to the same assignee as the present invention the entire subject matter thereof being incorporated herein by reference.

The SRIO End Point 1000A (FIG. 3) has 15 Ingress buffers 322, 15 Store & Forward Egress buffers 317 and 15 Low Latency Egress buffers 316. The SRIO End Point 1000A maintains the count of free egress buffer 317 (FIG. 3) locations that are empty and are ready for packets. SRIO End Point presents this free egress buffer count (PTL_CTS) to the router as described in the above referenced U.S. patent application Ser. No. 11/238,514.

One of the functions that router 902 performs is the maintenance of the RIO End Point egress buffers 31, 317. The router 902 has an internal register RSVD_BUF (not shown), which it used to maintain the count of reserved egress buffers 316, 317. Each time router 902 accepts and forwards a request packet to downstream clients (e.g., a data pipe 502, slave DSA 400S and ME 600), an egress buffer location is reserved for the response by incrementing the RSVD_BUF register.

The free buffer egress count (ADJCTS) is thus: ADJCTS=PLL_CTS−RSVD_BUF. If there are insufficient buffer locations (ADJCTS) available for a request packet, the packet is rejected by the router 900.

When sending a response or in case of an error condition, downstream client signals, the router to free up the reserved egress buffer. The router frees up the reserved egress buffer by decrementing the RSVD_BUF register.

Once the packet is sent to the router, it is routed to one of the downstream clients. If the packet is a request packet then it is routed to the slave client (e.g., a SIOP 506 or SDSA 400S). If the packet is a response packet then it is routed to the master client (e.g., master DSA 400M and IO Data pipe 302). Message packets are routed to the inbound ME (Message ring) 230 (FIG. 2). Packets with errors are routed to the error ring 224.

Referring to FIG. 9C, a packet received by the SRIO end point (EP) 1000A, 1000B (FIG. 3) is routed to either SRIO Router (SF path) 902A, 902B or SRIO Router (LL Path) 900A or 900B depending on the low latency bit in packet's destination ID. The SRIO End Point 1000A, 1000B uses router's free Ingress buffer count (IG_CTS) to determine how many more packets the router can accept from SRIO EP. This ingress buffer count is based on buffers available in the downstream clients (i.e. a data pipe) and free egress buffers (ADJCTS) available in the router to be described.

The Router keeps track of free Egress buffers and applies back pressure to SRIO End Point 1000A, 1000B based on the free egress buffer count and buffers available in the downstream clients.

It should be noted that the SRIO End Point 1000A. 1000B operates in a streaming mode (Step 912) or a non-streaming mode (Steps 918 and 921). In the streaming mode, the router can accept packets from the SRIO End Point 1000A, 1000B without the SRIO End Point 1000A, 1000B having to first present the packet to router. Router advertises free ingress buffer count of 2 or greater to put SRIO End Point in the streaming mode (Step 912). In the non-streaming mode (NPS mode), SRIO End Point presents the packet (Step 914) that it proposes to send to the router. If router and downstream clients have buffers available to accept that packet, then router changes free ingress buffer count to 1 (Steps 918, 921) to indicate that it can accept that packet. If the router can't accept the presented packet, it keeps free ingress buffer count value to 0 (Step 920) indicating that it can't accept the packet presented by SRIO End Point.

If the following conditions are true then the router changes the free ingress buffer count to 2 (Step 912) to go into streaming mode (non NPS mode):
1. Router has egress buffers available to accept at least two lowest priority packets (Step 911). AND
2. The ME 600 has buffers available to accept at least two packets (911). AND
3. Slave clients (i.e., destination SPs) have buffers available to accept at least two packets (Step 911).

If the above mentioned conditions are not true then the router applies back pressure to SRIO End Point by changing free ingress buffer count to 0 (Step 913). This puts the router and SRIO End Point in non-streaming mode (NPS Mode). In this mode, SRIO End Point will present (Step 914) the packet that it proposes to send to the router. If the proposed packet is not a request packet (915) and ME 600 has buffers available to accept at least one packet (919) then the router removes the back pressure by changing free ingress buffer count to 1 (Step 921). If proposed packet is not a request packet and ME 600 doesn't have buffers available to accept any packet then the router maintains back pressure by not changing free ingress buffer count from "0" (Step 920).

If the proposed packet is a request packet (Step 915) and the following conditions are true then the router removes back pressure and accepts the proposed packet by changing the free ingress buffer count to 1 (Step 918):
1. Router has free egress buffers available to accept the packet proposed by the endpoint (Step 916). AND
2. The ME 600 has buffers available to accept at least one packet (916). This is done incase the packet has errors and it needs to be routed to the error ring 224 (FIG. 2). AND
3. The client this packet is for has at least one buffer available to accept this packet 916.

If the proposed packet is a request packet (Step 915) but there aren't buffers available to accept that packet (916) then the router rejects this packet by maintaining free ingress buffer count of "0" (Step 920).

When router accepts a request packet, it increments reserved egress buffer count (RSVD_BUF) by one (Step 917).

Router Ingress Packet Routing (FIGS. 9A and 9B)

Figure 9D:
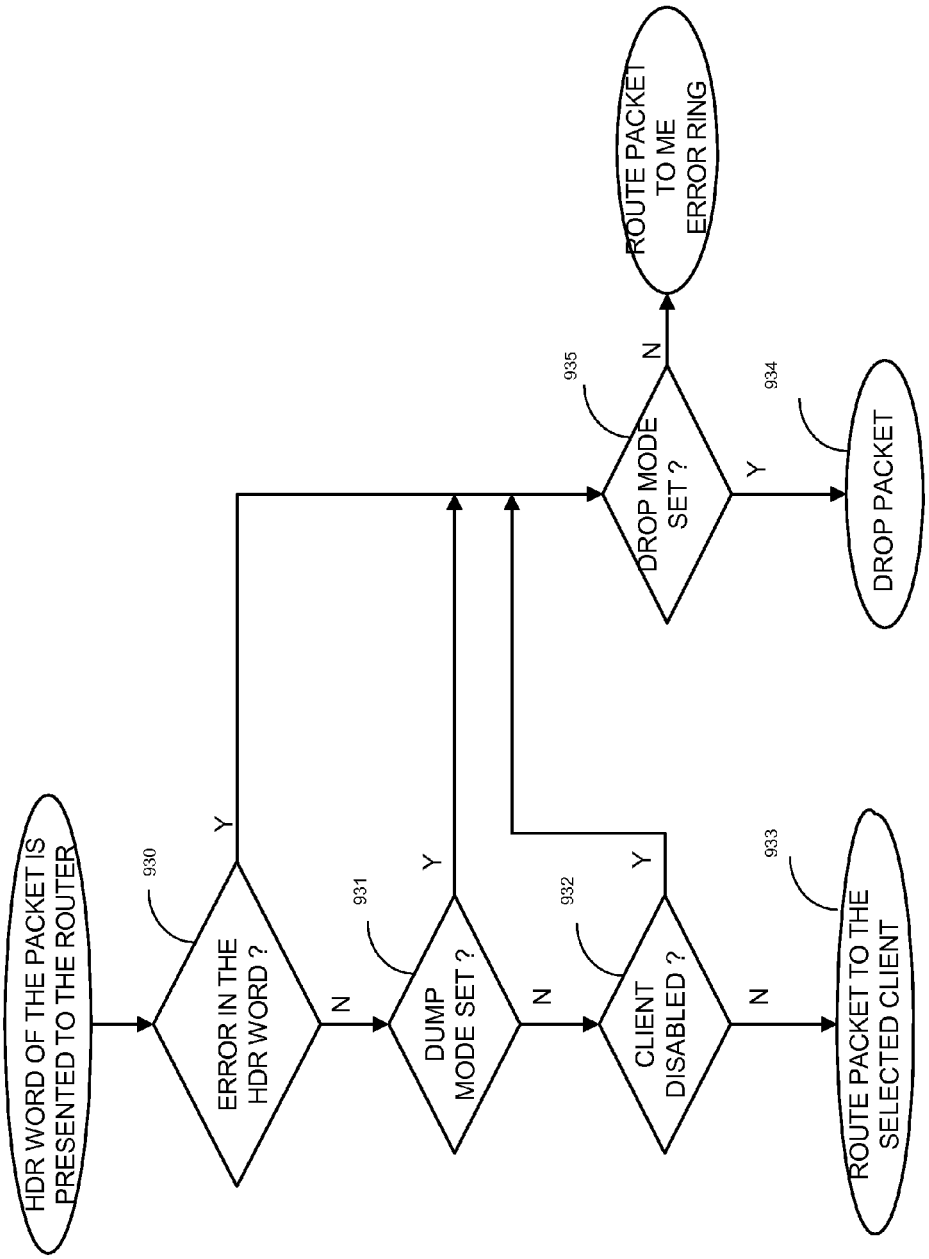
FIG. 9D is a flowchart of ingress credit management used by the router of FIG. 9B.

As shown in flowchart FIG. 9D, the SRIO End Point presents the packet to the router. The router checks the header word for errors and if there is an error in the packet's header (HDR) word (Step 930) then it routes the packet to the error ring 224. If the dump mode is set (931) then the packet is sent to the error ring 224. If the packet is directed to a disabled (932) client port (as indicated by a Client OK signal, not shown) then the packet is sent to the error ring 224. All the packets going to the error ring 224 are dropped (Step 934) if the drop mode is set (Step 935). All other packets are forwarded to the downstream client (Step 933) based on SRIO packet's FTYPE and TTYPE fields (FIG. 9E)

Ingress Error Ring (FIGS. 9A and 9B)

As shown in FIG. 9F, the router (900A, 900B, 902A, 902B) checks packet's header for errors (Step 941). If there are errors in the header word and DROP mode is not enabled (Step 953) then the packet is forwarded to the error ring 224 with the appropriate error routing status (FIG. 9I) for fault diagnosis purposes. If there are errors in the header word but DROP mode is enabled then the packets are dropped (955). Packets with parity error in the header word (Step 942) are sent to the error ring 224 with error status indicating "Header Parity Error" (FIG. 9I). Packets with simultaneous SOP (Start of Packet) and EOP (End of Packet) are considered illegal (943) and are sent to the error ring with error status indicating "SOP with EOP" error (FIG. 9I). PCIE/SRIO Protocol Controller 212 ID is compared to the destination ID bits in the packet header (Step 945). If there is a mismatch then the packet is routed to the error ring 224 with error status indicating "PCIE/SRIO Protocol Controller 212 ID Mismatch" error (FIG. 9I). If a packet is received with DUMP mode set (Step 946) then the packet is routed to the error ring 24 (FIG. 2) with error status indicating "Dump mode set" (FIG. 9I). A Low latency packet with the low latency bit not set (Step 947) or Store Forward packet with low latency bit set (Step 947) is routed to the error ring 224 with error status indicating "Low latency bit" error (FIG. 9I). Request packets with priority 3 (Step 948) are considered illegal and are routed to the error ring with error status indicating "Request Priority" error (FIG. 9I). All packets with reserved FTYPE/TTYPE combinations (Step 949) are sent to the error ring with error status indicating "Reserved Ftype/Ttype" error (FIG. 9I). Valid FTYPE/TTYPE combinations are shown in FIG. 9E. Response packets with priority 0 (950) are considered illegal and are sent to the error ring with error status indicating "Response Priority" error (FIG. 9I). If the packet is directed for a disabled client (Step 951) then the packet will be routed to the error ring 224 with the error status indicating "client disabled" error (FIG. 9I). If packet doesn't have errors mentioned above then the packet is forwarded to the downstream client (952) based on packet's FTYPE and TTYPE fields (FIG. 9E).

The Router has two sets of programmable address range registers (as shown below) (FIG. 9E) that it uses to check if the Inbound RIO packet fits within at least one of the enabled address ranges. Each set of address range registers has an enable bit that enables or disables the particular address range.

Address range registers for address range 1 are:
VSAR1 (Valid start address range 1)
VEAR1 (Valid end address range 1)
VAR1_EN (Enable for address range 1)
Address range registers for address range 2 are:
VSAR2 (Valid start address range 2)
VEAR2 (Valid end address range 2)
VAR2_EN (Enable for address range 2)

Router checks RIO request packet's address and size to ensure that the entire packet falls within at least one of the enabled address ranges (between VSAR1 and VEAR1 or between VSAR2 and VEAR2). Router generates an error pulse to SDSA/SIOP for the following conditions:
If both address ranges are disabled.
If only one address range is enabled and the entire RIO packet doesn't fit within that enabled address range.
If both address ranges are enabled and the entire RIO packet doesn't fit within any of the two address ranges.

SDSA/SIOP clients generate an error response when a packet is forwarded to these clients by the router with an error pulse.

Referring now to FIG. 2 (Local/Remote memory), the address ranges (i.e., protection windows) are used to protect the memory spaces shown in FIG. 2 from accidental over-writes from a SP 108 within the packet switching network. The USER DATA space 114 needs to be given access to SP's within the packet switching network since the global cache is distributed across the system interface 106. Specifically, the USER DATA space 114 is made accessible to requests (read, write, atomics) from the packet switching network by the CPU section 204 programming the router range register VSAR1 (FIG. 9B) within the logic section 902I, to the starting address of USER DATA space 114 and VEAR1 register to the ending address of USER DATA space. Similarly, the Store-forward Buffer 240 (I/O module landing zone) is programmed into VSAR2, VEAR2 registers since only read and write requests from the packet switching network need to access the Store-forward Buffer 240. All other spaces in FIG. 2 (CPU Control Store 242, Message Engine ring section 244, Data Engine Descriptor Rings 213) are protected from all requests from the packet switching network.

Figure 9G:
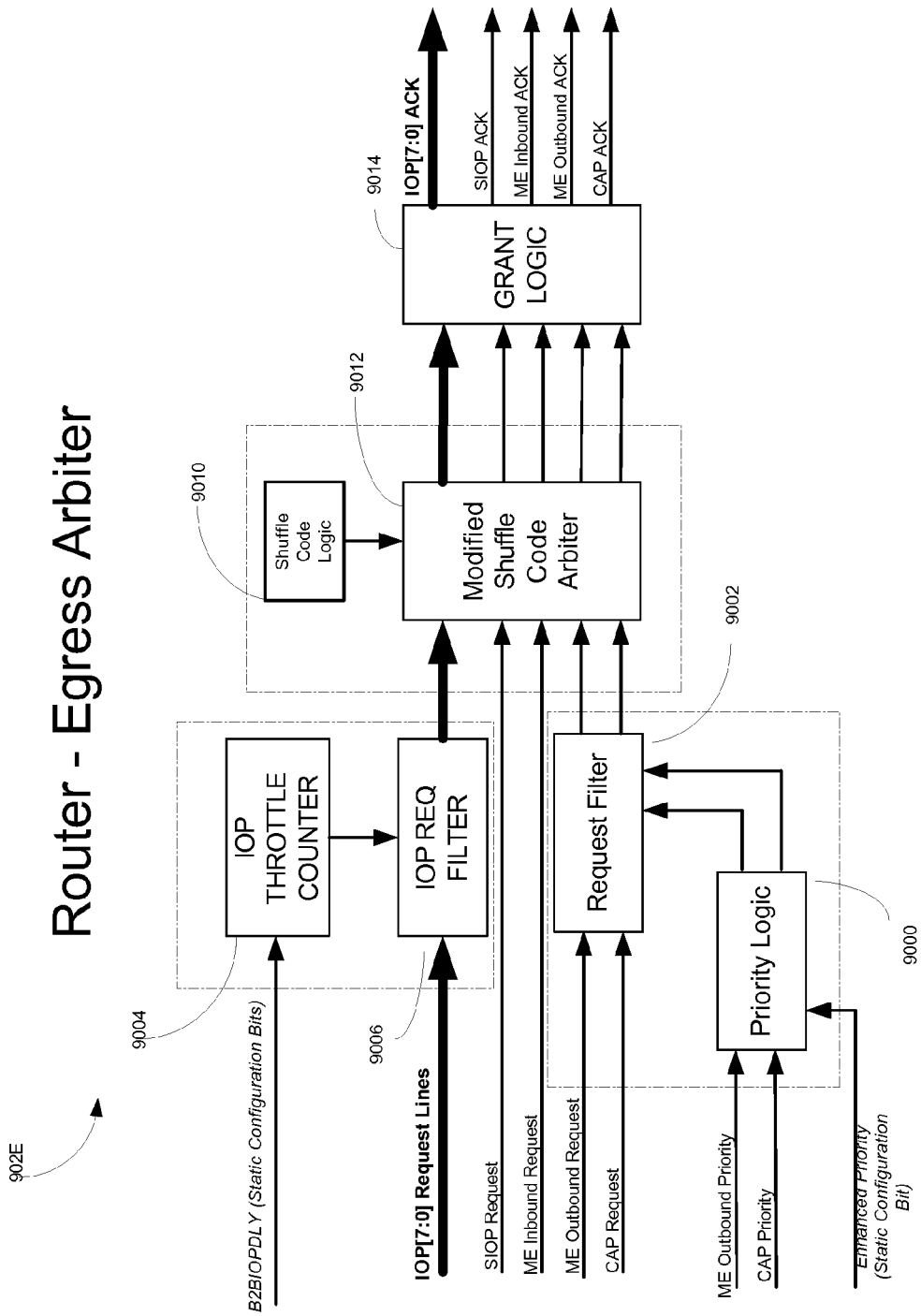
FIG. 9G is a block diagram of the egress arbiter used in the router of FIG. 9.

Egress Arbiter 902E (FIG. 9G)

The router 902 (FIGS. 9A and 9B) arbitrates outbound requests from data pipes 502 (FIG. 5A), slave data pipes (SIOP) 506, ME inbound, ME outbound (egress (FIG. 6A) and CAP 500 (FIG. 7) and transmits packets to SRIO endpoints 1000A, 1000B (FIG. 2) using a shuffle code arbiter 9010. 9012 (FIG. 9G) (described in U.S. Pat. No. 6,026,461, entitled "Bus arbitration system for multiprocessor architecture", inventors Baxter et al., issued Feb. 15, 2000, and now assigned to the same assignee as the present invention, the subject matter therein being incorporated herein by reference), request filtering 9002, and RIO request priority logic 9000 (FIG. 9G)

FIG. 9G shows major elements of the Egress Arbiter 902. These major elements are described below:

Priority Logic 9000: This element allows maintenance packets access to buffers that are reserved for higher priority packets by incrementing their priority by 2 when enhanced priority mode is enabled. Clients have to advertise packet's priority to the Egress arbiter when they request the use of egress bus.

Request Filter 9002: This element filters ME outbound and CAP requests based on the available egress buffers (ADJCTS) and packet's priority.

IOP Throttle counter 9004: This is a 7 bit down counter that is loaded each time an I/O data pipe 502 read request to RIO End Point is granted. Once loaded, this counter gets decremented each clock cycle by one until it becomes zero. This counter is used with IOP Req Filter 9006 described below.

IOP Req Filter 9006: This element uses the IOP throttle counter value to insert delay between two consecutive I/O data pipe 502 read requests. No other I/O data pipe read request is granted while the IOP throttle counter 9004 has a non-zero value. This to restrict the outbound I/O data pipe read request issue rate to better match what PCIE/SRIO Protocol Controller 212 can absorb on RIO ingress for remote read/write requests over the packet switching network.

Shuffle Code Arbitration Table (FIG. 9H) shows the shuffle code arbitration table. It shows the client arbitration priorities based on different shuffle code values. For example, if the shuffle code value is 4 (Row 6), and all I/O data pipes 502 (FIG. 5A) have their request lines asserted and none of the other clients have their request lines asserted, then the I/O pipe 3 will be granted because it has the highest arbitration priority (which is 7 in this case) for that shuffle code value (4 in this case).

Shuffle Code Logic 9010: This element generates a 4 bit shuffle code for the shuffle arbiter 9012. The lower three bits of this shuffle code are generated from a three bit counter which is incremented every time an I/O data pipe 502 request is granted. As shown in FIG. 9H, the upper bit of this shuffle code is used by the shuffle code arbiter to ensure that 50% of the time SIOP 506 has higher arbitration priority than I/O data pipes 502. This bit is toggled every time an I/O data pipe 502 or SIOP 506 is granted.

Shuffle Code Arbiter 9012: The shuffle code arbiter 9012 receives requests from CAP 700, ME inbound 600B, ME outbound 600A, SIOP 506 and 8 I/O data pipes 502 and grants one of them the use of SRIO Egress bus based on the shuffle code value. Grant priorities based on requesting client and shuffle code are shown in FIG. 9H.

Arbitration Request priority order (highest to lowest) is shown below:
CAP 700
ME Inbound 600B
ME Outbound 600A
SIOP 506 or one of the I/O Data Pipes 502 based on Shuffle code value.

Grant logic 9014: This element filters the request of the client that has won arbitration based on free egress buffers 316, 317 (FIG. 3) available and packet's priority. If there are enough free egress buffers 316, 317 available to transfer the packet then the grant is generated for this client. Otherwise the transfer is pended until there are enough free egress buffers 316, 317 available.

CAP 700 (FIG. 7)

Figure 7:
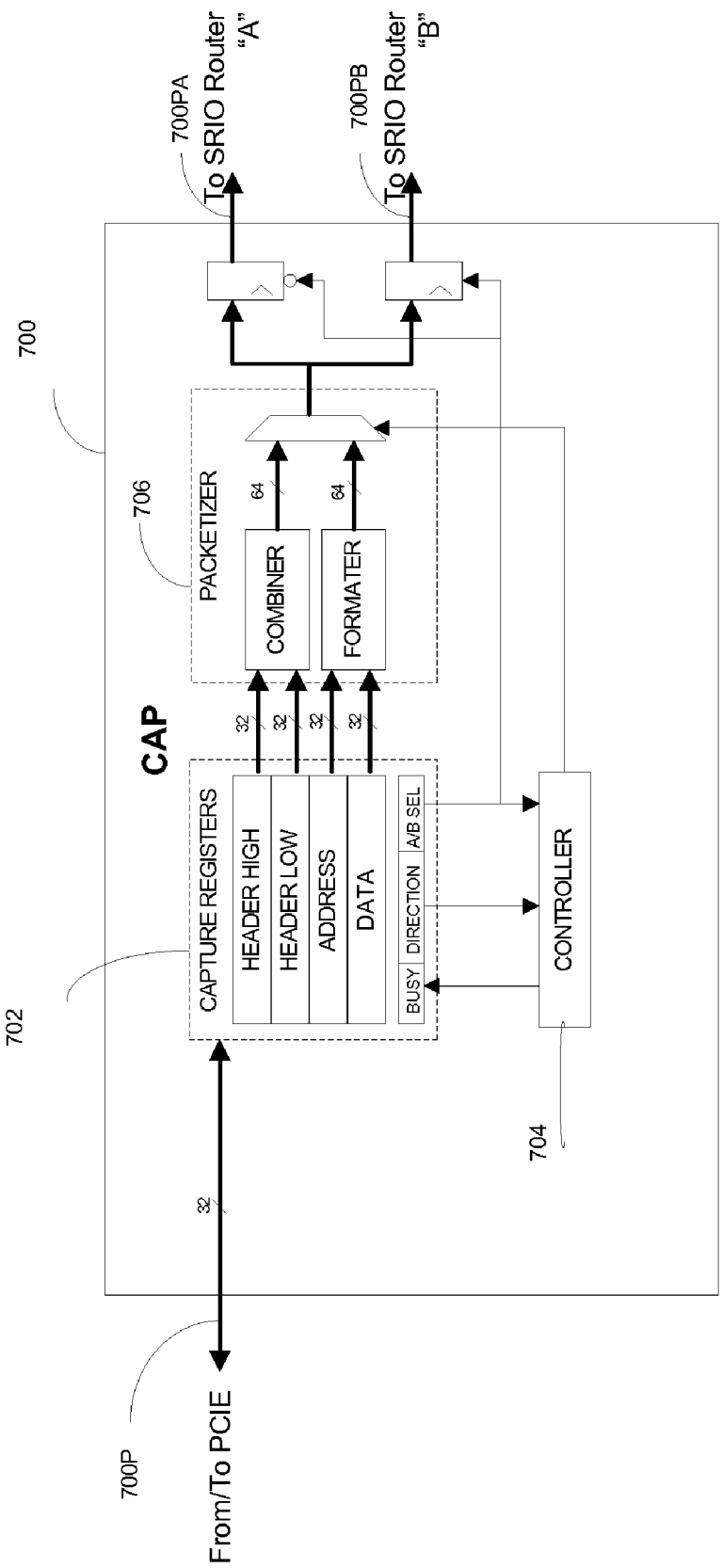
FIG. 7 is a block diagram of a CPU Access Port (CAP) section through which a CPU used in the PCIE/SRIO protocol controller of FIG. 3 sends maintenance packets according to the invention.

Referring to FIG. 7, the CPU RIO access port (CAP) provides the means for the CPU to send out maintenance read and write packets to SRIO End Point A through SRIO Router "A" 902A, or SRIO End Point B through the SRIO Router "B" 902B.

Referring to flow chart FIG. 7A, the CAP 700 receives the maintenance packet setup from the CPU section 204 (FIG. 2) in the form of register writes originating from the CPU (Steps 750, 752, 754, 756, FIG. 7A). The CAP 700 stores the setup in its internal capture registers 702. The CAP controller 704 controls packetizer 706 to packetize the setup to SRIO packet format, then sends the packet to either SRIO Router "A" 902A or SRIO Router "B" 902B based on the A/B select bit in the capture registers 702. The CAP 700 can only perform maintenance write request or maintenance read request packets. In the case of maintenance write request packet, the packet is limited to a 32-bit data payload. The expected maintenance response from the destination SP will go to the Message Engine (inbound message ring 220, FIG. 2).

When CAP 700 starts sending out the packet to SRIO Router "A" or SRIO Router "B", it sets the "BUSY" bit 758 in its capture registers. The CPU must read the "BUSY" bit to ensure it's cleared before attempting to send another maintenance packet. When the packet has been sent to SRIO Router "A" or SRIO Router "B", CAP clears the "BUSY" bit 760 indicating that it is ready to accept another maintenance setup. When CAP finishes sending the packet to the Router, it generates a standard MSI interrupt to the CPU.

Maintenance packets can also be sent from the ME outbound ring 222. However, the advantage to using the CAP 700 is that (a) the CAP 700 egress request to SRIO Router is treated at the highest priority relative to all other pipes (e.g., data pipe 502, SIOP 506, ME 600) and (b) the CAP 700 does not suffer from head-of-line blocking conditions that can arise for example, on the outbound message engine ring when a high SRIO priority maintenance packet it stuck behind a lower SRIO priority message packet in a congested fabric (packet switching network).

It is critical for purposes of fabric fault diagnosis that maintenance packets have higher priority than all other types of SRIO packets. If this is the case, a maintenance packet has a higher probability to make forward progress within a congested network. The SRIO End Point, Router, and the switch End Points within the packet switching network support a concept of enhanced RIO priority for maintenance packets. If enhanced priority is enabled, two is added to the standard RIO priority (0-3) for maintenance packets. For example, if a maintenance packet is being transmitted from CAP at priority two, SRIO Router will add two to make the effective priority equal to four which used for packet buffer allocation calculations. The enhanced priority mechanism effectively reserves dedicated packet buffers within all end-points of the system to be used for maintenance packets.

Trace Buffer 800 (FIG. 8)

The trace buffer 800 is a multi-purpose debug/analysis tool with a shared memory to reduce implementation resources. It can be configured either as a PCIE trace buffer 800 or SRIO trace buffer 801. PCIE trace buffer is used to capture PCIE activity and SRIO trace buffer is used to capture SRIO activity. For efficiency, a single interface is used to read back PCIE or SRIO activity. The trace buffer provides different triggering, filtering and capturing capabilities.

As shown in FIG. 8, the Trace buffer has a PCIE interface 805 that is used to configure trace buffer 800 and to read its memory contents 806. It has a shared dual port RAM 806 that is used to store SRIO or PCIE activity. Port A of this DPR 806 runs at 156 MHz and Port B runs at 250 MHz. Port A is used to either read memory contents of DPR 806 or to store SRIO activity. Port B is used only to store PCIE activity Memory contents of this DPR 806 (DOUT-PORT A) can only be read, via PCIE interface, when SRIO trace buffer 800 is not running (is not capturing data). STB_BUSY signal indicates if the SRIO trace buffer is running or not. When SRIO TBUF 801 is not running, address multiplexer (mux) 803 selects MEM READ ADDRESS (memory location to be read) as address for PORT-A of DPR 806.

An SRIO Address counter 802 is used to generate the address for Port-A of DPR 806 to store SRIO activity. An SRIO TBUF controls this counter by asserting S_CLEAR and SMEM_WE signals. S_CLEAR signal clears this address counter and SMEM_WE signal increments this counter by 1.

A PCIE TBUF has logic for PCIE trace buffer 800. This module generates write enable (PMEM_WE), data (PCIE Monitor signals) and address for storing PCIE activity in Port B of DPR 806.

A PCIE Address counter 807 is used to generate the address for Port-B of DPR 806 to store PCIE activity. The PCIE TBUF controls this counter 807 by asserting P_CLEAR and PMEM_WE signals. A P_CLEAR signal clears this address counter 807 and PMEM_WE signal increments this counter by 1.

A number of embodiments of the invention have been described. Nevertheless, it will be understood that various modifications may be made without departing from the spirit and scope of the invention. For example, while the PCIE/SRIO Controller 212 (FIG. 2) has been described for use with Intel or Power PC CPU, the PCIE/SRIO Controller may be used with other types of CPUs. Accordingly, other embodiments are within the scope of the following claims.

What is claimed is:

1. A data storage system for transferring data between a host computer/server and a bank of disk drives through a system interface, such system interface having: a plurality of storage processors, one portion of the storage processors having a user data port coupled to the host computer/server and another portion of the storage processors having a user data port coupled to the bank of disk drives; and, a packet switching network coupled to the plurality of storage processors for passing packets between the plurality storage processors, each one of the plurality of storage processors comprising:

a protocol controller for converting packets between a format used by the plurality of storage processors and a format used by the packet switching network, such controller comprising:

an interface section for passing packets providing atomic operation requests to the packet switching network through a Direct Single Access (DSA) section, having a pair of ports coupled to the packet switching network, for operation by another one or the same one of the storage processors and for performing atomic operations requests received from another one or the same one of the plurality of storage processors from the packet switching network, wherein each one of the storage processors includes a Central Processing Unit (CPU) section having a plurality of CPUs, each one of the CPUs being provided to perform a plurality of operations, one of such operations being a DSA request to the DSA section, where a DSA request is used by the CPU within one of the storage processors to access a memory in any one of the storage processors, wherein a first one of the CPUs is available to perform other ones of the operations after providing the DSA request to the DSA section while the DSA section executes the DSA request and wherein a second one of the CPUs initiates a second DSA request during execution of a first DSA request to the DSA section by the first one of the CPUs wherein the first CPU sends the first DSA request to a first one of the pair of ports coupled to the packet switching network while the second CPU concurrently sends the second DSA request to a second one of the pair of ports coupled to the packet switching network.

2. The system recited in claim 1 wherein the plurality of CPUs feed a common node.

* * * * *